United States Patent
Kramer et al.

(10) Patent No.: US 8,328,283 B2
(45) Date of Patent: Dec. 11, 2012

(54) CHAIR

(75) Inventors: Kenneth L. Kramer, Greensburg, IN (US); Marshall S. Dahneke, Batesville, IN (US); Reed N. Wilcox, Littleton, CO (US); David T. Schwanemann, Cincinnati, OH (US); John P. Biondo, Durant, IA (US); Francis C. Ganance, Cincinnati, OH (US); Scott A. Schultz, Batesville, IN (US); Russell L. Hardy, Batesville, IN (US); Troy D. Acton, St. Paul, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 12/575,182

(22) Filed: Oct. 7, 2009

(65) Prior Publication Data

US 2010/0022926 A1    Jan. 28, 2010

Related U.S. Application Data

(63) Continuation of application No. 11/204,609, filed on Aug. 16, 2005, now Pat. No. 7,600,817.

(60) Provisional application No. 60/601,924, filed on Aug. 16, 2004, provisional application No. 60/611,407, filed on Sep. 20, 2004, provisional application No. 60/643,321, filed on Jan. 12, 2005, provisional application No. 60/659,540, filed on Mar. 8, 2005.

(51) Int. Cl.
*A47C 1/02* (2006.01)
*A47C 1/034* (2006.01)

(52) U.S. Cl. ............... 297/338; 297/344.12; 297/354.1; 297/312

(58) Field of Classification Search ............ 297/344.12, 297/DIG. 8, DIG. 10; 5/613, 614, 617, 618
See application file for complete search history.

(56) References Cited

U.S. PATENT DOCUMENTS

| | | |
|---|---|---|
| 2,587,068 A | 2/1952 | Sanders |
| 2,682,913 A | 7/1954 | Scheide |
| 2,869,614 A | 1/1959 | Wamsley |
| 3,138,402 A | 6/1964 | Heyl, Jr. et al. |
| 3,147,039 A | 9/1964 | Smith et al. |
| 3,284,126 A | 11/1966 | Piazza |
| 3,379,450 A | 4/1968 | Jones et al. |
| 3,589,769 A | 6/1971 | Bressler |
| 3,640,566 A | 2/1972 | Hodge |
| 3,807,795 A | 4/1974 | Weant et al. |

(Continued)

FOREIGN PATENT DOCUMENTS

WO    WO 9317649    9/1993

OTHER PUBLICATIONS

Equalizer M1 Tilt System, Burke, Inc., date unknown, four pages.

(Continued)

*Primary Examiner* — Sarah B McPartlin
(74) *Attorney, Agent, or Firm* — Barnes & Thornburg LLP

(57) ABSTRACT

A chair with articulable support sections and an integrated lift system may have support sections mechanically linked such that a single actuation control device may articulate multiple sections. The chair includes configurable accessories directed to the comfort of an occupant of the chair. The support sections may include air cells to adjust firmness of support section surfaces.

20 Claims, 39 Drawing Sheets

U.S. PATENT DOCUMENTS

| | | | |
|---|---|---|---|
| 3,851,917 A | | 12/1974 | Horstmann et al. |
| 3,865,457 A | | 2/1975 | Carter |
| 3,964,786 A | | 6/1976 | Mashuda |
| 4,067,249 A | | 1/1978 | Deucher |
| 4,076,304 A | | 2/1978 | Deucher |
| 4,101,143 A | | 7/1978 | Sieber |
| 4,119,342 A | | 10/1978 | Jones |
| 4,120,530 A | | 10/1978 | Imbro |
| 4,127,906 A | * | 12/1978 | Zur .................. 5/615 |
| 4,231,614 A | | 11/1980 | Shaffer |
| 4,249,774 A | | 2/1981 | Andreasson |
| 4,258,445 A | * | 3/1981 | Zur .................. 5/614 |
| 4,285,541 A | | 8/1981 | Onishi |
| 4,519,649 A | | 5/1985 | Tanaka et al. |
| 4,569,556 A | | 2/1986 | Pillot |
| 4,572,573 A | | 2/1986 | Yoshikawa et al. |
| 4,598,944 A | | 7/1986 | Meyer et al. |
| 4,675,926 A | | 6/1987 | Lindblom et al. |
| 4,717,169 A | | 1/1988 | Shaffer |
| 4,768,797 A | | 9/1988 | Friedrich |
| 4,771,489 A | | 9/1988 | Chen et al. |
| 4,787,104 A | | 11/1988 | Grantham |
| 4,809,804 A | | 3/1989 | Houston et al. |
| 4,858,260 A | | 8/1989 | Failor et al. |
| 4,862,529 A | | 9/1989 | Peck |
| 4,862,530 A | | 9/1989 | Chen |
| 4,929,022 A | | 5/1990 | Geraci |
| 4,941,221 A | * | 7/1990 | Kanzler .................. 5/615 |
| 4,945,582 A | | 8/1990 | Hayton et al. |
| 4,949,408 A | | 8/1990 | Trkla |
| 4,949,410 A | | 8/1990 | Failor et al. |
| 4,974,905 A | | 12/1990 | Davis |
| 4,979,726 A | | 12/1990 | Geraci |
| 4,986,260 A | | 1/1991 | Iams et al. |
| 4,987,896 A | | 1/1991 | Nakamatsu |
| 4,993,777 A | | 2/1991 | LaPointe |
| 5,023,967 A | | 6/1991 | Ferrand |
| 5,096,008 A | | 3/1992 | Mankowski |
| 5,108,202 A | | 4/1992 | Smith |
| 5,155,873 A | | 10/1992 | Bridges |
| 5,193,633 A | | 3/1993 | Ezenwa |
| 5,199,113 A | | 4/1993 | Glasow et al. |
| 5,230,113 A | | 7/1993 | Foster et al. |
| 5,261,725 A | | 11/1993 | Rudolph |
| 5,269,227 A | | 12/1993 | Warren et al. |
| 5,297,021 A | | 3/1994 | Koerlin et al. |
| 5,333,887 A | | 8/1994 | Luther |
| 5,342,114 A | | 8/1994 | Burke et al. |
| 5,346,280 A | | 9/1994 | Deumite |
| 5,348,375 A | | 9/1994 | Steininger |
| 5,366,036 A | | 11/1994 | Perry |
| 5,398,357 A | | 3/1995 | Foster |
| 5,402,544 A | | 4/1995 | Crawford et al. |
| 5,411,044 A | | 5/1995 | Andolfi |
| 5,454,126 A | | 10/1995 | Foster et al. |
| 5,479,666 A | | 1/1996 | Foster et al. |
| 5,513,867 A | | 5/1996 | Bloswick et al. |
| 5,524,439 A | * | 6/1996 | Gallup et al. .................. 62/3.5 |
| 5,537,701 A | | 7/1996 | Elliott |
| 5,556,121 A | | 9/1996 | Pillot |
| 5,584,082 A | | 12/1996 | Crawford et al. |
| 5,609,348 A | | 3/1997 | Galumbeck |
| 5,651,149 A | | 7/1997 | Garman |
| 5,690,185 A | | 11/1997 | Sengel |
| 5,715,548 A | | 2/1998 | Weismiller et al. |
| 5,742,957 A | * | 4/1998 | Vanzant .................. 5/81.1 R |
| 5,772,226 A | | 6/1998 | Bobichon |
| 5,774,914 A | | 7/1998 | Johnson et al. |
| 5,790,997 A | | 8/1998 | Ruehl |
| 5,868,461 A | | 2/1999 | Brotherston |
| 5,870,784 A | | 2/1999 | Elliott |
| 5,890,765 A | | 4/1999 | LaPointe et al. |
| 5,896,602 A | * | 4/1999 | Marblestone .................. 5/81.1 R |
| 5,970,545 A | * | 10/1999 | Garman et al. .................. 5/615 |
| 5,984,338 A | | 11/1999 | Meyer |
| 5,984,411 A | | 11/1999 | Galumbeck |
| 5,992,934 A | | 11/1999 | Gehrig et al. |
| 6,000,578 A | | 12/1999 | Boissay |
| 6,089,593 A | | 7/2000 | Hanson et al. |
| 6,101,647 A | | 8/2000 | Stroud et al. |
| 6,135,559 A | | 10/2000 | Kowalski |
| 6,154,899 A | | 12/2000 | Brooke et al. |
| 6,163,903 A | | 12/2000 | Weismiller et al. |
| 6,175,982 B1 | | 1/2001 | Cushwa |
| 6,176,508 B1 | | 1/2001 | Malassigne et al. |
| 6,213,554 B1 | | 4/2001 | Marcoux et al. |
| 6,231,067 B1 | | 5/2001 | Johnson et al. |
| 6,250,717 B1 | | 6/2001 | Porcheron |
| 6,272,702 B1 | | 8/2001 | Uchida et al. |
| 6,332,512 B1 | | 12/2001 | Muranaka |
| 6,336,235 B1 | | 1/2002 | Ruehl |
| 6,382,725 B1 | | 5/2002 | Carroll |
| 6,398,357 B1 | | 6/2002 | Holloway et al. |
| 6,409,265 B1 | | 6/2002 | Koerlin et al. |
| 6,425,634 B1 | | 7/2002 | Romero |
| 6,428,103 B1 | | 8/2002 | Hong |
| 6,454,285 B1 | | 9/2002 | Koenig |
| 6,460,930 B2 | | 10/2002 | Thornton |
| 6,499,163 B1 | | 12/2002 | Stensby |
| 6,533,304 B2 | | 3/2003 | Lizama-Troncoso et al. |
| 6,557,940 B2 | | 5/2003 | Hayashi et al. |
| 6,584,629 B2 | | 7/2003 | Tsuji et al. |
| 6,601,869 B2 | | 8/2003 | Porcheron |
| 6,604,471 B1 | | 8/2003 | Tarver, Jr. |
| 6,604,750 B2 | | 8/2003 | Malassigne et al. |
| 6,623,022 B2 | | 9/2003 | Malassigne et al. |
| 6,695,799 B2 | * | 2/2004 | Kitadou et al. .................. 601/49 |
| 6,715,836 B1 | | 4/2004 | Chen et al. |
| 6,752,459 B2 | | 6/2004 | Deisig |
| 6,799,770 B2 | | 10/2004 | Patrick et al. |
| 6,823,549 B1 | * | 11/2004 | Hampton et al. .................. 5/713 |
| 6,839,918 B1 | | 1/2005 | Jensen |
| 6,851,751 B1 | | 2/2005 | Romero et al. |
| 7,600,817 B2 | | 10/2009 | Kramer et al. |
| 2002/0174487 A1 | | 11/2002 | Kramer et al. |
| 2004/0212177 A1 | | 10/2004 | Kuiken |
| 2005/0046255 A1 | | 3/2005 | Bressler et al. |
| 2005/0088024 A1 | | 4/2005 | Rozaieski et al. |
| 2006/0087158 A1 | | 4/2006 | Kramer et al. |

OTHER PUBLICATIONS

Quantum Rehab, Moving at the Speed of Life, a Division of Pride Mobility Products Corp., Mar. 9, 2004, two pages.
Solutions for Easier Living, Uplift Technologies, Inc., date unknown, four pages.
Oto Bodycare, Oto Super Relax SPR-l200, date unknown, four pages.
Scooter Link Medical Equipment Superstore, Med-Lift-Reliance 5555 Full Sleeper Lift Chair, Sep. 14, 2004, one page.
Use and Care Guide for Your New American Massage Adjustable Recliner, American Massage Products, Inc., Sep. 1996, eight pages.
The First Intelligent Massage Chair to Give You Arm and Foot Massage, Osim Global Health Care, date unknown, one page.
Precision Massage Technology, The OSIM iSymphonic, date unknown, one page.
Intelligent Temperature Controllers, date unknown, one page.
Panasonic Ideas for Life, Momi Momi Real Pro, date unknown, twelve pages.
Amano All Products 2004, Medical and Welfare Instruments and Machinery, date unknown, two pages.
Otto Bock Seating and Positioning Products, Otto Bock Health Care, date unknown, twelve pages.
Senator, date unknown, one page.
Written Opinion and International Search Report for PCT/US05/29229, mailed Jun. 20, 2008, ten pages.
International Search Report for International Application No. PCT/US05/28992, dated Feb. 23, 2007.

* cited by examiner

CHAIR

This application is a continuation of U.S. application Ser. No. 11/204,609, which was filed Aug. 16, 2005, which issued as U.S. Pat. No. 7,600,817 on Oct. 13, 2009 and which claimed the benefit, under 35 U.S.C. §119(e), of U.S. Provisional Patent Application Ser. Nos. 60/601,924 filed Aug. 16, 2004, 60/611,407 filed Sep. 20, 2004, 60/643,321 filed Jan. 12, 2005, and 60/659,540 filed Mar. 8, 2005 and each of which is hereby incorporated by reference herein in its entirety.

BACKGROUND OF THE INVENTION

The present invention relates to an articulating chair for use in the home. More specifically, the invention relates to a reclining lift chair that includes accessories to be used by an occupant of the chair. The accessories may include integrated lighting, sound, and massage.

Older individuals with reduced mobility oftentimes become confined to beds in a managed care environment such as a nursing home. More recently, a certain proportion of individuals have chosen to forgo the nursing home and stay in their own home or the home of a caregiver such as a child, for example. Most home furniture is not adapted or well suited for individuals lacking mobility and suffering from reduced dexterity. This results in reduced comfort and assistance for individuals lacking mobility.

In some cases, a bed designed for a nursing home or hospital is used in the home. In other cases, a standard bed is used in living areas of the home. Articulating beds designed for the home are known, but are intended to be used in sleeping areas such as a bedroom. Reclining chairs offer some features similar to articulating beds but are not easy for a person of limited mobility to get into and out of when the need arises. Some chairs have lift systems to help boost an individual out of the chair but have limited articulation of support sections.

SUMMARY OF THE INVENTION

The present invention comprises one or more of the features recited in the appended claims and/or the following features which, alone or in any combination, may comprise patentable subject matter.

The present invention includes a chair which is configured to articulate from a generally sitting-up position to a deep recline position so as to be used by an individual of limited mobility as both a chair and a sleeping apparatus. The chair has multiple support sections which articulate relative to each other. As the multiple support sections articulate, the relative positions of the sections change so that sections which may be separated by one or more gaps in the sitting-up position articulate to abut in the supine position to eliminate the gaps and create a continuous support surface suitable for sleeping. Additionally, the chair structure is configured to provide lift assistance to help an individual seated on the chair egress from the chair. Additional accessories may be added to the chair to improve the comfort of an individual who occupies the chair. In some embodiments, the chair may recline to a full supine position.

Specifically, the chair may include a frame, a base portion supporting the frame, a back section pivotably coupled to the frame, and a back support pivotably coupled to the back section at one end and pivotably coupled to the frame at a second end. The base may be supported on casters. The chair may further comprise a foot section pivotably coupled to the frame and a foot support pivotably coupled to the foot section at one end and pivotably coupled to the frame at a second end. The chair may also comprise a seat section pivotably coupled to the frame and articulable relative to the frame. In some embodiments, the frame may tilt relative to the base. Tilting of the frame may be controlled by a motion control member such as a linear actuator, for example.

The chair may be configured to articulate from a sitting-up position to a recline position. Articulation of the seat section and the foot section may be coupled to the articulation of the back section such that articulation of the back section results in articulation of the seat section and/or the foot section. The back and foot sections may each be of a two-piece construction so that the support surface is movable relative to the frame. For example, a back section support surface may be mounted on slides which are coupled to a back section frame such that the back section surface slides relative to the back section frame during articulation of the back section from the sitting-up position to the supine position. Likewise, a foot section surface may be mounted on slides coupled to a foot section frame so that the foot section surface slides relative to the foot section frame during articulation of the chair from the an sitting-up position to the supine position. The back and foot section surfaces may be free to move relative to their respective frames. However, the back and foot section surfaces may be urged to move through the attachment of springs from the surfaces to the frames, the springs biasing the surfaces to a particular position. Alternatively, the surface sections may be driven relative to the frames by an additional articulation control member such as a link, a motor, or an actuator for example.

The chair may further comprise a comfort section which may be coupled to the back section. The comfort section may include a light directed to provide light for an occupant of the chair. The comfort section may also include a vent which is configured to direct temperature controlled air onto an occupant of the chair. The comfort section may also include speakers for directing audio to an occupant of the chair. The comfort section may be configured to receive inputs from a source of audio such as a stereo, radio, television, home computer or other like device and redirect the audio through the comfort section to an occupant of the chair. Further, the comfort section may be pivotably coupled to the back section of the chair and pivotable relative to the back section to alter the direction of the light or of the air exiting the comfort section. Also, the comfort section may include an extendable portion and a fixed portion with the extendable portion being adjustable relative to an occupant of the chair. In some embodiments, the comfort section may include more than one of a light, a speaker, a vent, or other comfort devices.

In some embodiments, the comfort section may comprise a flexible member and the light, sound, or air may be directed from the flexible member, a gooseneck, for example, coupled to the back section at a first end of the flexible member. A light may be coupled to the flexible member at a second end, the flexible member adjustable to direct light in a particular direction. In some embodiments, the flexible member may be used to direct air flow through the flexible member onto or in the vicinity of an occupant of the chair. However, any of a number of flexible member structures may be employed to support comfort items and the exemplary gooseneck flexible member is illustrative of only one such structure.

The back section, seat section, and foot section of the chair may comprise a fabric cover over a foam core. However, some or all of the foam may be omitted and replaced with a support surface comprising one or more air bladders to provide support for an occupant of the chair such as the dynamic cellular person support surface described in an application titled "DYNAMIC CELLULAR PERSON SUPPORT SURFACE", U.S. application Ser. No. 11/204,632, filed Aug. 16, 2005, and hereby incorporated by reference herein in its entirety. When present, the dynamic cellular person support surface may be configured to provide massage therapy to an occupant of the chair by alternately and sequentially rapidly inflating and deflating individual bladders of the dynamic cellular person support surface. Additionally, the dynamic cellular person support surface may also be configured to alternate pressures throughout the dynamic cellular person support surface to provide an occupant a floating sensation. The dynamic cellular person support surface may also be configured to provide temperature control to an occupant.

The chair may further comprise localized heating units to provide heating to the extremities of an occupant of the chair. For example, the foot section may include an integrated cover which is configured for an occupant to insert their feet into the covering and a heating apparatus may be contained within the foot section to provide radiant heat to the occupant's feet. The cover may provide a thermal retention of the heat to maintain the temperature of the occupant's feet. In some embodiments, the cover may be opened at the foot end to permit freedom of movement of the occupant's feet. The heating apparatus may comprise resistive heating elements which radiate heat when current is applied. In other embodiments, the heating may be accomplished by the heating of air which is then passed through the foot section. In still other embodiments, heat may be provided by heating the air delivered to a dynamic cellular person support surface under the feet of the occupant, with the heating element located distal to the foot section.

An occupant's hands may be heated by a similar structure located on armrests of the chair. The armrests may include a cover and a heating apparatus located within the armrest to provide heat to the hands of an occupant. The occupant may slip a hand into a cover coupled to the armrest and located above the heating apparatus. The cover may have thermal retention properties so that heat generated by the heating apparatus is retained within the cover to maintain the temperature of the occupant's hands. The heating apparatus may comprise resistive heating elements, a local warm air heater, or a distal air warmer as discussed above.

Whenever heating is provided, the chair may comprise a sensor to detect the temperature at the interface, the sensor coupled to a control system to maintain an appropriate temperature of the occupant's extremities. The chair may also comprise a selective thermostat coupled to the heating apparatus which permits the occupant to change the temperature being delivered by the heating apparatus. Different thermostats may be coupled to the various heating apparatus located throughout the chair to control the temperature of various zones of the chair to different levels depending on the preference of the occupant.

In some embodiments, multiple support sections of the chair may have heating apparatus such that each section may be heated. For example, a heating apparatus may be included in the seat section or back section or portions thereof to provide localized heating.

The chair may further comprise a side module coupled to the frame and/or the base of the chair. The side module may be removably coupled to allow the chair to be configured differently for different occupants or users. The chair may further comprise an armrest pivotably coupled to the side module and pivotable between a use position and an out-of-the-way position. When an armrest is pivoted to an out-of-the-way position, an occupant of the chair may egress from the chair laterally such as to ingress onto a personal mobility device, such as a wheelchair, for example, adjacent the chair. A home care equipment system which utilizes lateral transfer is described in an application titled "HOME CARE EQUIPMENT SYSTEM", U.S. application Ser. No. 11/204,633, filed Aug. 16, 2005 and hereby incorporated by reference herein in its entirety.

The chair may have one or more motors or actuators configured to drive articulation of the back section, seat section, or foot section. Also, in some embodiments, there may be a motor or actuator mounted between a support frame and a base frame, and configured to raise and lower the support frame relative to the base so that the height of the back section, seat section, and foot section can be changed. Additionally, the seat section may include multiple portions which articulate relative to each other such that the seat section raises an occupant of the chair to a standing position. For example, a back seat section portion may articulate upwardly and forwardly out of the seat while a front section portion pivots from a substantially horizontal to a substantially vertical orientation. Articulation of the seat portions may be independent from articulation of other structures of the chair such that articulation of the multiple seat portions in this lifting mode may occur with other sections, such as the back section or foot section remaining stationary, or the seat section in various positions. In addition, armrests may be coupled to the back seat section so that the armrests articulate with the back seat section to maintain a constant position relative to an occupant during egress out of or ingress into the chair. In various embodiments, the armrest may be coupled to the frame, the seat section, the back section, or a side module.

In some embodiments, the support sections of the chair may be mounted on a support frame which is pivotably coupled to a base frame. Additionally, an actuator may be coupled to the base frame and the support frame, the actuator configured to extend and retract and thereby pivot the support frame relative to the base frame. Pivoting of the support frame may alter the pitch of the support sections relative to the floor providing an additional degree of adjustment for the occupant of the chair. Articulation of the back, seat, and foot sections may be driven by actuators coupled to the respective support sections and the support frame such that the articulation occurs with respect to the support frame. Articulation may include back section articulation, foot section articulation, and lift seat articulation.

In some embodiments, the chair may further comprise actuators coupled to the frame and one or more legs to extend or retract the legs relative to the frame and thereby change the elevation of the chair by changing the pitch and/or roll of the chair relative to the floor. For example, the foot end legs may be extended and the head end legs may be retracted to change the pitch of the chair so that the head end is lower than the foot end. Likewise, legs on the left side of the chair may be retracted and legs on the right side of the chair may be extended to alter the roll of the chair and thereby rotate the occupant toward the left side of the chair. Each leg may be adjustable to any of a number of positions so that any of a number of positions of the chair may be achieved.

The extension and retraction of the legs relative to the frame may be accomplished by any of a number of actuators such as electromechanical actuators, pneumatic cylinders, hydraulic cylinders, or the like.

The side module attached to the side of the chair may include a lid that is pivotable relative to the chair between a closed position and an open position. In the open position, a cavity within the side module may be exposed with the cavity providing storage of various accessories for an occupant of the chair. For example, a table may be stored within the side module and moveable to a use position over the lap of an occupant of the chair.

In some embodiments, an armrest on the chair may be adjustable to alter the width of the seating surface available and thereby provide support to a smaller occupant. For example, in some embodiments, the chair may include two piece armrests with a fixed portion coupled to the frame or side module and a moving portion movable from a stowed position within a cavity in the fixed portion, and an extended position. In some embodiments, the moving portion may pivot relative to the fixed portion into the seating area of the chair to thereby reduce the width of the seating surface. In other embodiments, the moving portion may slidingly extend from the fixed portion into the seating area of the chair. In some embodiments, the armrest may have an increasing width from the front of the chair to the back to chair and may pivot relative to the chair frame about a vertical axis proximate the front of the armrest. Pivoting of the armrest relative to the chair frame may result in altering the distance between two armrests near the back section of the chair, thereby altering the width of the seating section. In each embodiment, the moving portion of the armrest may be positioned to a number of positions between the widest configuration and narrowest configuration with the position being held by friction or some other locking mechanism such as a ratchet mechanism, clamp, releasable wrap spring, or the like.

In some embodiments, the armrest may be coupled to the back section of the chair and pivotable in a horizontal axis parallel to the pivot axis of the back section relative to the seat section and a vertical axis. Pivoting about the vertical axis may permit the width of the seating area to be narrowed as described above as well as pivoting the armrest out of the way to allow an occupant to egress out of the side of the chair. Pivoting about the horizontal axis permits the armrest to move with the back section and thereby prevent a gap from developing between the back section and the armrest as the back section is articulated.

In some embodiments, the chair may comprise a power swivel coupled to the frame of the chair. The power swivel may be configured to lift the legs of the chair off from the floor to allow the chair to be swiveled to a new orientation. For example, the power swivel may comprise an upper portion coupled to the chair frame and a lower portion pivotably coupled to the upper portion by a bearing. The power swivel may be selectively actuable to be deployed to engage the floor, thereby lifting the legs of the chair from the floor and allowing the chair to be rotated on the power swivel. Once a new orientation is achieved, the power swivel may be retracted and the chair placed back on its legs or casters, if present. Deployment of the power swivel may be accomplished by a linear actuator such as an electromechanical actuator, pneumatic cylinder, hydraulic cylinder, or the like. In some embodiments, the power swivel may further comprise an actuator to provide powered rotation of the chair relative to the floor. For example, an actuator may be coupled to the lower portion and the frame of the chair and configured to rotate the chair relative to the floor when the power swivel is deployed. In some embodiments, the power swivel may be coupled to the frame and the seat section to provide rotation of the seat section relative to the frame. When coupled to the seat section and the frame, the power swivel is operable to pivot the seat section but not the entire chair. In still other embodiments, multiple power swivels may be included to provide pivoting of the seat section and, independently, pivoting of the entire chair.

An occupant of the chair may control articulation of the chair by providing inputs to a user device such as a pendant, for example. The pendant may include various user input devices such as switches, microphones, joysticks, buttons, dials, and/or slides. When present, the slide may be movable to multiple positions which correspond to various articulated positions of the chair. Movement from one position to another position on the slide of the pendant may result in articulation of the chair from a first indicated position to a second indicated position. The various user input devices may control articulation of the chair, output from the speakers, output from the vent, and lighting.

The pendant may be electrically coupled to the chair through a cord. The cord may extend from the comfort section, an armrest, or other portion of the chair. In some embodiments, the cord may be retracted into a portion of the chair when the pendant is not in use. In addition, the pendant may be wirelessly connected to the chair through an infrared or a radio frequency signal, for example. The pendant may be retained on a member coupled to an armrest of the chair, may extend from within the side module, or may stow in a cavity formed in an armrest. It is also contemplated that a wireless pendant may be attached to a lanyard which is placed around the neck of an occupant of the chair so that the pendant will be immediately available for the occupant.

The controls may comprise a single button which sequentially articulates the chair to multiple positions as the button is held in an actuated position. For example, activation of the button may move the back, seat, and foot section through their range of motion in proportion to one another so that each section reaches its limit position at approximately the same time. The controls may include a button which is programmed by an occupant to move the chair to a predetermined position of comfort chosen by the occupant. The controls may comprise multiple user inputs with each dedicated to articulation of a particular function of the chair.

The foot section of the chair may be a multi-piece construction so that a first portion of the foot section is articulable relative to second portion of the foot section and adjustable to a position wherein the first portion of the foot section serves as a foot-prop for an occupant of the chair. In addition, the second portion of the foot section may be articulable between a lower position when the chair is in a sitting-up configuration and a raised position when the chair is in the supine position. The first portion of the foot section may be articulable to extend from the second portion of the foot section provide an extended foot section when the chair is in an articulated position such as the supine position, for example.

In some embodiments, the foot section articulation may be driven by an actuator. For example, the foot section may be extendable and comprise a fixed portion, a moving portion, an actuator, and a linkage to transfer motion from the actuator to the moving portion to move the moving portion from the fixed portion to extend or retract the foot section. The linkage may comprise a scissors-type linkage. The length of the foot section may be adjustable to a plurality of positions between a first position wherein the moving portion is fully retracted within the fixed portion and a second position wherein the moving portion is fully extended from the fixed portion. The scissors linkage may include a fixed pivot and a slider which couple the scissors linkage to the moving portion. As the scissors linkages is actuated, one link may pivot about the fixed pivot while a second link slides relative to the moving portion. Extension of the scissors is accomplished by actuation of the actuator to move another link relative to yet another link. There may be one or more scissors sections linking the first end of the scissors linkage coupled to the fixed section and actuator to the second end of the scissors linkage coupled to the moving section.

In some embodiments, the various features of the chair may be programmable to execute a pre-defined series of function activations to provide an occupant with a relaxation sequence. For example, the comfort section may be programmed to provide a pre-defined series of sounds and light intensities, while the surfaces are programmed to provide massage and heat in conjunction with the sounds and lights. Similarly, the chair may be programmed to articulate through a series of positions in parallel to the other functions and thereby provide the occupant a pre-defined sensory experience to facilitate relaxation and rest.

Operation of the chair functions may be facilitated by a control system. The control system may comprise a microprocessor based controller to simultaneously control any of a number of functions and features of the chair simultaneously. In some embodiments, multiple microprocessors may be utilized. The multiple microprocessors may be connected in a network with the network configured to recognize the presence of absence of various functional modules and to process signals related to the various functional modules present.

Further, the control system may comprise a memory device which stores a program which activates the various functions and outputs to provide the pre-defined sensory experience. The memory device may include a pre-programmed sequence of functional activations to form the pre-defined sensory experience. Further, the control system may be configured to allow a user to program an individualized sequence.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Individuals who suffer from reduced mobility often spend a substantial amount of time in one location within their home occupying a piece of furniture such as a chair, for example. The present disclosure includes several illustrative embodiments of chair features which provide comfort features and are adapted to assist a person of limited mobility with essential daily life tasks such as transferring into and out of a chair.

Figure 1:
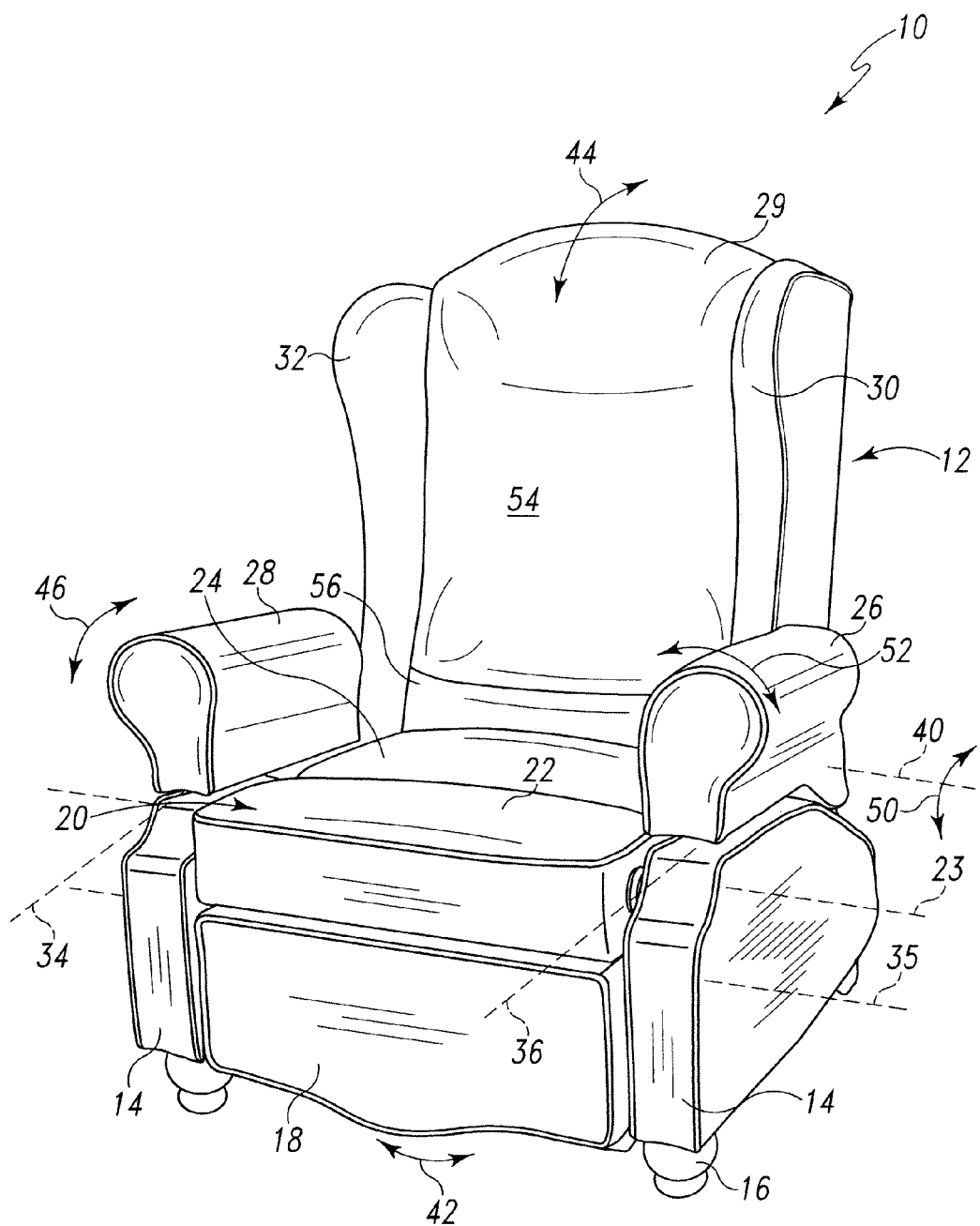
FIG. 1 is a perspective view of a chair with an articulating back, articulating foot support and articulating seat sections.

One embodiment of a chair 10, shown in FIG. 1, comprises a back 12, seat 20, and leg support 18 supported by a base 14 which is in turn supported by legs 16. Back 12 and leg support 18 both pivot relative to seat 20 to move between a chair position as shown in FIG. 1 to a reclining position. Back 12 further includes a main portion 29, left wing 30 coupled to main portion 29, and a right wing 32 coupled to main portion 29. The main portion 29 of back 12 provides support to the back of person occupying the chair 10, while the wings 30, 32 provide lateral support to the person when the chair 10 is in a reclining position.

Back 12 is pivotably coupled to seat 20 and pivots about a generally horizontal axis 40 as shown by arrow 44. As will be discussed in further detail below, back 12 is driven by a single linear actuator (not shown in FIG. 1) which is coupled between back 12 and seat 20. This allows back 12 to be independently articulated so as to provide a person occupying chair 10 the ability to adjust the angle between back 12 and seat 20.

In addition, a left armrest 26 and a right armrest 28 are coupled to the seat 20 and are pivotable in multiple axes to maintain generally horizontal orientation as back 12 is pivoted to a reclining position and to allow armrests 26, 28 to be rotated to adjust the width of the effective seating area of chair 10. The left armrest 26 is pivotable about a generally horizontal axis 40 which is transverse to the seat 20 as shown by arrow 50 and a generally horizontal axis 36 as shown by arrow 52. Similarly, right armrest 28 is pivotable about axis 40 as shown by arrow 48 and a generally horizontal axis 34 as shown by arrow 46. As will be discussed in further detail below, the pivoting of the armrests 26, 28 about axis 40 also allows armrests 26, 28 to be pivoted between the horizontal orientation of FIG. 1 and an out-of-the-way vertical position (not shown in FIG. 1).

Leg support 18 is pivotably coupled to seat 20 and is pivotable about a generally horizontal axis 35 as indicated by arrow 42. Similarly to back 12, leg support 18 is driven by an independent actuator (not shown in FIG. 1) which permits the angle between leg support 18 and seat 20 to be adjusted between the chair position shown in FIG. 1 and a reclining position (not shown). In the illustrative embodiment of FIG. 1, the leg support 18 and the back 12 are independently adjustable so that a person reclining on chair 10 may adjust each to achieve any of a number of reclining positions and configurations.

In addition to operating as a reclining chair, chair 10 also functions as a lift assistance device to assist a person in transitioning between seated and standing positions. Seat 20 comprises a front portion 22 and a rear portion 24. In use during lifting, rear portion 22 lifts relative to base 14 and translates forwardly toward the leg support 18 while front portion 22 rotates about a generally horizontal axis 23 to move out of the way as a person is lifted to a standing position. The buttocks of the person are supported on the rear portion 24 in a near standing position so that egress from chair 10 is eased. To ingress, a person leans with their buttocks on rear portion 24 and the motion of the front portion 22 and rear portion 24 is reversed to move the person to a seated position. Further discussion of the mechanical operation of the lift mechanisms is provided in discussions of the various embodiments below.

Figure 2:
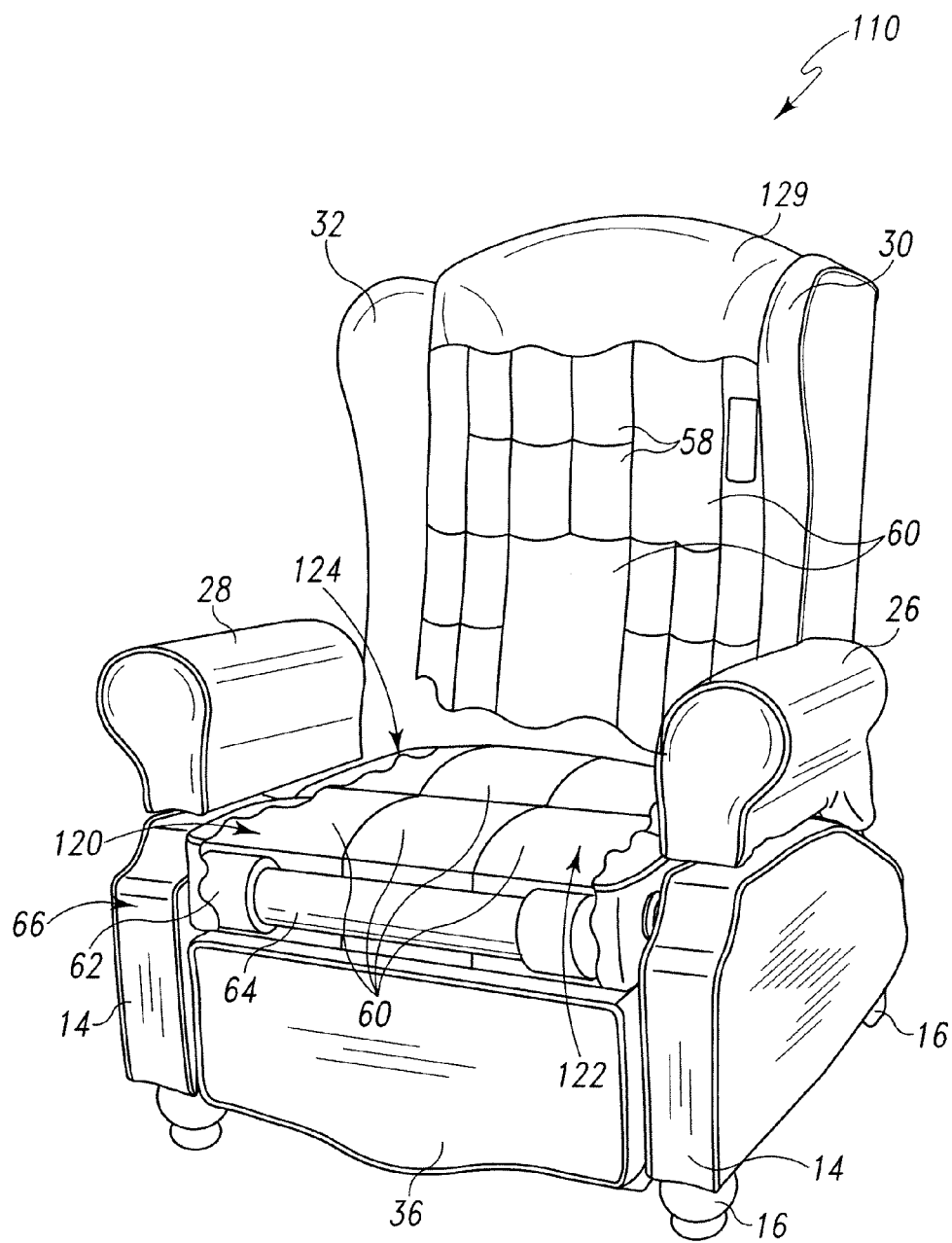
FIG. 2 is a perspective view of a chair with portions cut away, the chair having a massaging device in a one portion of the seat and air cells of various sized dispersed throughout support sections of the chair.
Figure 3:
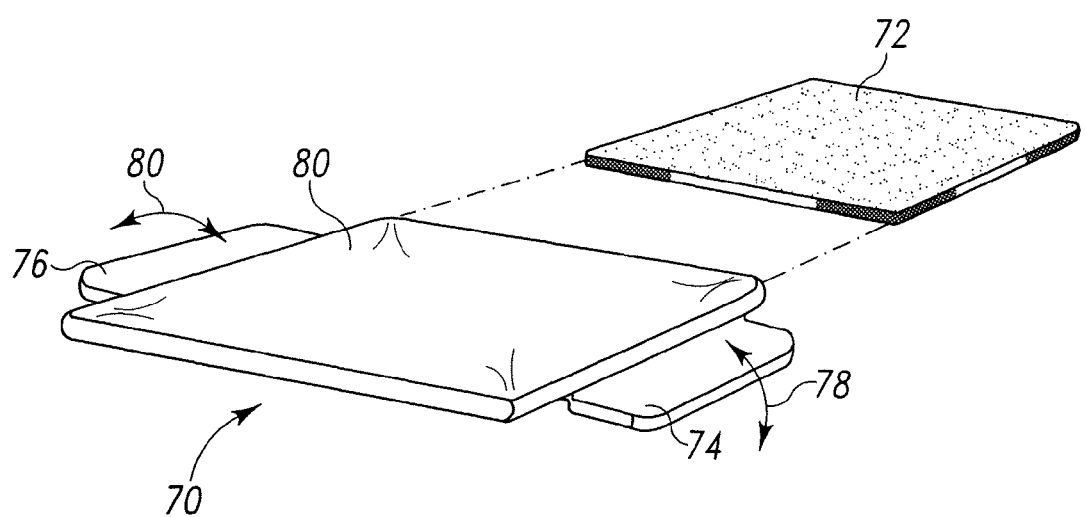
FIG. 3 is a washable pad for a seat portion of a chair with a removable moisture absorbent in portion and flaps used to retain the pad on the seat of a chair.

In the illustrative embodiment of FIG. 1, chair 10 has foam support members (not shown) covered by a fabric 54 in a manner well known in the art. Another embodiment of a chair 110 shown in FIG. 2 comprises various substantially air tight cells covered by fabric 54. In the illustrative embodiment of FIG. 2, the air cells are each plumbed to a source of forced air which regulates the pressure within the air cells the to control the pressure experienced by the skin of a person occupying the chair 110. A cellular air surface is discussed in an application titled "DYNAMIC CELLULAR PERSON SUPPORT SURFACE", U.S. application Ser. No. 11/204,632, filed Aug. 16, 2005 and hereby incorporated by reference herein in its entirety. Illustrative chair 110 has several small air cells 58 and several larger air cells 60 dispersed throughout the support areas of back 12 and seat 20. The leg support 18 of chair 110 comprises a foam support member covered by fabric 54. However, in some embodiments leg support 18 could comprise a system of air cells as support under fabric 54. In some embodiments, the seat 20, leg support 18, and back 12 could each comprise both air cells and foam support members.

The air cells 58, 60 may be selectively and rapidly inflated and deflated to provide massage to a person occupying chair 110. Also, the small air cells 58 may be interspersed with the large air cells 60 to provide differing levels of support to various portions of the body of a person occupying chair 110. The chair 110 also comprises a mechanical leg massager 66 to provide massage to the lower legs of a person occupying chair 110. The leg massager 66 comprises a motor 62 which drives a massage roller 64 through orbital rotational motion to impart vibratory massage upon the portion of a persons legs supported on front seat section 22.

Figure 4:
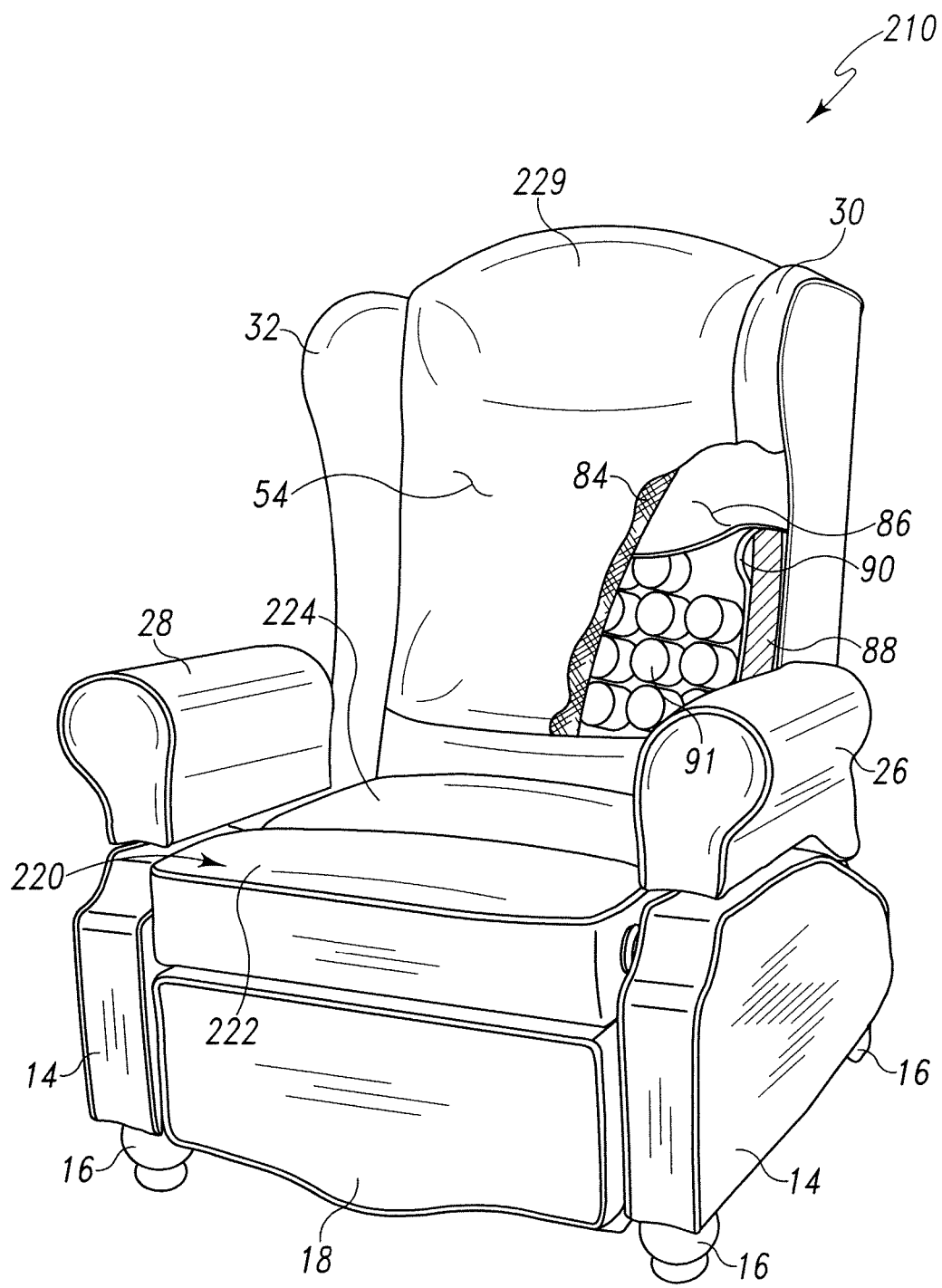
FIG. 4 is a perspective view of another chair having cylindrical air cells dispersed throughout support sections of the chair.

FIG. 4 shows another embodiment of a chair 210 which utilizes cylindrical air cells 91 dispersed within back 12, seat 20, and leg support 18. Air cells 91 are coupled to a base 90 which is supported on a foam member 88. Air cells 91 are covered by a retaining barrier 86 which is a fire retardant material, but may be a low friction shear cloth in some embodiments. Retaining barrier 86 is covered by an undulated fabric 84 which is covered by fabric 54. The undulating fabric 84 separates the fabric 54 from the retaining barrier 86 to provide an air gap therebetween to reduce the potential for moisture buildup and to assist in heat transfer from the skin of a person occupying the chair. Air cells 91 may be selectively and alternatively rapidly inflated and deflated to provide massage to a person occupying the chair.

Figure 5:
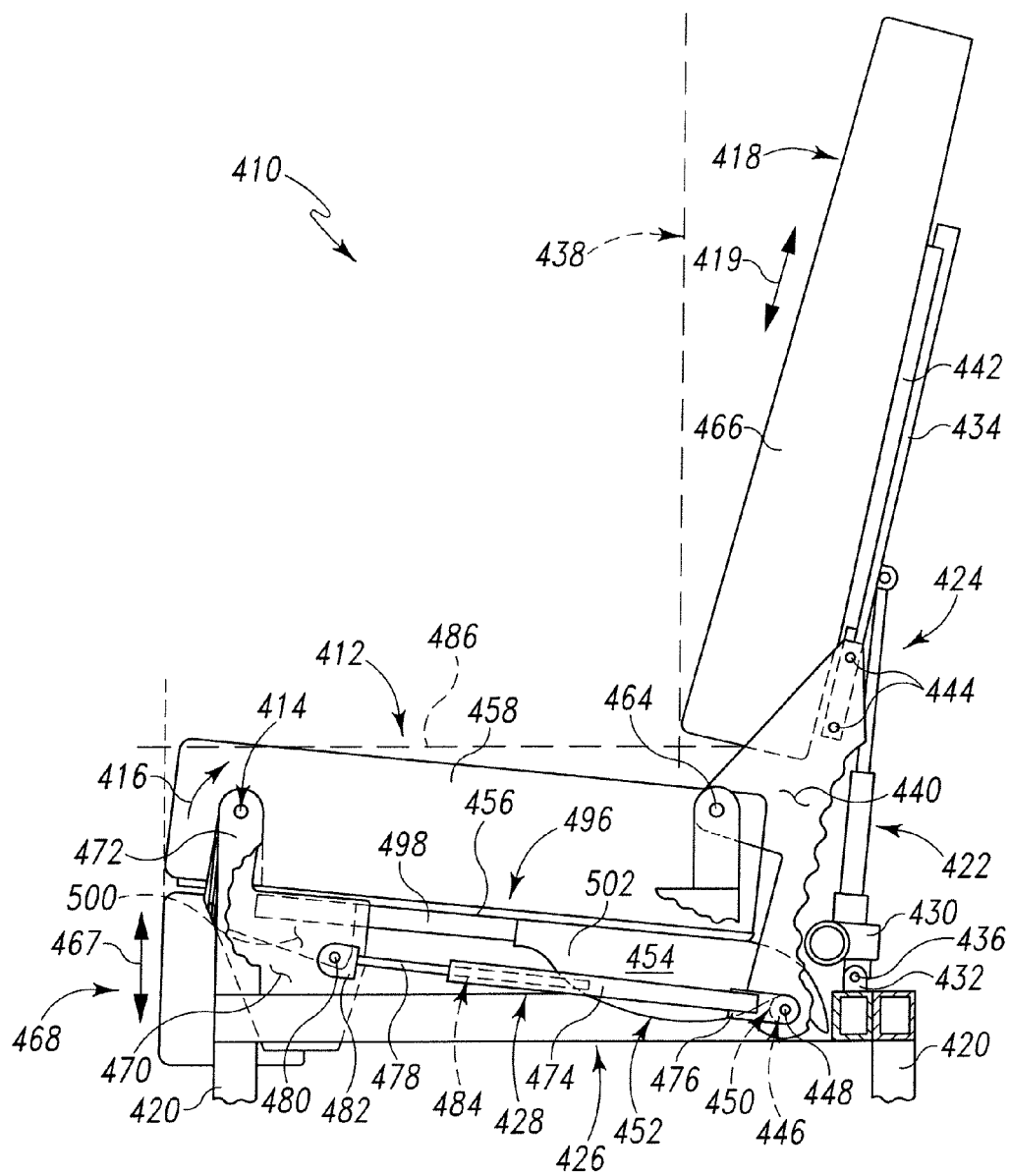
FIG. 5 is a side view of a chair with portions cut away, the chair having articulating sections driven by a single linear actuator.
Figure 6:
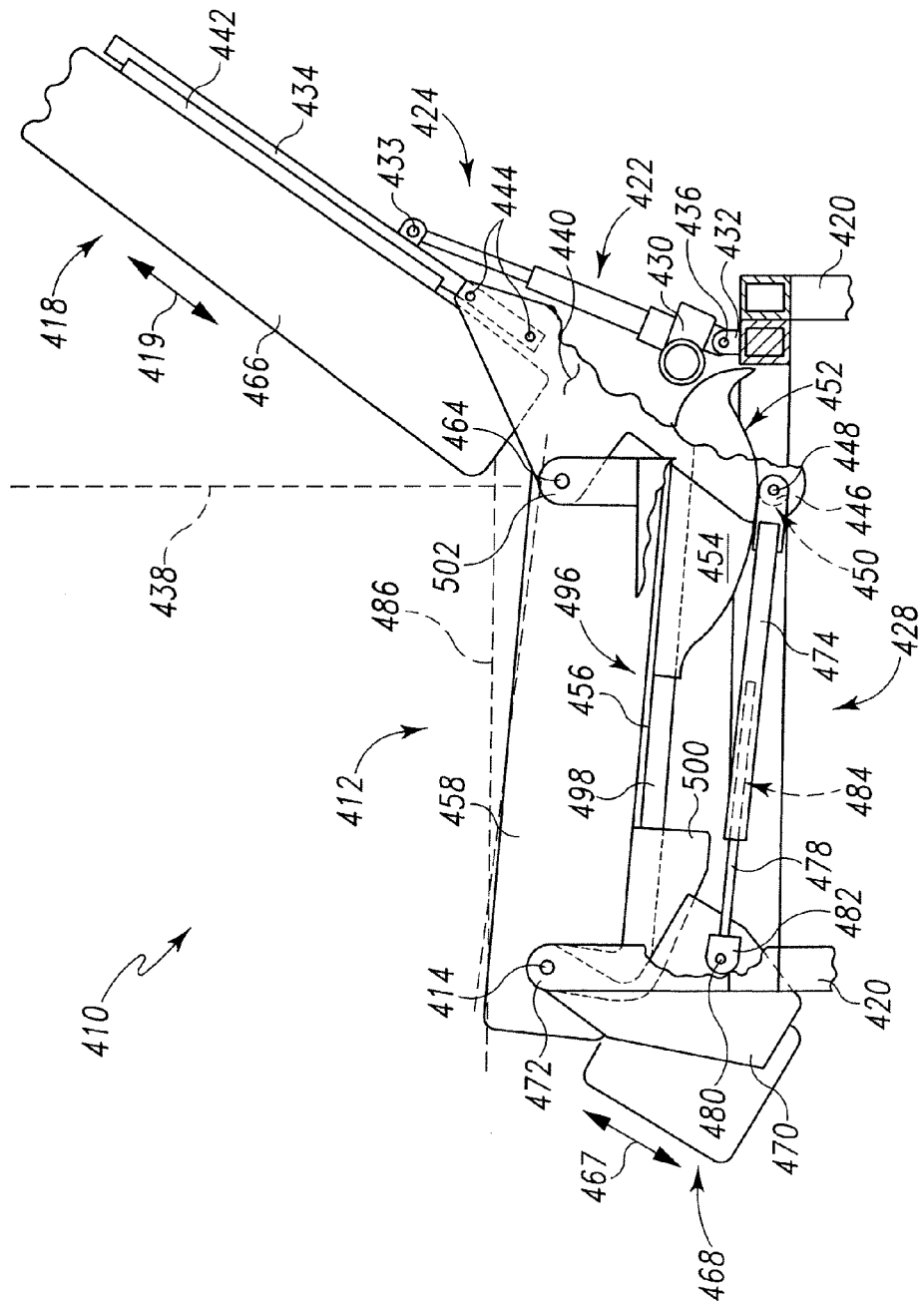
FIG. 6 is a side view of the chair of FIG. 5 with the chair in a partially articulated position.
Figure 7:
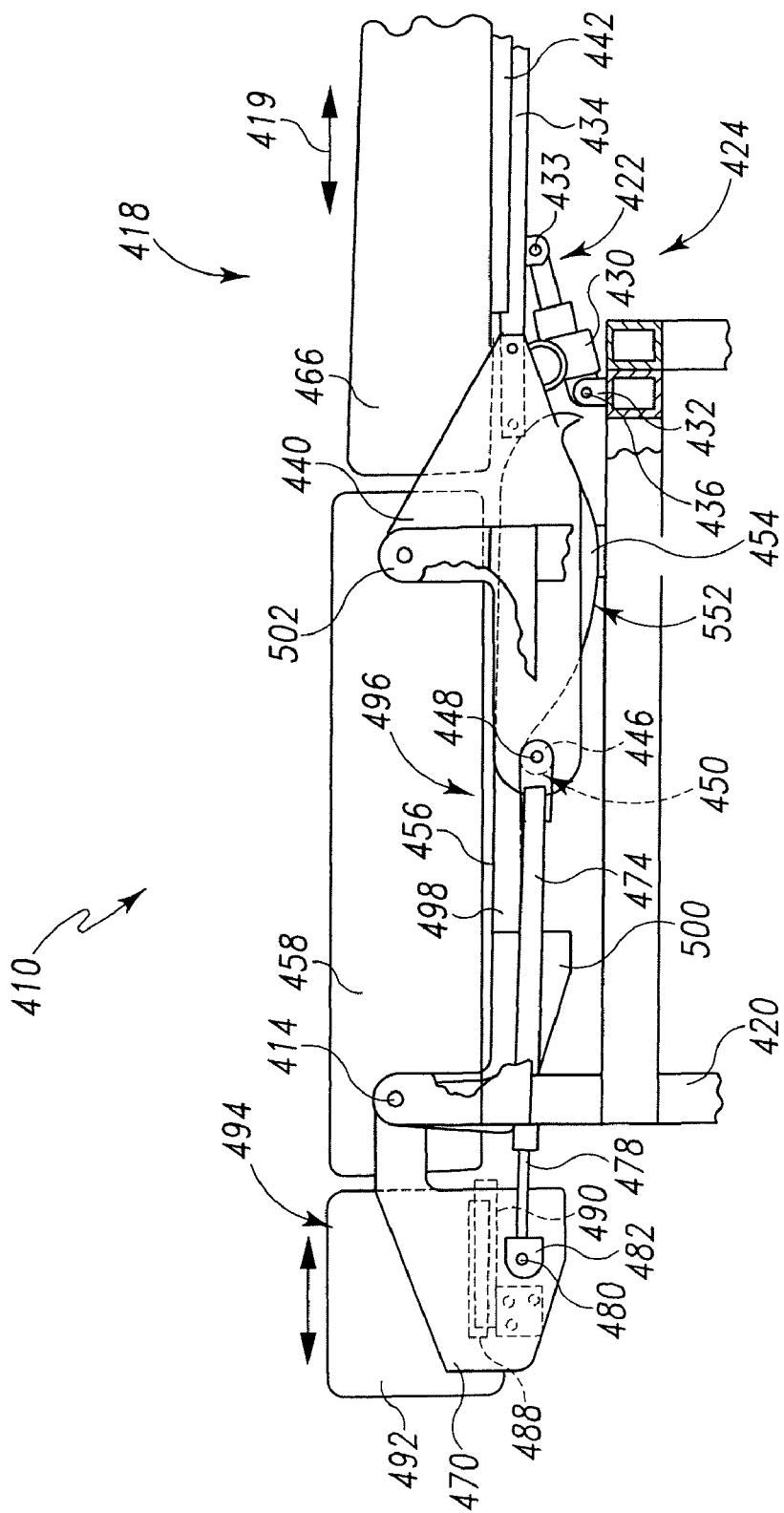
FIG. 7 is a side view of the chair of FIG. 5 with the chair in a fully reclined position.

Referring now to FIGS. 5-7, a chair 410 is shown and is configured so that the available surface area for supporting an occupant increases when the chair 410 is articulated from the sitting-up position shown in FIG. 5 to the supine position shown in FIG. 7. The increase of area of the support surface occurs during articulation because a portion of the seat 412 that is covered by the back 418 becomes uncovered when the 418 pivots downwardly from the sitting-up position.

In general, a seat 412 of chair 410 has a fixed pivot point at one end and oscillates at the opposite end, the oscillation driven by articulation of a back 418 as chair 410 is articulated from the sitting-up position to a supine position. For reference, the dotted lines on FIG. 5 identify the relative positions of the surfaces of back 418 and seat 412 when chair 410 is in the sitting-up position. In FIG. 5, chair 410 has been articulated slightly away from the sitting-up position and progressive positions of chair 410 are shown in subsequent FIGS. 30 and 31.

Chair 410 includes a frame 420 which may support chair 410 directly on an underlying floor, be supported by another frame such as a base frame, for example, or may have casters coupled to the lower portion of frame 420. In operation, articulation of chair 410 relative to frame 420 is facilitated by four linkage groups; an articulation control linkage 422, a back linkage 424, a seat linkage 426, and a lost motion linkage 428.

The articulation control linkage 422 comprises a member which is extendable or retractable and connected to the frame 420 and one of the other linkage groups 424, 426, or 428. In the illustrative embodiment, the articulation control linkage comprises a linear actuator 430 coupled to frame 420 and a flange 432 of back linkage 424. Near the back of frame 420, a bracket flange 432 is coupled to frame 420. Linear actuator 430 is pivotably coupled at a first end to the bracket flange 432 through a pivot pin 436. A second bracket flange 432 is coupled to a fixed back frame 434 of back linkage 424 and linear actuator 430 is pivotably coupled to back frame 434 bracket flange 432 through a pivot pin 436. Linear actuator 430 acts as an articulation control member and extension or retraction of linear actuator 430 thereby drives articulation of back 418 of back linkage 424 about pivot 464. When linear actuator 430 is in its fully extended position, back 418 is in its full sitting-up position corresponding to a dotted line 438. Retraction of linear actuator 430 results in articulation of back 418 through 90 degrees of articulation, the position corresponding with the supine position shown in FIG. 7.

Back linkage 424 comprises a back pivot plate 440 pivotably coupled to back pivot bracket 26 at a pivot 464 and free to pivot relative to back pivot bracket 26 and thereby relative to frame 420. Back 418 is coupled to back pivot plate 440 through a moving back frame 442 and a fixed back frame 434 that is coupled to the plate 440 through two fasteners 444. Moving back frame 442 is slidingly coupled to fixed back frame 434 and is moveable relative fixed back frame 434. Coupling of back 418 to back pivot plate 440 allows back 418 to pivot relative to back pivot bracket 440 and thereby frame 420.

Back linkage 424 further comprises a cam driver 446 coupled to back pivot plate 440. Illustrative cam driver 446 is a roller which is rotatably coupled to back pivot plate 440 by a pivot pin 448, with cam driver 446 free to rotate about pivot pin 448. In other embodiments, the cam driver may be a non-rotatable slider. An outer diameter surface 450 of cam driver 446 engages an edge surface 452 of a cam plate 454 of seat linkage 426.

Seat linkage 426 further comprises seat 412 supported on a seat frame 496. Seat frame 496 includes a cushion support member 456 which supports a seat cushion 458, an elongated frame member 498 which is fixed to member 456, a seat pivot plate 500 which is fixed to member 498 and which is pivotably coupled to a front pivot bracket 472 of frame 420, and a cam plate 454 which is fixed to frame member 498. The result is that seat linkage 426 includes seat 412 being supported through cam plate 454 by cam driver 446. As back pivot plate 440 of back linkage 424 pivots about pivot 464, cam driver 446 moves along edge surface 52 of cam plate 454. Seat pivot plate 500 is coupled to a front pivot bracket 472 at a pivot 414 such that the seat 412 pivots relative to pivot 414. The oscillation of seat 412 of seat linkage 426 as chair 30 articulates is defined by the interaction of cam plate 454 of seat linkage 426 and cam driver 446 of back linkage 424.

Figure 30:
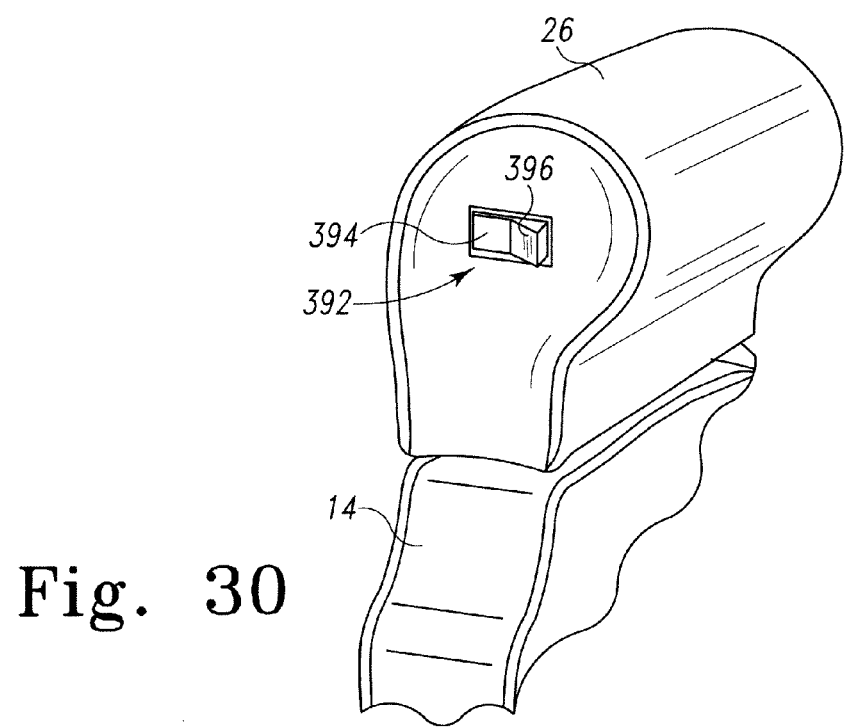
FIG. 30 is a fragmented perspective view of a portion of a chair having a toggle switch for controlling the articulation of the chair coupled to an armrest.

In one embodiment of a reclining chair 410 shown in FIG. 5, during a first portion of articulation of chair 410 from the sitting-up position to the supine position, the seat 412 pivots about pivot 414 in a first direction indicated by arrow 416 to lower the rear of seat 412 which thereby provides clearance for back 418 to pivot past seat 412. Due to the shape of cam plate 420, seat 412 begins to be raised after chair 410 reaches an intermediate position, as can be seen in FIG. 30, until eventually seat 412 is returned to its horizontal position when the chair 410 is in the supine position shown in FIG. 31. This also results in exposing a portion of seat 412 which is covered by a back 418 when chair 410 is in the sitting-up position which thereby increases the support surface area created by seat 412 and back 418 during articulation from the sitting-up position to the supine position. Because moving back frame 442 is free to move relative to fixed back frame 434, articulation to the supine position may result in back 418 being pushed away from seat 412 by the shear forces of an occupant during articulation.

Figure 8:
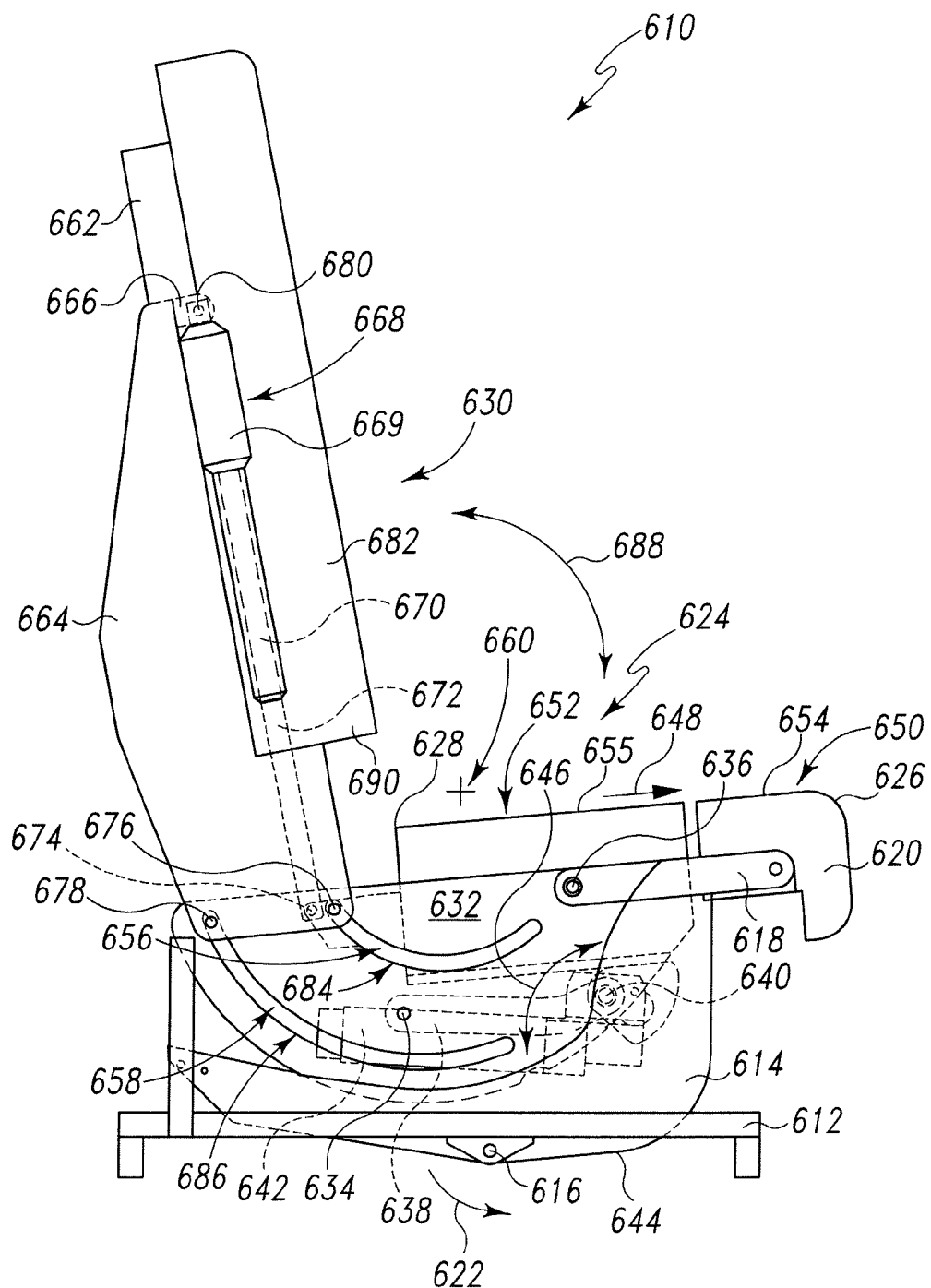
FIG. 8 is a side view of another embodiment of a chair with portions cut away, the chair having an articulating back and a lift seat.
Figure 9:
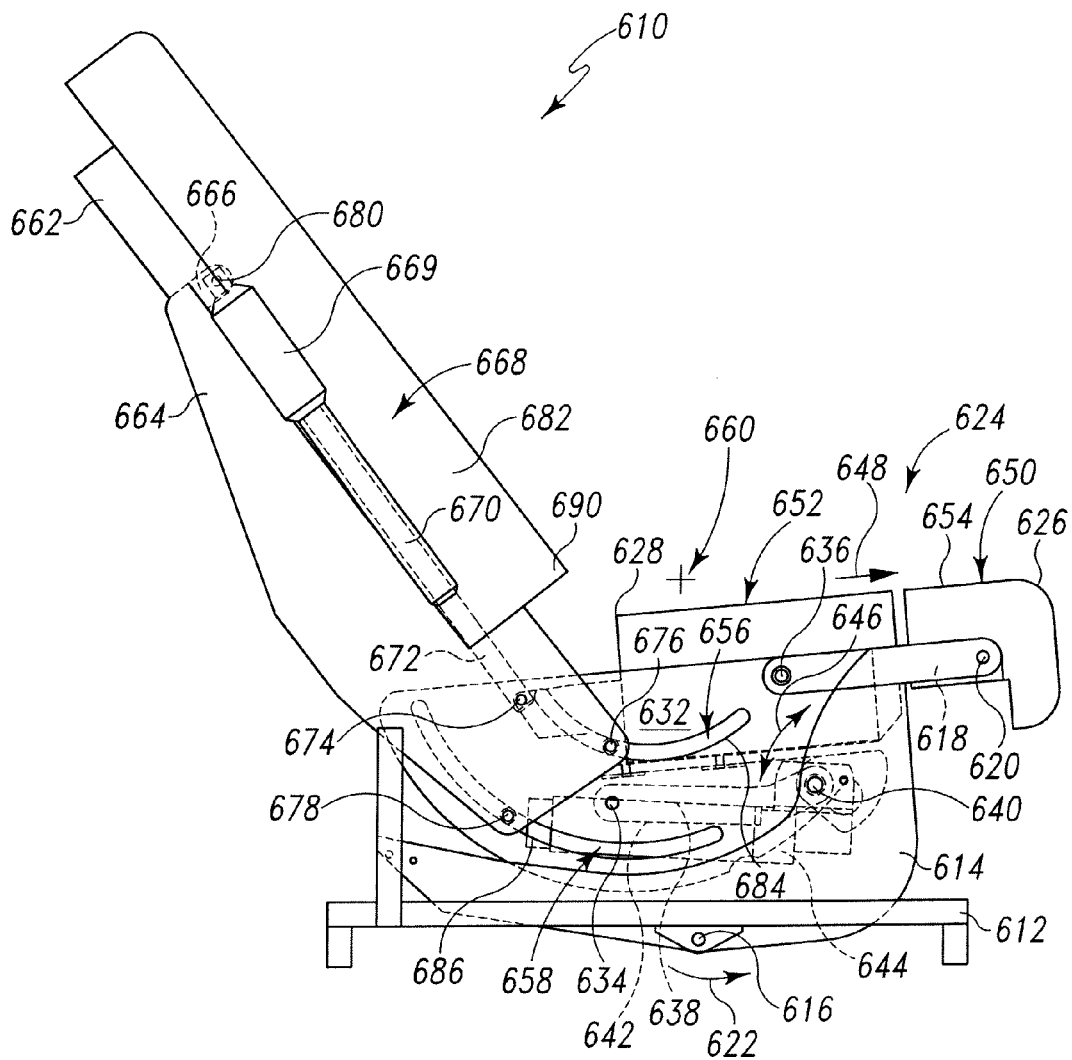
FIG. 9 is a side view of the chair of FIG. 8 showing the back in an articulated position.

In the illustrative embodiment of FIGS. 5-7, moving back frame 442 is free to move relative to fixed back frame 434. However, moving back frame 442 may be connected to fixed back frame 434 by a spring to provide bias to urge moving back frame 442 to an extended position. Referring now to FIG. 7, moving back frame 442 may be coupled to frame 420 such that pivoting of back pivot plate 440 pushes moving back frame 442 away from seat 412. FIG. 8 shows an additional back slide link 460 pivotably coupled at a first end to back pivot bracket 462 through a pivot pin 436 and pivotably coupled at a second end to moving back frame 442 through another pivot pin 436. The pivotable connection between back slide link 460 and pivot bracket 462 is vertically above a pivot 464. As back pivot plate 440 pivots from the sitting-up position, back slide link 460 pulls moving back frame 442 and thereby back 418 toward seat 412. Likewise, when back pivot plate 440 pivots about pivot 464 from a supine position, back slide link 460 pushes moving back frame 442 and thereby back 418 away to assist in providing clearance between the back surface 466 and seat 412. The result is that back linkage 424 includes pivoting of fixed back frame 434 about pivot 464 and sliding of moving back frame 442 relative to fixed back frame 434. In some embodiments, a linear actuator may actuate to move moving back frame 442 relative to fixed back frame 434.

Referring again to FIG. 5, chair 410 also includes a foot section 468 which is articulable between a first position shown in FIG. 5 and a second position shown in FIG. 7. The foot section 468 is coupled to a frame (not shown) which, in turn, is coupled to a foot pivot plate 470 which is pivotably coupled to a front pivot bracket 472 at pivot 414 and is pivotable about pivot 414 relative to front pivot bracket 472 and thereby, frame 420. Thus, the seat 412 and the foot section 468 pivot relative to frame 420 about the same pivot axis at pivot 414. Foot pivot plate 470 is coupled to back pivot plate 440 by the lost motion linkage 428. Lost motion linkage 428 comprises a tube 474 coupled to a pivot member 476 which is pivotably coupled to the back pivot plate 440 at a pivot pin 436. Lost motion linkage 428 further comprises a rod 478 telescopically received into tube 474. Rod 478 is coupled to a member 482 which is pivotably coupled to the foot pivot plate 470 at a pivot pin 480.

Tube 474 has a blind cylindrical cavity 484 which receives rod 478. When chair 410 is in the supine position shown in FIG. 7, end 478 is retracted into cavity 484 to its maximum extent such that an end 486 of end 478 engages a stop inside cavity 484 of tube 474. In this position, the foot section 468 is supported by tube 474 in a raised position. As chair 410 articulates to the sitting-up position, the motion of back pivot plate 440 is transferred to lost motion linkage 428 tending to pull tube 474 away from foot section 468. The weight of foot section 468 and any load placed thereon, tend to urge foot section 468 to pivot downwardly toward the retracted position of foot section 468 as shown in FIG. 5. However, in some embodiments, a spring may be coupled to foot section 468 and frame 420 to provide a bias to urge foot section 468 to retract.

Foot section 468 reaches its fully retracted position when chair 410 is in approximately the position shown in FIG. 5, whereas seat 412 and back 418 have additional range of motion which may be accomplished through additional articulation so that back 418 achieves a position associated with dotted line 438 and seat 412 achieves a position associated with dotted line 486. In the fully retracted position, foot section 468 rests on frame 420. During the remaining articulation of back pivot plate 440, the end 486 of end 478 separates from the stop inside cavity 484 and telescopically extends from tube 474. In this way, back 418 and seat 412 continue to articulate while foot section 468 remains stationary. Likewise, when chair 410 articulates from the full sitting-up position represented by dotted lines 438 and 486, foot section 468 remains stationary during some articulation of the back 418 and seat 412, approximately 15 degrees, for example. Eventually, continued articulation of chair 410 results in end 478 engaging the termination of cavity 484 and foot section 468 follows the motion of back 418 and seat 412. Thus lost motion linkage 428 provides a lost motion connection between back 418 and foot section 468.

Referring to FIG. 7, foot section 468 is mounted to foot pivot plate 470 through slides 488, 490 which permit foot section 468 to translate along the slides 488, 490 during articulation of foot section 468 in a manner similar to the manner in which moving back section 442 translates during articulation. A fixed slide 488 is coupled to foot pivot plate 470. A moving slide 490 is mated with fixed slide 488 and a foot section surface 492 is coupled to moving slide 490. When foot section 468 articulates up, friction between the legs of an occupant and a foot section surface 492 urges foot section surface 492 to slide away from seat 412. This helps reduce shear on the legs of an occupant during articulation. The moving slide 490 may be coupled to the frame 420 through a spring (not shown) to bias the foot section 468 to a retracted position. Also, the foot section surface 492 or moving slide 490 may be coupled to frame 420 such that articulation of foot pivot plate 470 moves foot section surface 184 relative to foot pivot plate 470.

Figure 34:
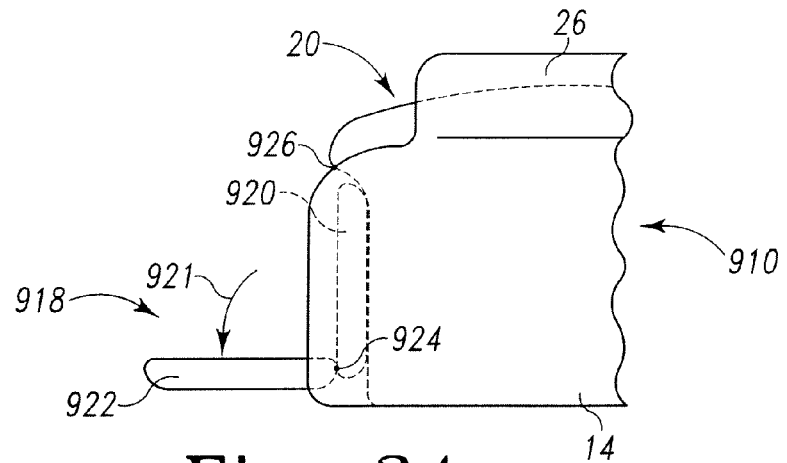
FIGS. 34-36 are fragmented side views of a chair having an articulating leg support, the leg support having multiple portions which pivot relative to each other to support the legs and feet of an occupant of the chair.
Figure 35:
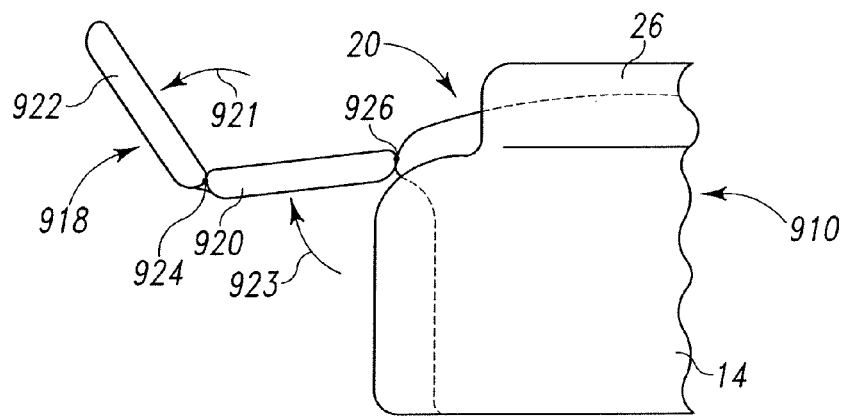
Figure 36:
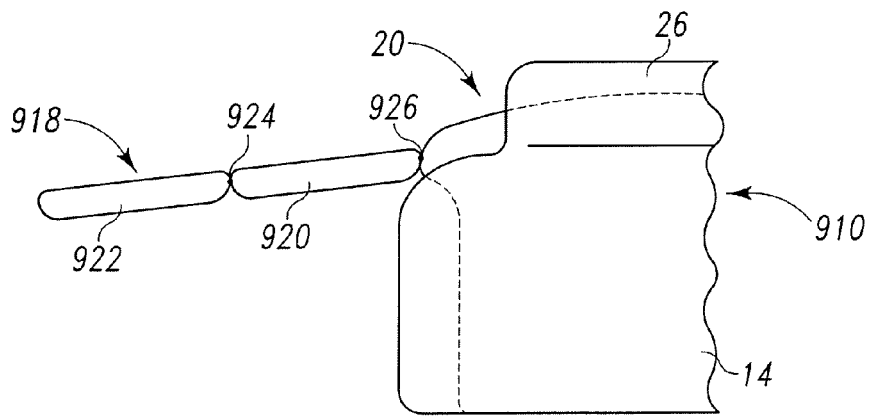

In another embodiment of a foot section 918 of a chair 910, shown in FIGS. 34-36, foot section 918 comprises two portions; a first portion 920 pivotably coupled to a frame 14 of chair 910 at a pivot 926 and a second portion 922 pivotably coupled to first portion at pivot 924. Foot section 918 operates in a manner similar to the foot section 468 of FIG. 7 to provide leg support for a person supported on chair 910. Additionally, leg support 918 is articulable to provide additional support features. When foot section 918 is in the lowered position, second portion 922 may be pivoted about pivot 924 to the position shown in FIG. 34 to provide support to the feet of a person supported on chair 910. Second portion 922 pivots about pivot 924 independently of the pivoting of 920 about pivot 926. Therefore, portion 922 may be pivoted to any of a number of positions to provide support to a person on chair 910. For example, FIG. 35 shows portion 920 pivoted to a full recline position with portion 922 pivoted to an oblique angle relative to portion 920 to provide support for feet of a person seated on chair 910. However, FIG. 36 shows portion 922 pivoted approximately 180 degrees about pivot 924 such that foot section 918 is in an extended configuration to provide a longer support surface for a person supported on chair 910.

Figure 42:
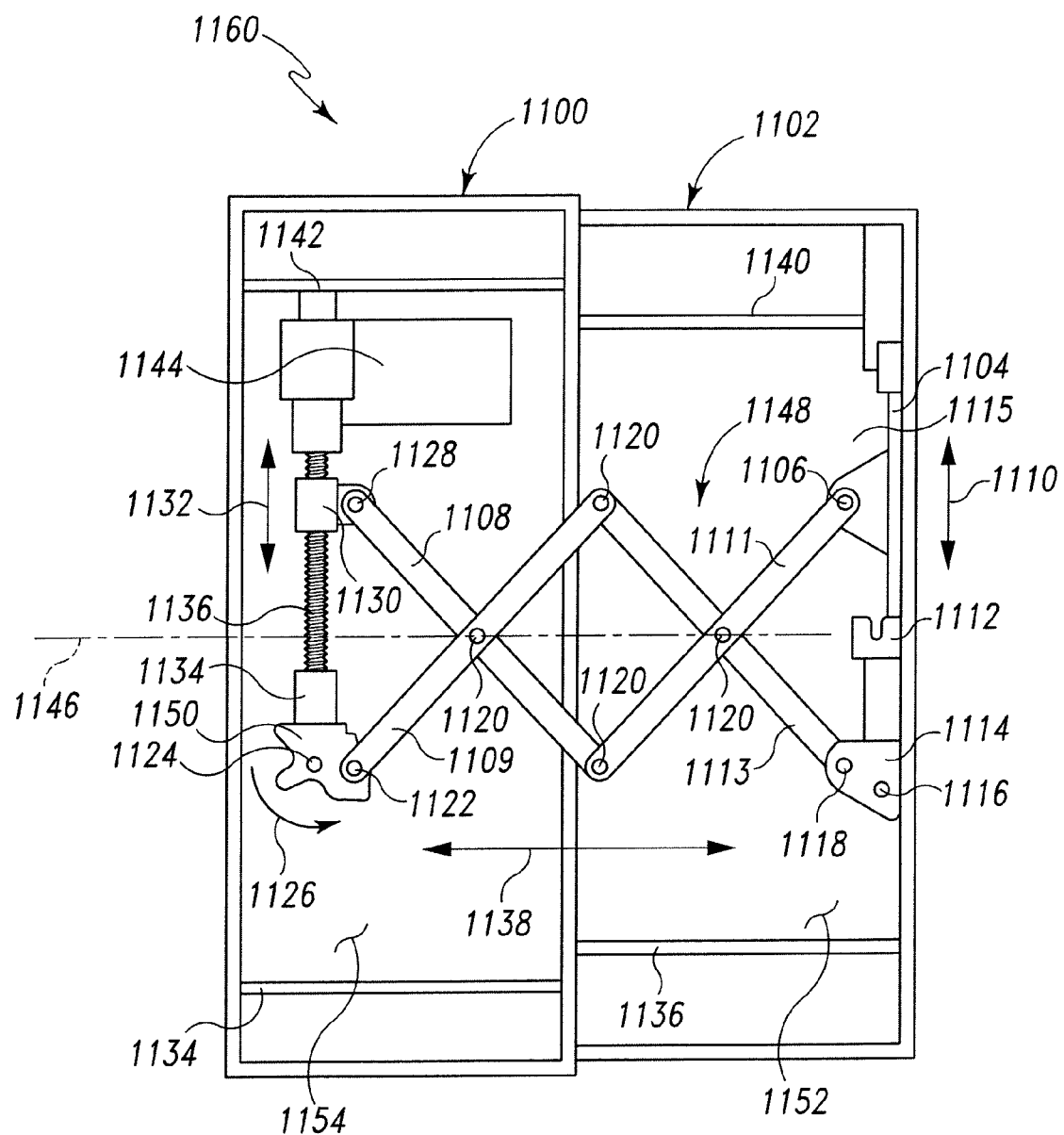
FIG. 42 is a bottom view of an extendable let support for a chair.

Another embodiment of an extending foot section 1160 is shown in FIG. 42. Foot section 1160 comprises a main portion 1100 and a moving portion 1102 which translates relative to main portion 1100 between an extended position and a retracted position. Foot section 1160 further comprises a motor 1144 driving a drive screw 1136 to drive the extension and retraction of a linkage assembly 1148 which thereby drives movement of moving portion 1102 relative of main portion 1100.

Motor 1144 is coupled to main portion 1100 and is configured to rotate drive screw 1136 to drive a drive nut 1130 along drive screw 1136. Drive screw 1136 is supported in a bushing 1134 coupled to main portion 1100 through a pivot 1124. A bracket 1150 is pivotably coupled to bushing 1134 and pivotable about pin 1124 as depicted by arrow 1126. Movement of drive screw 1130 relative bracket 1150 activates results in motion of linkage 1148.

Specifically, a link 1108 is pivotably coupled to drive screw 1130 through a pivot 1128 and a second link 1109 is coupled to bracket 1150 through a pivot 1122. The links 1108 and 1109 are pivotably coupled through a pivot pin 1120. Link 1108 is pivotably coupled to another link 1111 through another pivot pin 1120. Link 1109 is pivotably coupled to yet another link 1113 through yet another pivot pin 1120 and links 1111 and 1113 are pivotably coupled at still another pivot pin 1120 such that links 1108, 1109, 1111, and 1113 form a scissors linkage.

Link 1111 is pivotably coupled to a follower 1115 through a pivot 1106 and link 1113 is pivotably coupled to a bracket 1114 through a pivot 1118. Bracket 1114 is pivotably coupled to moving portion 1102 through another pivot 1116. As drive nut 1130 is driven along drive screw 1136 toward bushing 1134, follower 1115 slides along a guide 1104. Additionally, bracket 1150 pivots on pivot 1124 and link 1109 pivots on pivot 1122 and bracket 1114 pivots on pivot 1116. This results in the articulation of moving portion 1102 relative to main portion 1100 to extend foot section 1160. In a similar manner, movement of drive nut 1130 away from bushing 1134 results in the retraction of mechanism 1148 and thereby retracts foot section 1160.

Figure 37:
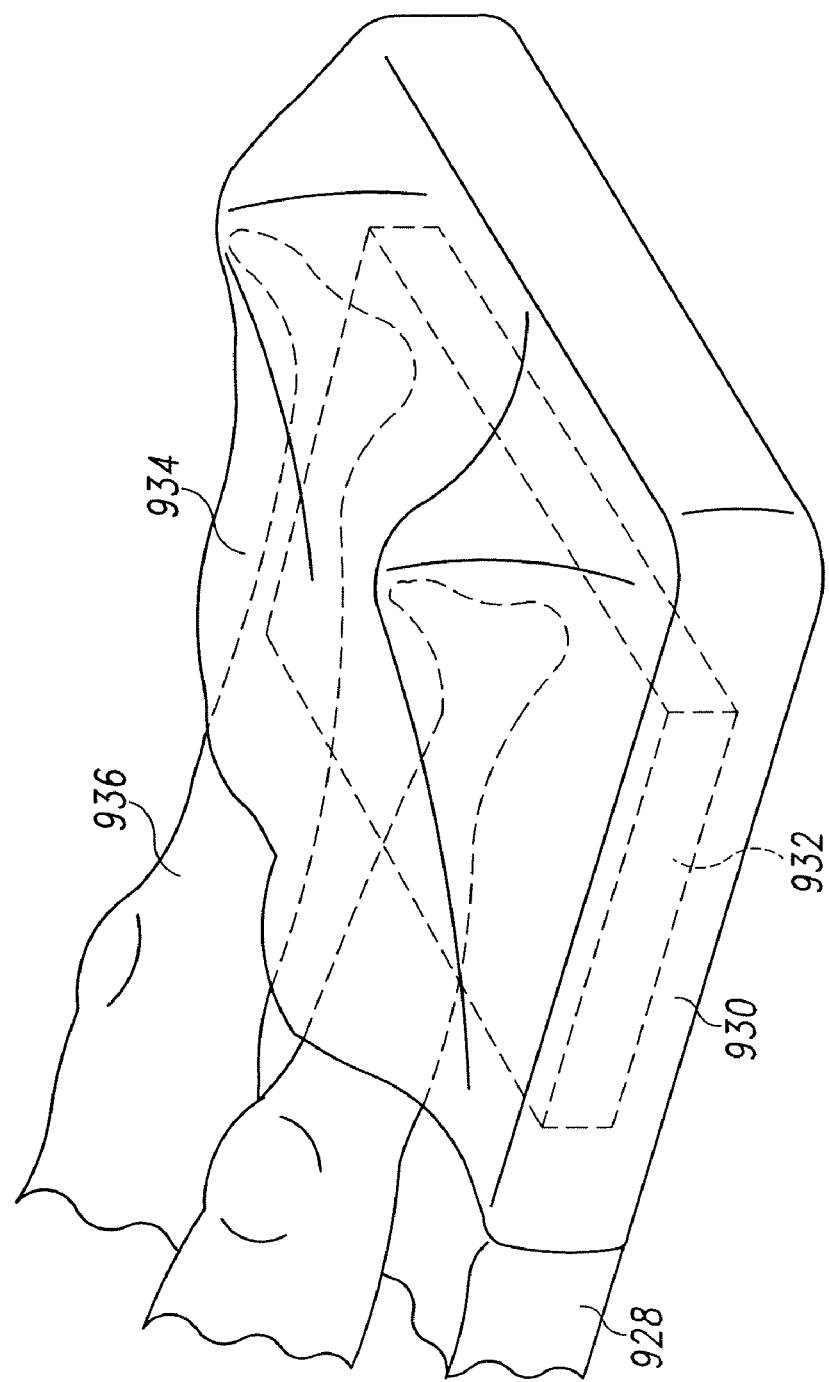
FIG. 37 is a fragmented perspective view of a leg support of chair, the leg support including a heating element to warm the feet of an occupant of the chair.

FIG. 37 shows a foot section 930 wherein the foot section 930 comprises an integrated heating apparatus 932 and a cover 934. An occupant 936 inserts their feet into the cover 934 which serves to retain heat generated by the heating apparatus 930 shown contained within foot section 930. In the illustrative embodiment of FIG. 37, cover 934 has a closed end to form an envelope around the feet of occupant 936 shown in phantom. In other embodiments, cover 934 may be open to permit freedom of movement of the occupant's feet. The heating apparatus 932 of the illustrative embodiment comprises multiple resistive heating elements which generate heat when an electrical current is applied. In some embodiments, heat may be delivered through warm air delivered to air cells in the foot section 930 from a central source of warm air. In still other embodiments, the heating apparatus 932 may comprise a self-contained heating element to warm air delivered to air cells in the foot section 930.

Figure 38:
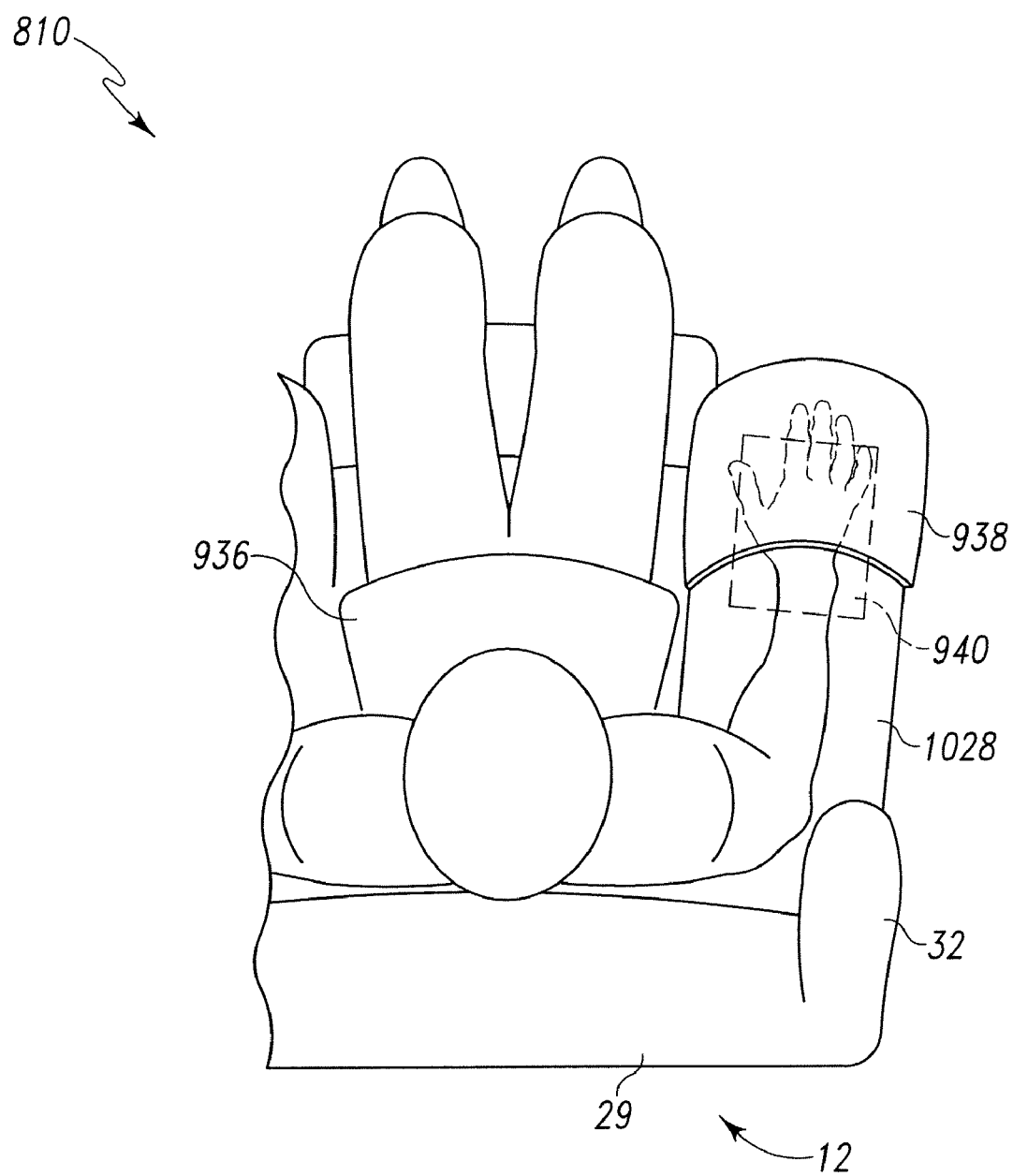
FIG. 38 is fragmented top view of a person seated on a chair, the chair including a heating element in the armrest to warm the hand of the person.

Similar to the foot rest 930, an armrest 1028 comprising an integrated heating apparatus 940 and a cover 938 is shown in FIG. 38. An occupant 936 inserts their hand into the cover 938 which serves to retain heat generated by the heating apparatus 940 shown contained within armrest 1028. In the illustrative embodiment of FIGS. 56 and 57, cover 938 has a closed end to form an envelope around the hand of occupant 936 shown in phantom. In other embodiments, cover 938 may be open at both ends to permit freedom of movement of the occupant's hand. The heating apparatus 940 of the illustrative embodiment comprises multiple resistive heating elements which generate heat when an electrical current is applied. In some embodiments, heat may be delivered through warm air delivered to an air cell element from a central source of warm air. In still other embodiments, the heating apparatus 940 may comprise a self-contained heating element to warm air delivered to the armrest 1028 support surfaces.

In another embodiment, shown in FIGS. 8-11, a chair 610 operates as both a reclining chair, including a tilt function, and a lift chair. Chair 610 comprises a frame 612 supporting a pivot frame 614 on a pivot 616. Pivot frame 614 is coupled to a link 618 at a pivot 620 and is pivotable about pivot 616 as indicated by an arrow 622. In FIG. 8, pivot frame 614 is in a home position wherein a seat 624 is positioned at approximately 5 degrees from horizontal with a front 626 being higher with respect to frame 612 than a back 628 of seat 624. Pivoting of pivot frame 614 relative to frame 612 in the direction of arrow 622 provides a recline position without articulation of any of the members of chair 610.

Pivot frame 614 supports a side member 632 through a pivot 634 and a pivot 636. Pivot 636 couples link 618 to side member 632 and link 618 is coupled to pivot frame 614 and acts as a follower to control movement of side member 632 relative to pivot frame 614. Pivot 634 couples side member to a link 638 which is coupled to an output 640 of a drive 642. Drive 642 is coupled to a member 644 which is coupled to pivot frame 614 and supports drive 642. Drive 642 drives output 640 rotationally as indicated by an arrow 646.

Articulation of drive link 638 as driven by drive 642 results in the movement of side member 632 relative to pivot frame 614. This movement is controlled by follower 618 so that side member 632 raises relative to pivot frame 614 and moves forward in the direction depicted by arrow 648. A front seat portion 650 is coupled to follower 618 such that front seat portion 650 pivots about pivot 620 as follower 618 pivots about pivot 620. The combined control of the movement of side member 632 relative to pivot frame 614 exercised by drive link 638 and follower 618 results in a surface 654 of front seat portion 650 rotating from the upwardly facing orientation of FIG. 8 to a frontwardly facing orientation of FIG. 10. A person occupying chair 610 is transitioned from a sitting-up position to an egress position. In the sitting-up position, the buttocks and upper thighs of the person are generally supported by a rear seat portion 652 which supported on and coupled to side member 638. The lower thighs of the person are supported on the front seat portion 650 in the sitting-up position. As the side member 638 is lifted by motor 642, the support for the lower thighs transitions away and the buttocks and upper thighs are moved in the direction of arrow 648. In addition, rear seat portion 652 is raised so that a person supported on seat 624 transitions from a fully sitting position to a position that can be characterized as leaning with their buttocks supported on rear seat portion 652. This allows the person to make a reduced effort egress from the chair 610. The pivoting of front seat portion 650 eliminates the interference of front seat portion 650 with egress.

In addition to the articulation of front seat portion 650 and rear seat portion 652 described above, chair 610 also includes an articulating back 630 which articulates relative to side member 632 and thereby, rear seat portion 652. The motion of back 630 relative to rear seat portion 652 is a compound motion due to the shape of two guides 656 and 658. An upper guide 656 has the shape of a radial arc centered on an axis 660. A lower guide 658 has the shape of an elliptical arc having a shape that diverges from upper guide 656 as the two arcs progress.

Back 630 comprises a frame 662, a back pivot plate 664 coupled to frame 662 and a support section 682 coupled to frame 662. A first roller 676 is pivotably coupled to back pivot plate 664 and engaged with upper guide 656 to roll along a surface 684 of guide 656 during articulation of back 630. A second roller 678 is pivotably coupled to back pivot plate 664 and engaged with lower guide 658 and rolls along a surface 686 of lower guide 658 during articulation of back 630.

Articulation of back 630 is driven by a linear actuator 668 which includes a motor 669, and outer tube 670, and a rod 672 which moves telescopically relative to tube 670 as it is driven by motor 669. A mounting bracket 666 is coupled to back pivot plate 664 and linear actuator 668 is pivotably coupled to mounting bracket 666 through a pivot 680. The rod 672 of linear actuator is pivotably coupled to side member 632 through a pivot 674. As rod 672 extends, the back 630 articulates relative to side member 632 as the rollers 676 and 678 roll along edges 684 and 686 of the guides 656 and 658. Because of the divergent shapes of guides 656 and 658, back 630 articulates in a compound motion which includes both rotational and translational aspects to reduce the shear experienced by a person seated on the chair during reclining of the back 630 of chair 610 by generally matching the movement of the back of the person relative to the their buttocks while moving from a generally sitting-up position to a generally supine position.

In a generally sitting-up position shown in FIG. 8, back 630 is positioned such that an angle represented by arrow 688 is approximately 95 degrees so that a person seated in chair 610 is in a slightly reclined position. The back 630 articulates through a range of motion of approximately 80 degrees so that the angle between seat 624 and back 630 is approximately 170 degrees with the seat 624 and back are each angled at approximately 5 degrees from horizontal. The relative motion is represented by a second position shown in FIG. 9 where it can be seen that the relative position of rollers 676 and 678 have diverged and a lower end 690 of support section 682 has moved closer to the back 628 of seat 624. The relative movement of lower end 690 to back 628 is a result of the compound movement of back 630 relative to seat 624.

Additional movement of chair 610 is accomplished by pivoting pivot frame 614 relative to frame 612 about pivot 616. Seat member 632 is supported on pivot frame 614 and supports seat 624 and back 630 so that any pivoting of pivot frame 614 relative to frame 612 results in tilting the seat 624 and back 630 in unison. The pivoting of pivot frame 614 relative to frame 612 is driven by a linear actuator 694 (seen in FIG. 10) which is pivotably coupled to frame 612 at a pivot 692 and pivotably coupled to pivot frame 624 at a pivot 696. The linear actuator 694 comprises a motor 702, an outer tube 700, and a rod 698 which is driven by the motor 702 to move telescopically relative to outer tube 700. Retraction of rod 698 within outer tube 700 results in pivoting of pivot frame 614 about pivot 616 to place the seat 624 and back 630 in a reclined position relative to the home position of FIG. 8.

Chair 610 also includes a armrest 704 which is positioned so that a lower surface 706 of armrest 704 so that it engages the surfaces 654 and 655 of front seat portion 650 and rear seat portion 652 respectively when the armrest 704 is in a lowered position. In order to match of the compound motion of back 630 relative to seat 624 such that armrest 704 maintains a constant relationship with the surfaces 654 and 655, armrest 704 is coupled to back pivot plate 664 through a linkage 708. Lost motion linkage 708 comprises a main link 710 pivotably coupled to a main body 712 of armrest 704 at a pivot 714. Main link 710 is pivotably coupled to a support plate 716 at a pivot 718. A cavity 720 within main body 712 provides clearance to permit movement of main link 710 within main body 712 during articulation of back 630 relative to seat 624. As back 630 articulates from the sitting-up position of FIG. 8 to a reclined position, main link 710 pivots about pivot 718 in direction of arrow 722 (see FIG. 10). This results in the translation of armrest 704 relative to seat 624 backwardly in the direction of arrow 649 so that lower surface 706 maintains engagement with surfaces 654 and 655 during articulation of back 630.

Figure 10:
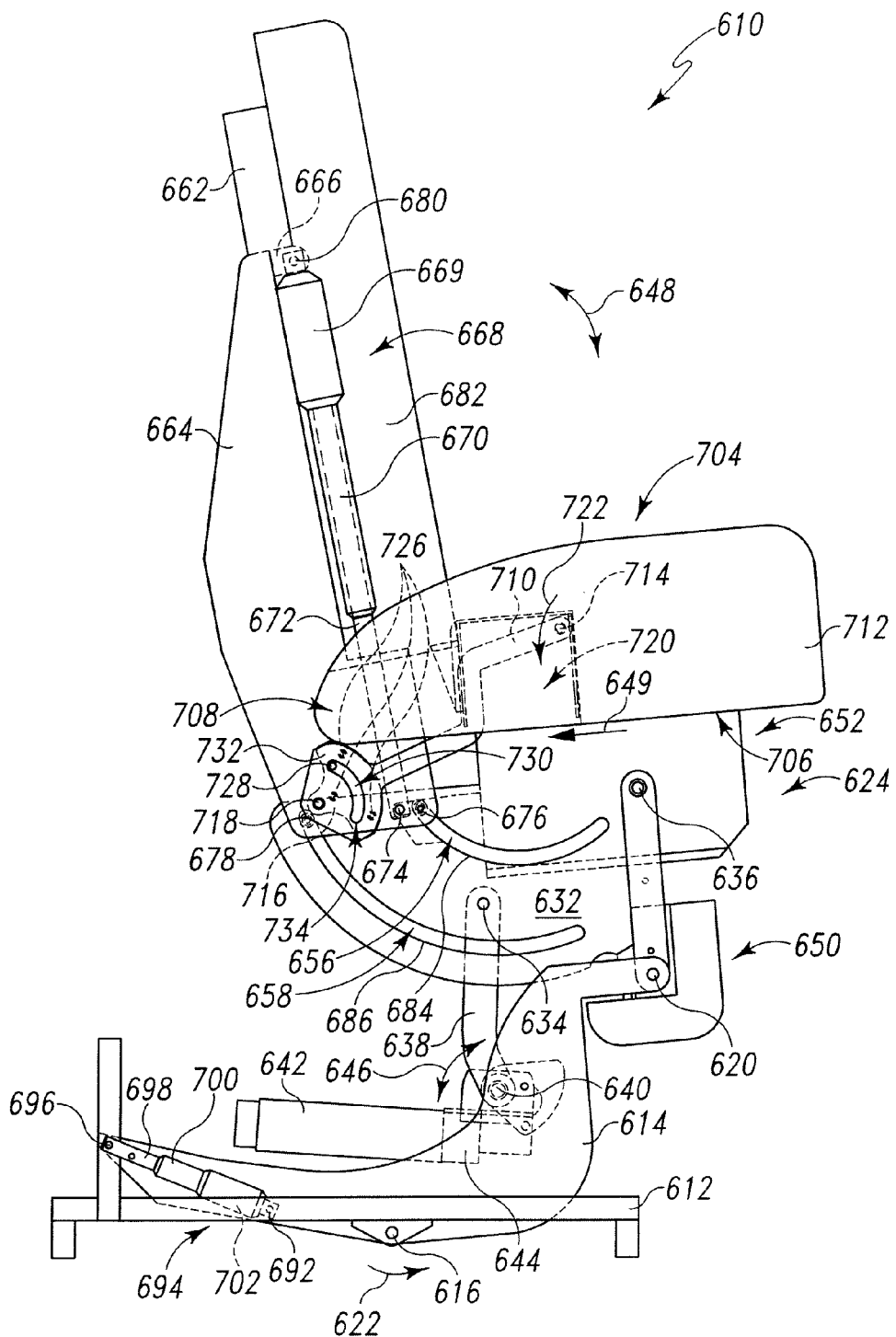
FIG. 10 is a side view of the chair of FIG. 8 showing an armrest of the chair and the seat of the chair in a full lift position.
Figure 11:
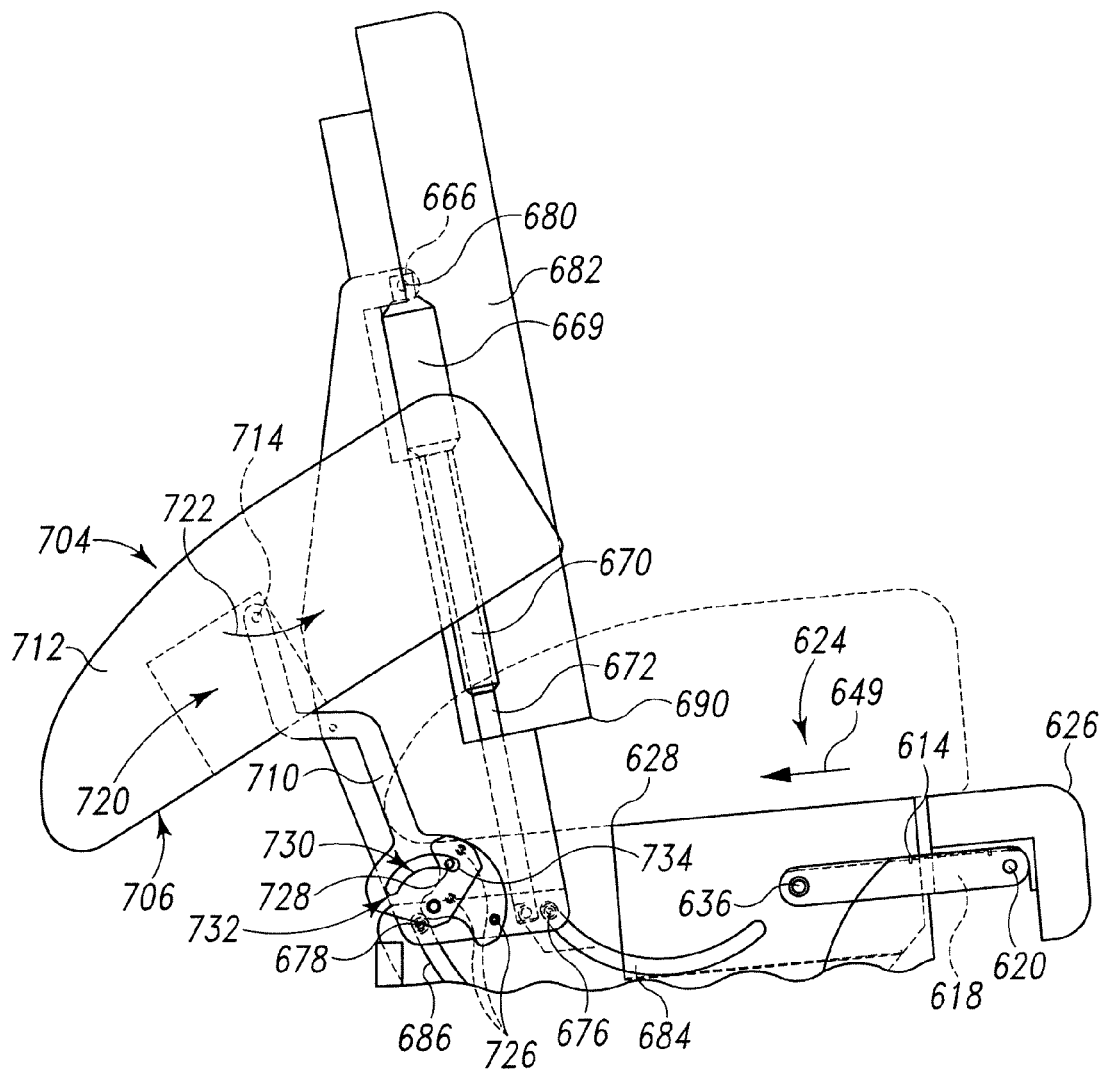
FIG. 11 is a side view of the chair of FIG. 8 showing the armrest articulated to an out-of-the-way position.

In addition to the lost motion movement, the interface of main link 710 with support plate 716 supports the articulation of armrest 704 may be pivoted from the use position shown in FIG. 10 to an out-of-the-way position shown in FIG. 11. Support plate 716 is coupled to back pivot plate 664 through three fasteners 726. A pin 728 is coupled to support plate 716 and extends outwardly from support plate 716. Main link 710 comprises a guide 730 having a radial arc shape centered on pivot 718 and which is sized to receive pin 728 in the guide 730. In the use position of FIG. 10, main link 710 is supported on pin 728 at a first end 732 of guide 730. When armrest 704 is pivoted to the out-of-the-way position of FIG. 11, main link 710 is pivoted to an over-center position such that main link 710 is supported on pin 728 at a second end 734 of guide 730. The out-of-the-way position permits a person seated on chair 610 to transfer laterally from 610 to a support device adjacent the chair 610.

Figure 12:
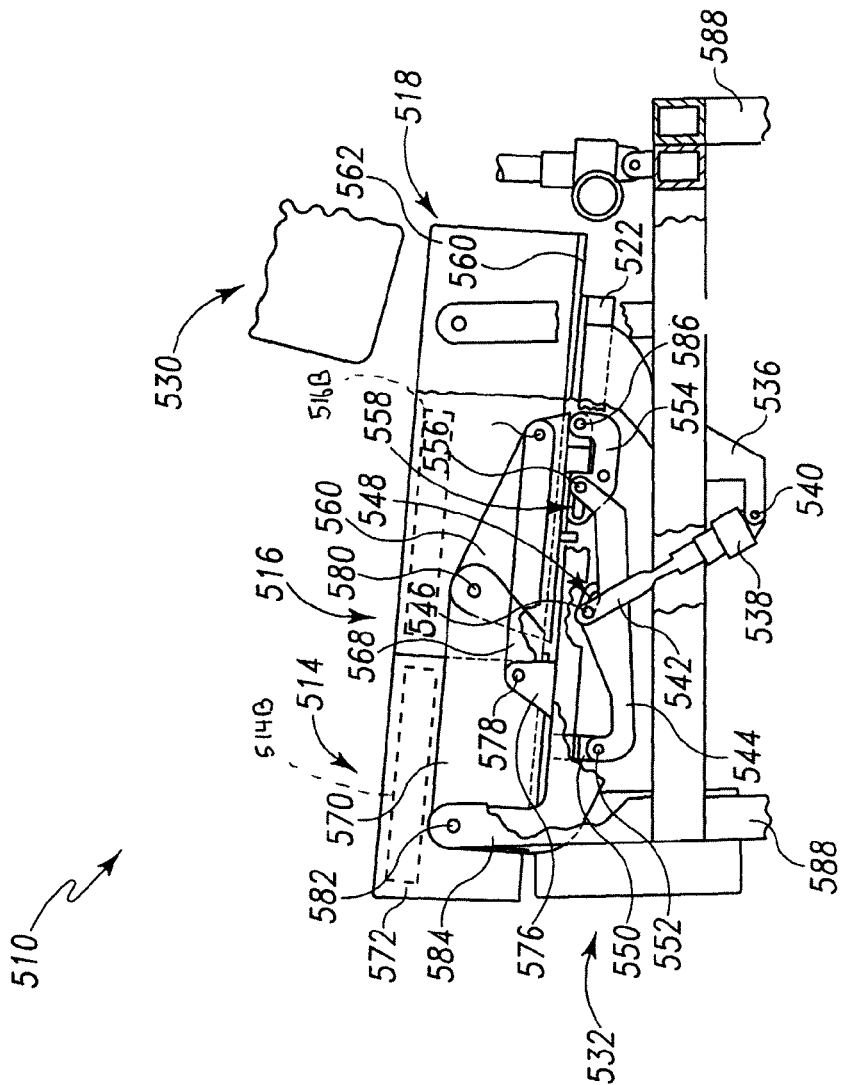
FIG. 12 is a side view of a portion of a chair with portions cut away, the chair having a seat with multiple portions which articulate to lift a person seated on the chair from a sitting position to a lifted position for ease of egress, the seat portions in a sitting position.
Figure 13:
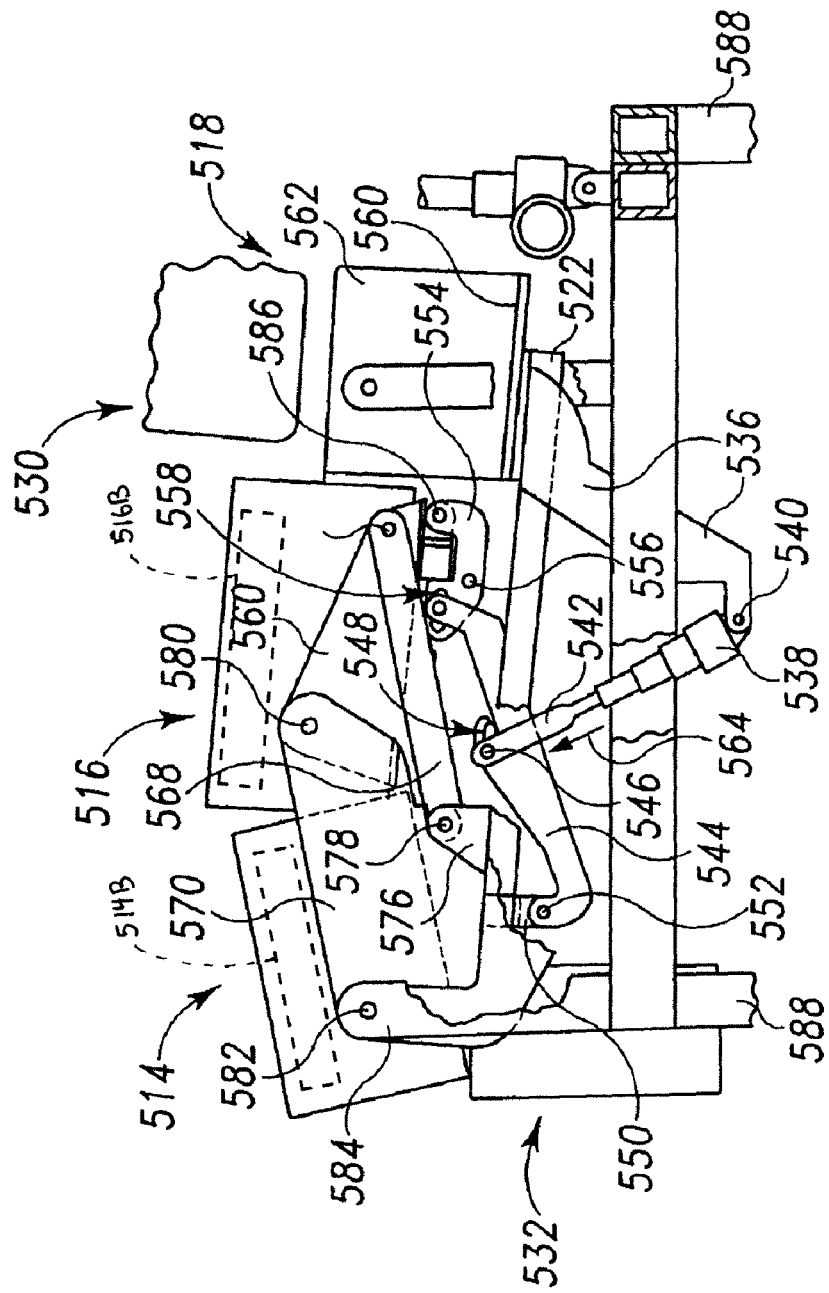
FIG. 13 is a side view of the chair of FIG. 12 with seat portions in an intermediate articulation position.
Figure 14:
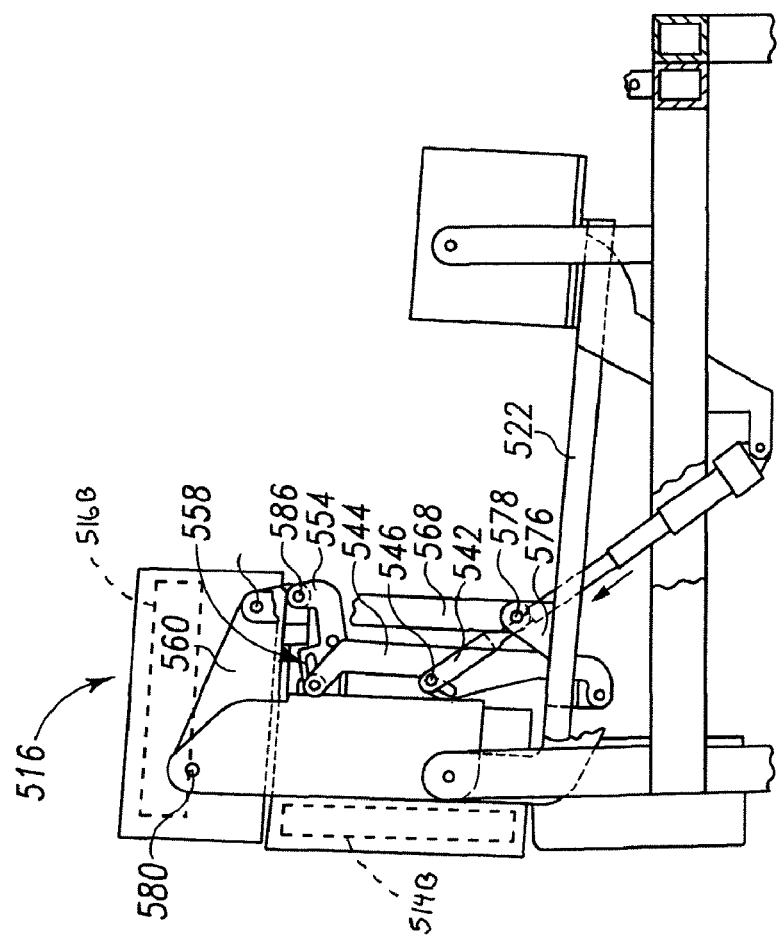
FIG. 14 is a side view of the chair of FIG. 12 with the seat portions in a lift position.

Another embodiment of a chair 510 having a lifting seat is shown in FIGS. 12-14 and includes a seat 512 with a front portion 514, a back portion 516 and a fixed portion 518. Fixed portion 518 is supported on a frame 520 which is coupled a member 522. Member 522 is coupled to a seat pivot plate (not shown) and cam plate (not shown). When the portions 514, 516, and 518 are in the configuration shown in FIG. 12, chair 510 functions in a substantially similar as seat 412 of chair 410 discussed above. All of the linkages and members which comprise the lift feature discussed below are coupled to member 522 so that articulation to achieve a lift position shown in FIG. 14 operates independently of articulation of back section 530 and thereby, the position of the cam plate 454 of the illustrative embodiment of chair 410, as well as operating independently of foot section 532. Thus, as the lift system of FIGS. 12-14 is operated, back section 530 and foot section 532 remain stationary relative to a frame 534 which corresponds to frame 420 of the illustrative embodiment of FIG. 5.

Referring again now to FIG. 12, a motor mount bracket 536 is coupled to member 522 and supports a motor 538 which is pivotably connected at a first end to the motor mount bracket 536 through a pivot 540. As motor 538 is driven, it provides linear output through a yoke 542 which forms the second end of motor 538 and which receives a portion of a main link 544 between the yoke arms. Motor 538 is coupled to main link 544 at another pivot 546 which comprises a pin received in a slot 548 in main link 544. Main link 544 is pivotably connected at a first end to a bracket 550 through another pivot 552. Bracket 550 is coupled to member 522 so that as main link 544 pivots relative to bracket 550, main link 544 also pivots relative to member 522. Thereby, all of the motion of portions 514 and 516 during a lift assist operation derives from motor 538 driving main link 544.

Main link 544 is pivotably coupled at a second end of main link 544 to a first end of a pivot bracket 554 through yet another pivot 556 which comprises a pin received in a slot 558 in pivot bracket 554. Pivot bracket 554 is pivotably coupled at a second end to a back portion frame 560 which supports a back portion surface 562 which, in turn, supports the buttocks area of an occupant. As motor 538 drives main link 544 from the position shown in FIG. 12 to the position shown in FIG. 13, main link 544 pivots upwardly relative to member 522 in the direction of arrow 564 (seen in FIG. 13) which thereby drives pivot bracket 554 as shown in FIG. 13. Driving of pivot bracket 554 results in back portion 516 being driven vertically and slightly forward toward front portion 514 in the direction of arrow 566. Fixed portion 518 remains in a fixed position relative to member 528 as back portion 516 is lifted upwardly away from member 528 by link 544. Back portion 516 is maintained in a relatively horizontal orientation due to constraints of additional linkages discussed below.

A back portion frame 560 is pivotably coupled to both a follower link 568 and a front portion frame 570. Front portion frame 570 supports a front seat surface 572. Back portion frame 560 is coupled to a first end of follower link 568 through yet another pivot 574 and follower link 568 is pivotably coupled at a second end to a follower bracket 576 through another pivot 578. Follower bracket 576 is coupled to member 528 so that follower link 568 pivots relative to member 528 which results in follower link 568 being constrained so that the first end of follower link 568 follows a circular arc relative to member 528 which thereby controls the motion of back portion frame 560 as well.

Back portion frame 560 is pivotably coupled to front portion frame 570 through another pivot 580. Front portion frame 570 is pivotably coupled at pivot 582 to a front pivot bracket 584 which is coupled to member 528. Therefore, the motion of front portion frame 570 is coupled to member 528 and the front portion frame 570 is constrained to pivot in an arc about pivot 582. This results in a second point of back portion frame 560 to be constrained to move in a defined circular arc with a center at pivot 582.

As a result of the linkage described above, back portion frame 560 is driven through rotation of pivot bracket 554 about a pivot 586 which couples pivot bracket 554 to back portion frame 560 to move back portion frame 560 through an arcing motion which maintains portion 516 in a relatively horizontal orientation throughout the range of articulation as can be seen in FIGS. 13 and 14. As the articulation progresses, the pivot 556 which couples main link 544 to pivot bracket 554 moves along slot 558 which further assists in maintaining the generally horizontal orientation of back portion 516. Once front portion 514 has pivoted approximately 90 degrees about pivot 582 and back portion 516 is in a full lift assist position, the pivot 546 connecting yoke 542 of motor 538 to main link 544 moves in slot 548 which drives pivot bracket 554 to slightly incline back portion surface 562 to ease egress from or ingress onto back portion 516 by an occupant.

Ingress into chair 510 is accomplished by retracting motor 538 after an occupant has sat on back portion 516 such that the linkage moves from the position of FIG. 14 to the position of FIG. 12. In addition to the motion described herein, it should be understood that a frame 588 of chair 510 may be fixed to the floor, mounted on casters, or still yet, located on another frame. If frame 588 is located on another frame, then frame 588 may be moveable relative to the additional frame with the frame 588 serving as an intermediate frame and the other frame serving as a base frame (not shown). It should also be understood that a motor (not shown) may be located between the frames and configured to move the frame 588 relative to the base frame to raise or lower the frame 588 and thereby the support surfaces located on frame 588. This may be useful to lower the chair 510 while in the supine position to reduce the risk of injury if an occupant falls from chair 510. Additionally, the frame 588 may be simultaneously raised during articulation of the front portion 514 and back portion 516 to provide additional lift to an occupant of chair 510.

In addition to the articulation described above, front portion 514 and back portion 516 may further include one or more air bladders which are selectively inflatable. During the lift and egress cycle, an air bladder 516B in back portion 516 may be inflated to increase the overall height of back portion 516 while a bladder 514B in front portion 514 is deflated so that egress from chair 510 is facilitated. Altering of bladder sizes may be accomplished while the portion is in a fixed position, or may occur in conjunction with the articulation described above to further facilitate egress from chair 510.

Figure 43:
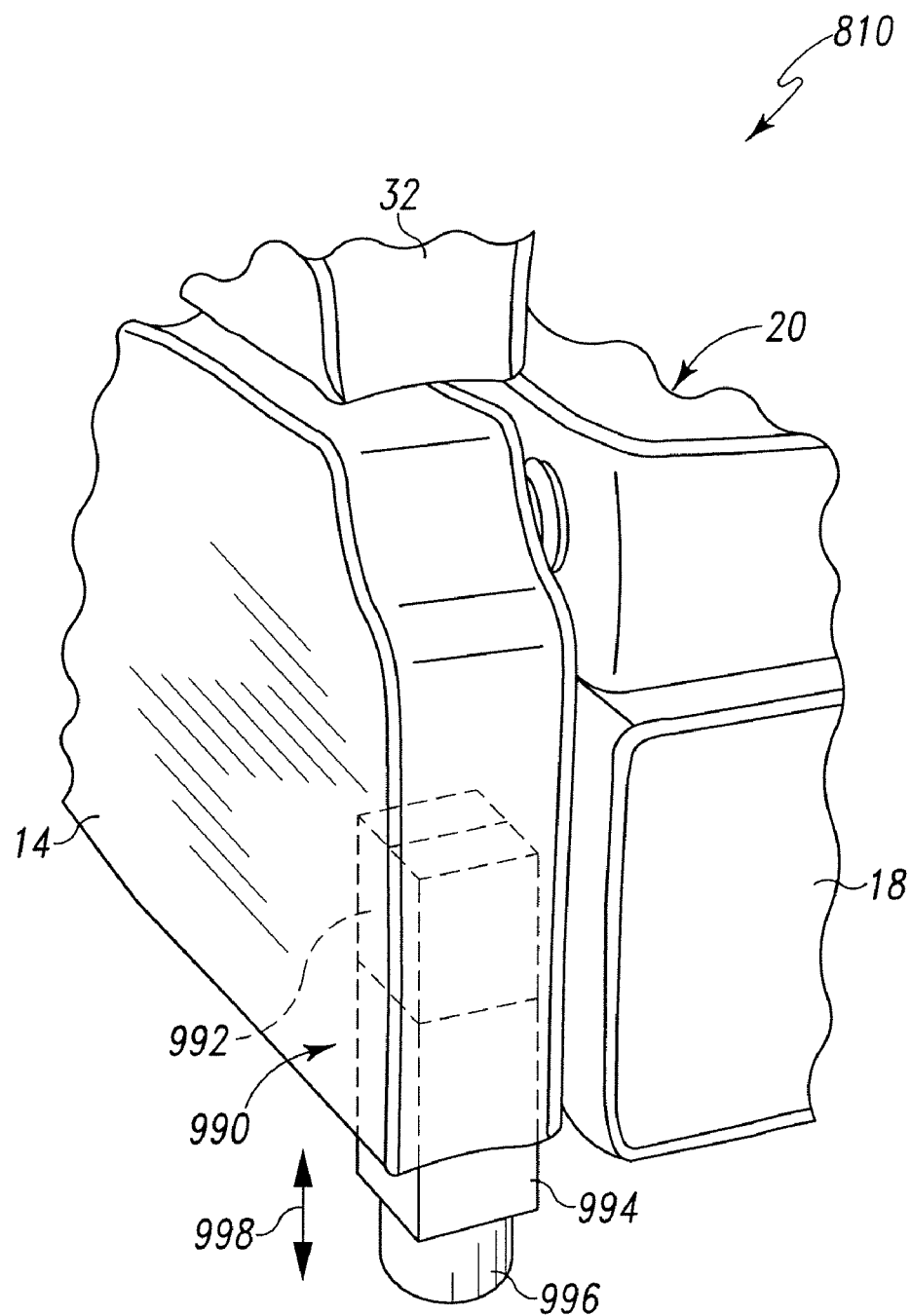
FIG. 43 is a fragmented perspective view of a chair having a powered telescoping leg to change the height of the chair.

In another embodiment of a chair 810 shown in FIG. 43, the chair includes multiple lift systems 990 coupled to frame 14 and operable to raise or lower the frame 14 relative to a floor. Lift system 990 comprises a motor 992, an outer tube 994 and a rod 996 which is driven by motor 992 to move telescopically within outer tube 994 as depicted by arrow 998. Telescopic extension or retraction of rod 996 changes the vertical position of frame 14 relative to a floor. In some embodiments, lift system 990 is position at four corners or chair so that each corner may be independently adjusted to tilt the seat of the chair forwardly or rearwardly.

In addition to the various chair embodiments described above which are directed to articulation of various members of the chair, the chairs may further comprise various improvements to provide comfort and assistance to a person occupying the chairs. It is contemplated that a chair may be occupied for several hours a day by persons of limited mobility and thus need to provide for activities which may be performed while seated in the chair. Further discussion will refer to a single embodiment of chair 810 with various embodiments of improvements thereto. It should be understood that any of the embodiments discussed below may be combined with any of the articulation embodiments of described above.

Figure 39:
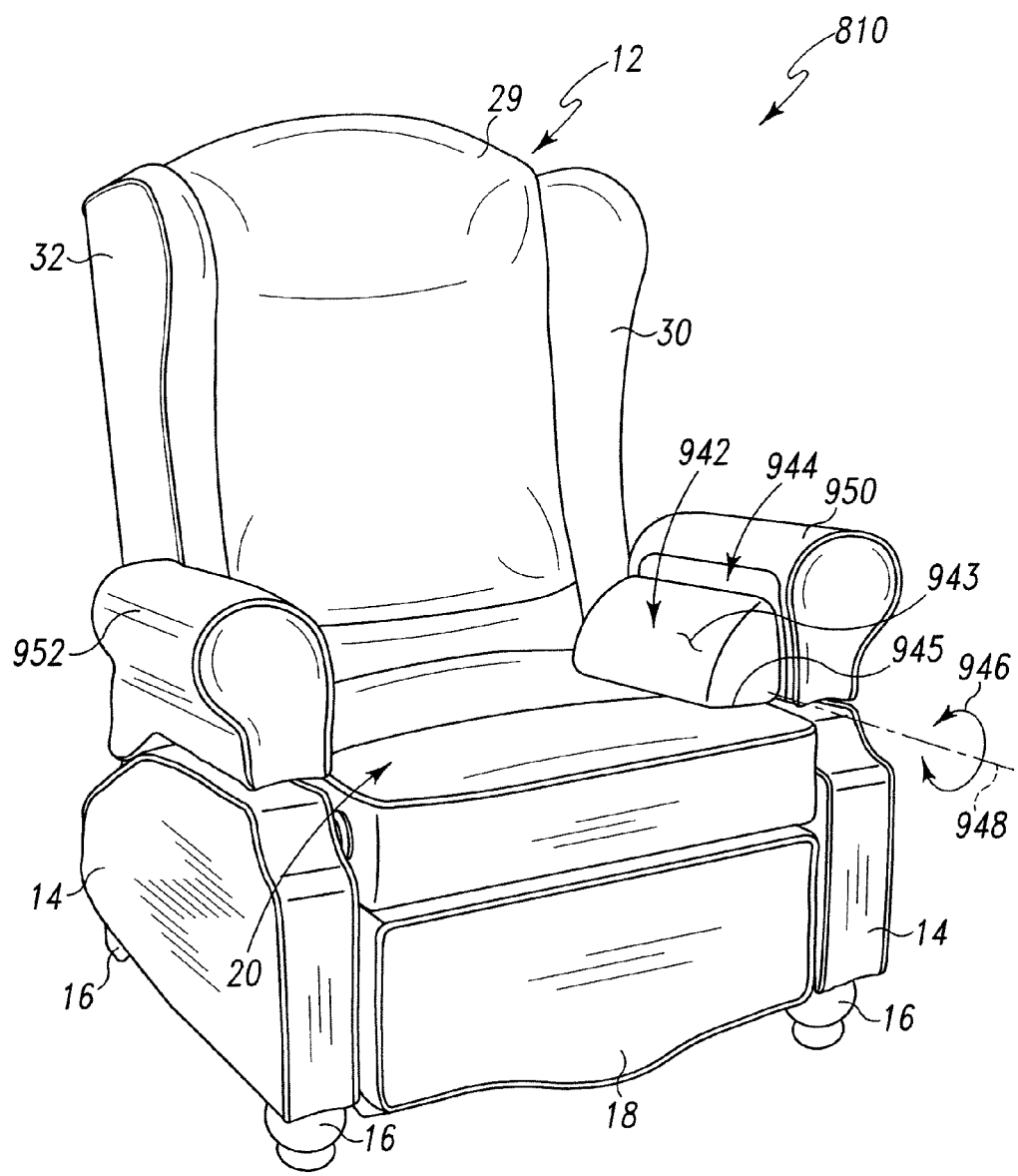
FIG. 39 is a perspective view of a chair having two-piece armrest with a pivoting portion of the armrest pivoting to reduce width of a seating area on the chair.
Figure 40:
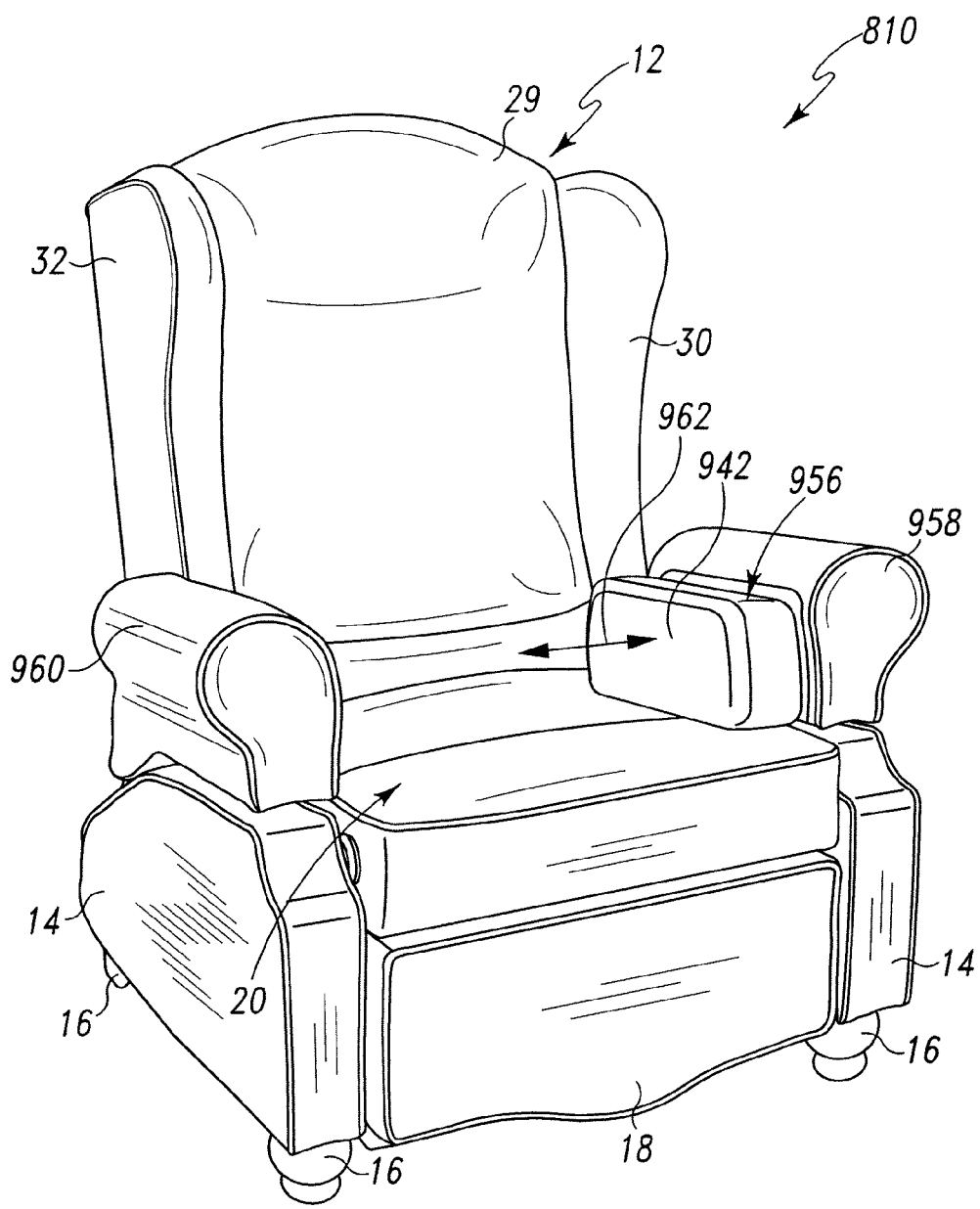
FIG. 40 is a perspective view of a chair having two-piece armrest with a telescoping portion of the armrest extending to reduce width of a seating area on the chair.
Figure 41:
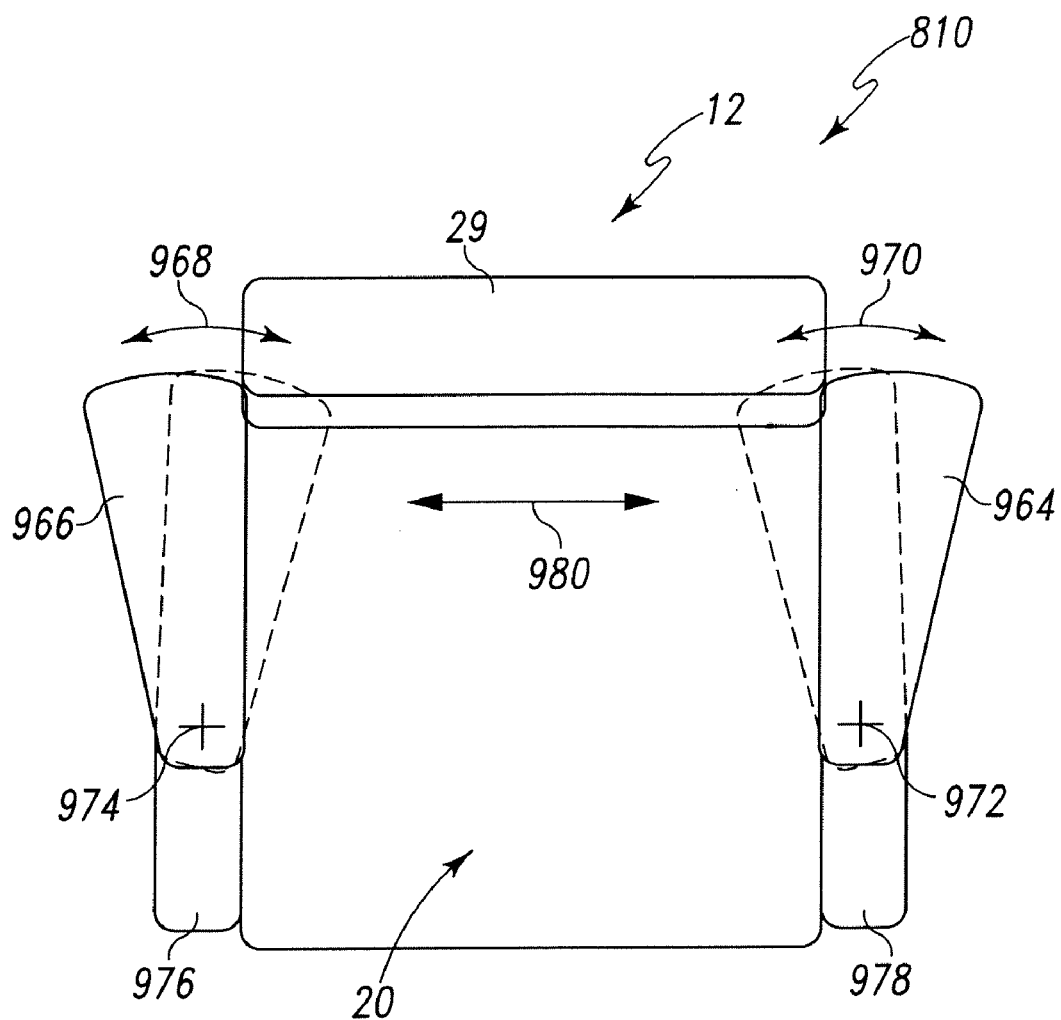
FIG. 41 is a top view of a chair having armrests which pivot about a vertical axis to reduce the width of a seating area on the chair.

The elderly or persons having limited mobility sometimes prefer seating surfaces of varying widths. The present disclosure includes armrests which are adjustable to change a width of a seating surface and provide lateral support to a person seated on the chair. For example, embodiments of armrests adjustable to change the seat width on a chair 810 are shown in FIGS. 39-41. In a first embodiment shown in FIG. 39, an armrest 950 includes a pivoting portion 942 which pivots about a generally horizontal axis 948 as depicted by arrow 946. The pivoting portion 942 pivots between an extended position shown in FIG. 39 and a retracted position wherein the pivoting portion 942 is contained within a cavity 944 in the armrest 950. When in the extended position, a surface 945 engages the seat 20 to maintain the pivoting portion 942 in position. Another curved surface 943 is centered on axis 948 and provides both lateral and upward support to a person seated on chair 810. In some embodiments, pivoting portion 942 may be located in the armrests on both sides of the seat. In the illustrative embodiment of FIG. 39, armrest 952 includes a pivoting portion 942 which is in a retracted position and cannot be seen.

Another embodiment of an adjustable armrest 958 is shown in FIG. 40. Armrest 958 includes a portion 954 which telescopically extends from a cavity 956 in armrest 958 as depicted by arrow 962. Portion 954 is moveable to a plurality of positions between the extended position shown in FIG. 40 and a retracted position wherein the portion 954 is contained within cavity 956. Thus, the width of a seating area of chair 810 is adjustable to a plurality of widths.

As can be seen in FIG. 41, in yet another embodiment, a chair 810 includes two adjustable armrests 964 and 966 which pivot about vertical axes 972 and 974 respectively to adjust a seating area on chair 810 represented by arrow 980. In the illustrative embodiment of FIG. 41, chair 810 includes frame portions 976 and 978 and the armrests 964, 966 are pivotably coupled to frame portions 976 and 978 and pivotable about axes 972 and 974 as depicted by arrows 970 and 968. When armrests 964, 966 are in their first positions shown in solid in FIG. 41, the seating area represented by arrow 980 is maximized. Armrests 964 and 966 are independently pivotable to a plurality of positions between the first position shown in solid and a second position shown in phantom.

Figure 15:
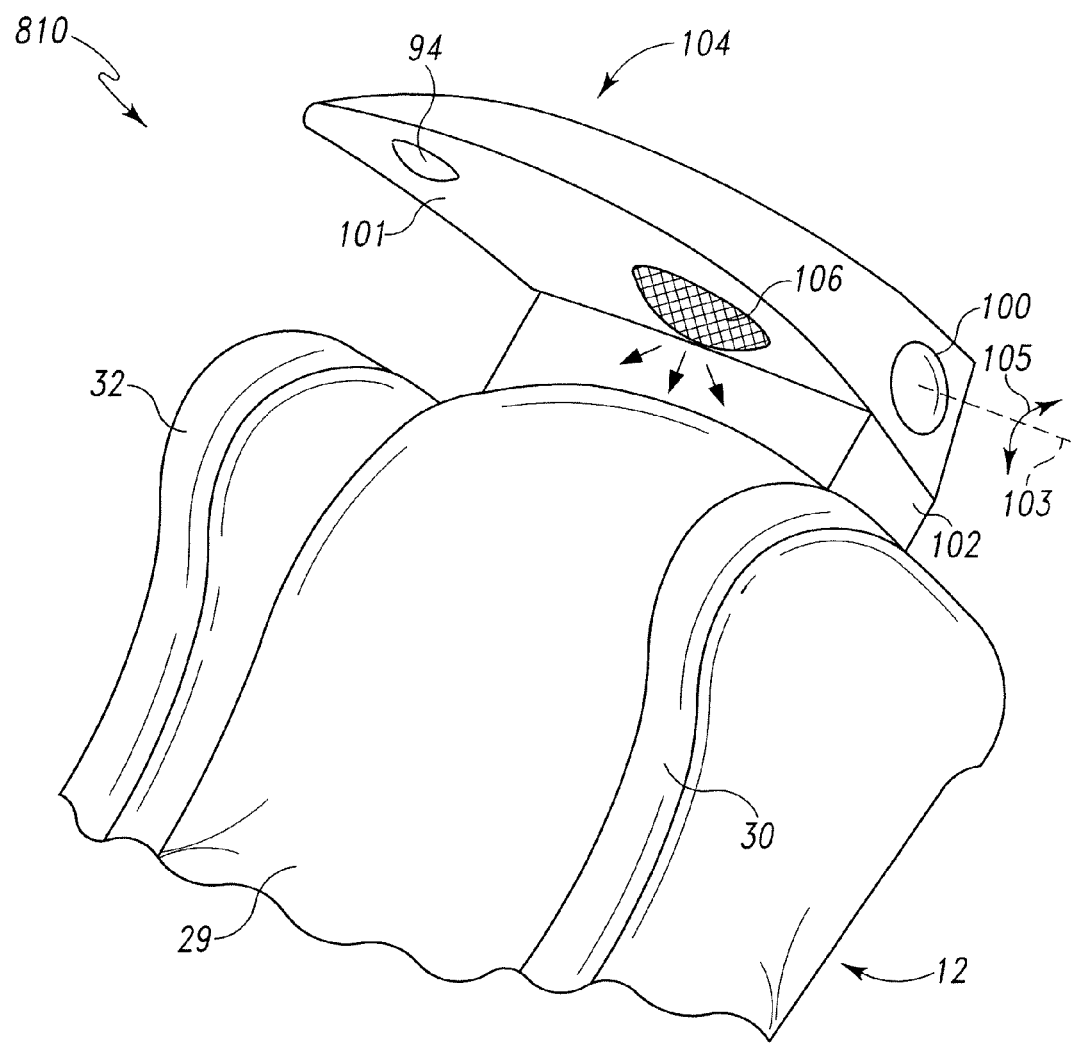
FIG. 15 is a perspective view of the chair of FIG. 1 with portions removed, the chair further including a comfort section coupled to a back of the chair.

A chair 810 shown in FIG. 15 includes a comfort section 104 coupled to the back 12. In the illustrative embodiment of FIG. 15, comfort section 104 includes a support 102 coupled to main portion 29 of back 12. A main portion 101 is pivotably coupled to support 102 through a pivot 100 and pivotable about an axis 103 as depicted by an arrow 105. Comfort section 104 includes a vent 106 which expels forced air toward a person supported on chair 810. In the illustrative embodiment of FIG. 15, the air expelled is temperature controlled by a control unit located within support 102 and is communicated to vent 106 through a flexible conduit. The temperature is controlled by a heater. In some embodiments, the temperature may be controlled by a cooler or both a heater and cooler as necessary to control the temperature. Comfort section 104 also includes a light 94 which directs light toward a person supported on chair 810. Light 94 may be selectively activated by a user utilizing controls located on an armrest of chair 810. While the illustrative embodiment of FIG. 15 utilizes controls located on the armrest of chair 810, the controls may be located in any of a number of positions including the side of frame of chair 810 or a pendant, for example.

Figure 16:
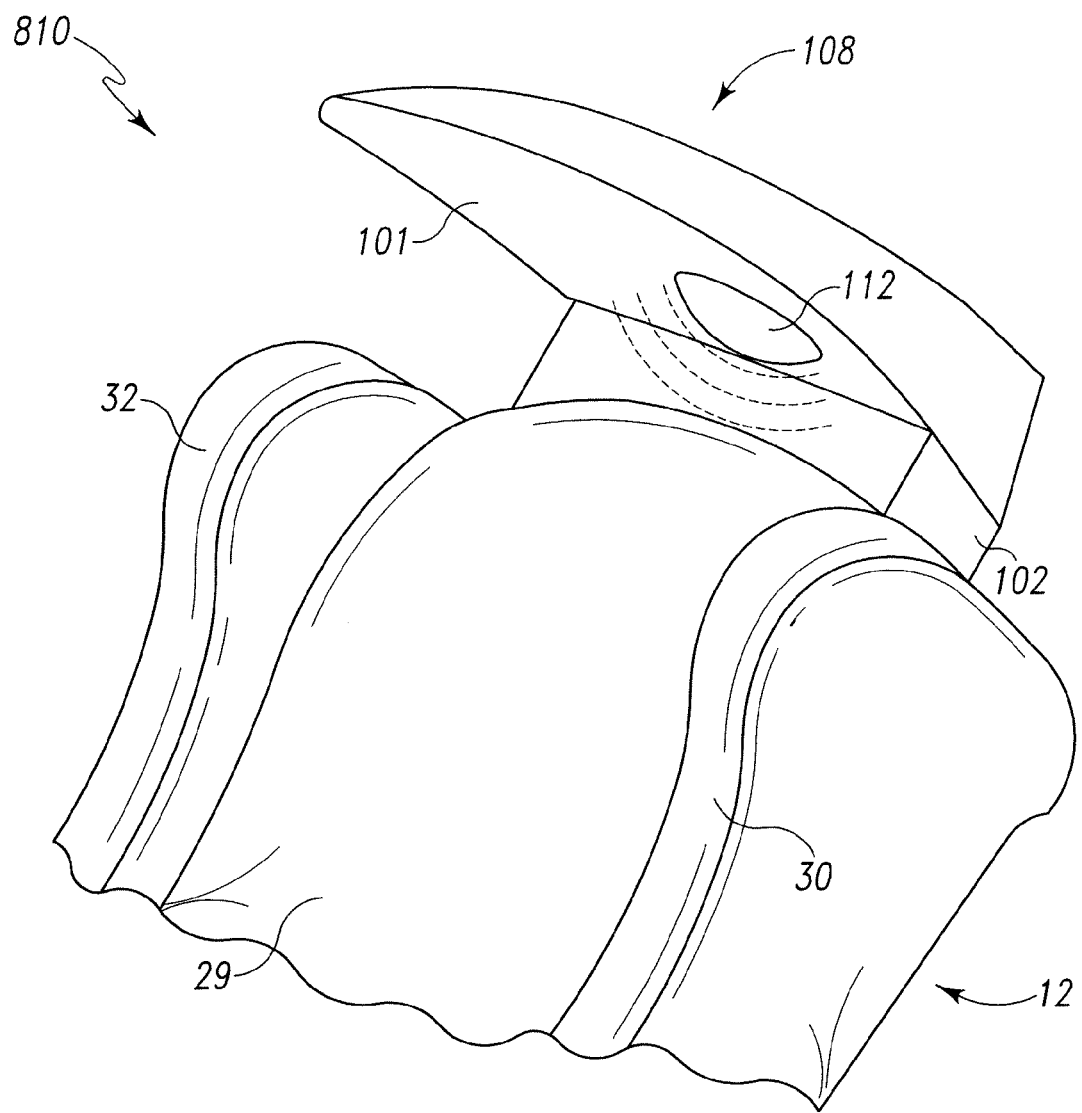
FIG. 16 is a perspective view of the chair of FIG. 1 with portions removed, the chair further including another embodiment of a comfort section coupled to a back of the chair.

Another embodiment of comfort section 108 coupled to main portion 29 of back 12 of chair 810 is shown in FIG. 16. In the illustrative embodiment of FIG. 16, a speaker 112 is located on main portion 101 and positioned to direct sound toward a person supported on chair 810. The speaker is coupled to a television and directs sound toward the person supported on chair 810 without the need for having a higher volume sound output from the television. This reduces the possibility that a person having hearing loss would need to disrupt other members of the household in order to hear sounds from the television. While in the illustrative embodiment of FIG. 16 the speaker is coupled to a television, in other embodiments, the speaker may be coupled to any of a number of output devices such as a radio receiver, CD player, or other sound output device. In some embodiments, the comfort section 108 may include sound generating equipment to play music or provide other sounds. When coupled with embodiments which include massage, the speaker may be part of a relaxation system in the chair 810 which utilizes sound and massage profiles to assist a person supported on chair 810 in relaxing.

Figure 17:
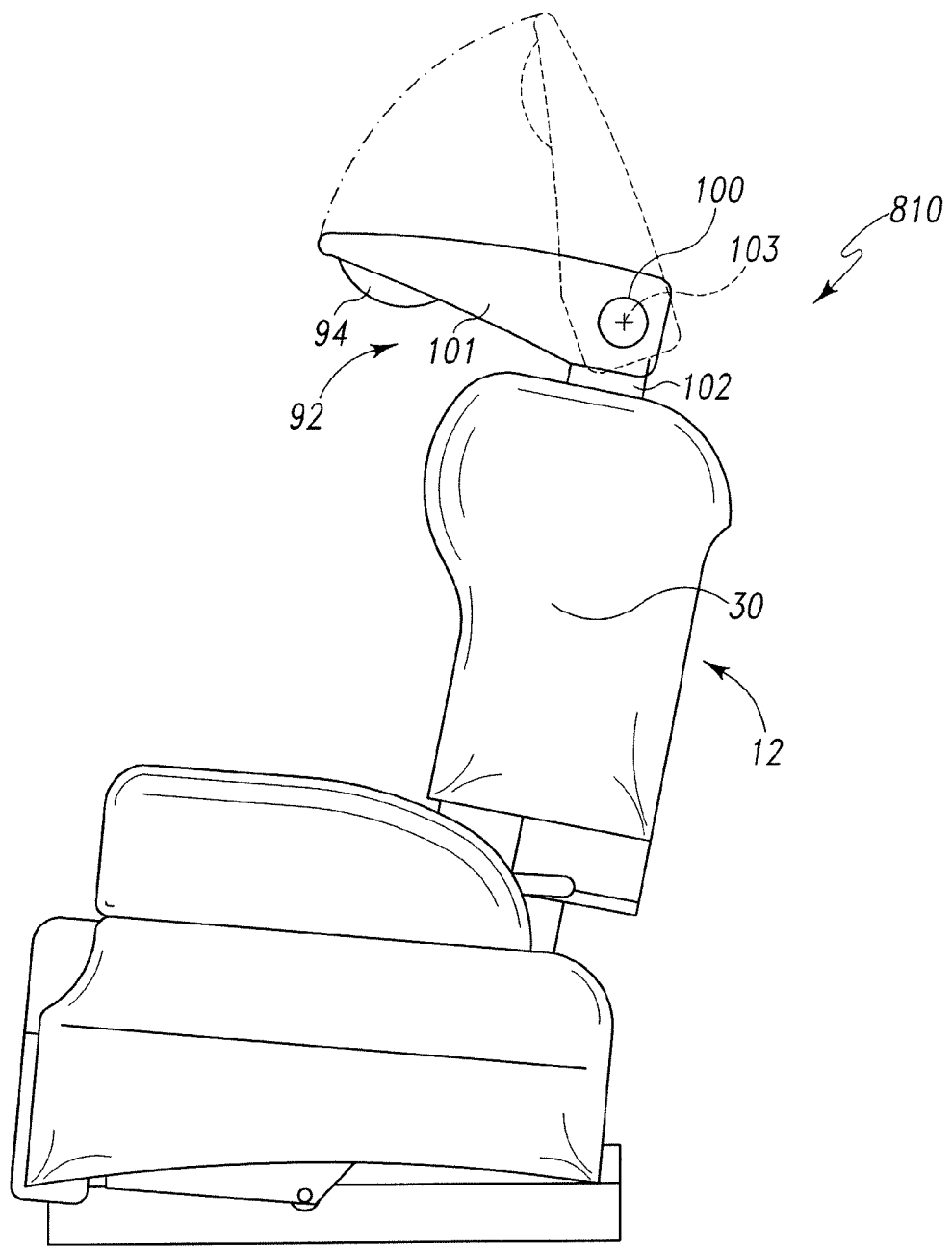
FIG. 17 is a side view of a chair, the chair further including a pivoting comfort section coupled to a back of the chair.
Figure 18:
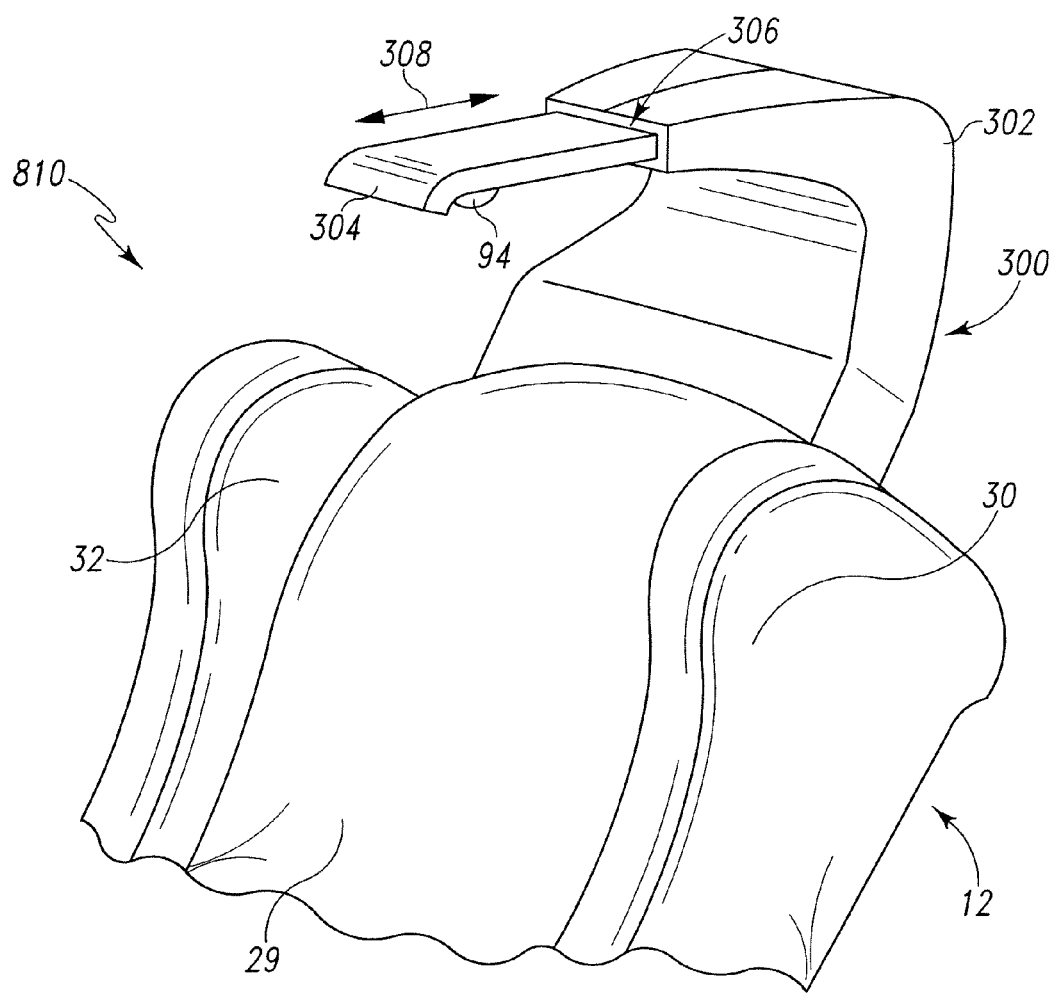
FIG. 18 is a perspective view of the chair of FIG. 1 with portions removed, the chair further including yet another embodiment of a comfort section coupled to a back of the chair.

Another embodiment of a comfort section 92 shown in FIG. 17 comprises a light 94 coupled to main portion 101. Main portion 101 pivots about axis 103 similar to the illustrative comfort section 104 of FIG. 11. Pivoting of main portion 101 adjusts the position of light 94 relative to a person supported on chair 810 and thereby alters the amount of illumination experienced by the person. The main portion 101 is adjustable to a plurality of positions between a first position shown in solid in FIG. 17 and a second position shown in phantom.

In yet another embodiment, a comfort section 300 includes a support 302 coupled to main portion 29, a telescoping portion 304 which is telescopically received in an opening 306 in support 302 and telescopes relative to support 302 as depicted by arrow 308. A light 94 is coupled to telescoping portion 304 and is positioned to direct light toward a person supported on chair 810. The telescopic movement of telescoping portion 304 allows the position of light 94 to be adjusted relative to the person supported on chair 308 so that the light 94 may be positioned by the person to achieve an appropriate illumination. In other embodiments, the light 94 may omitted and may be replaced with a vent, speaker, or other device which may be utilized by a person supported on chair 810 to improve their comfort.

Figure 19:
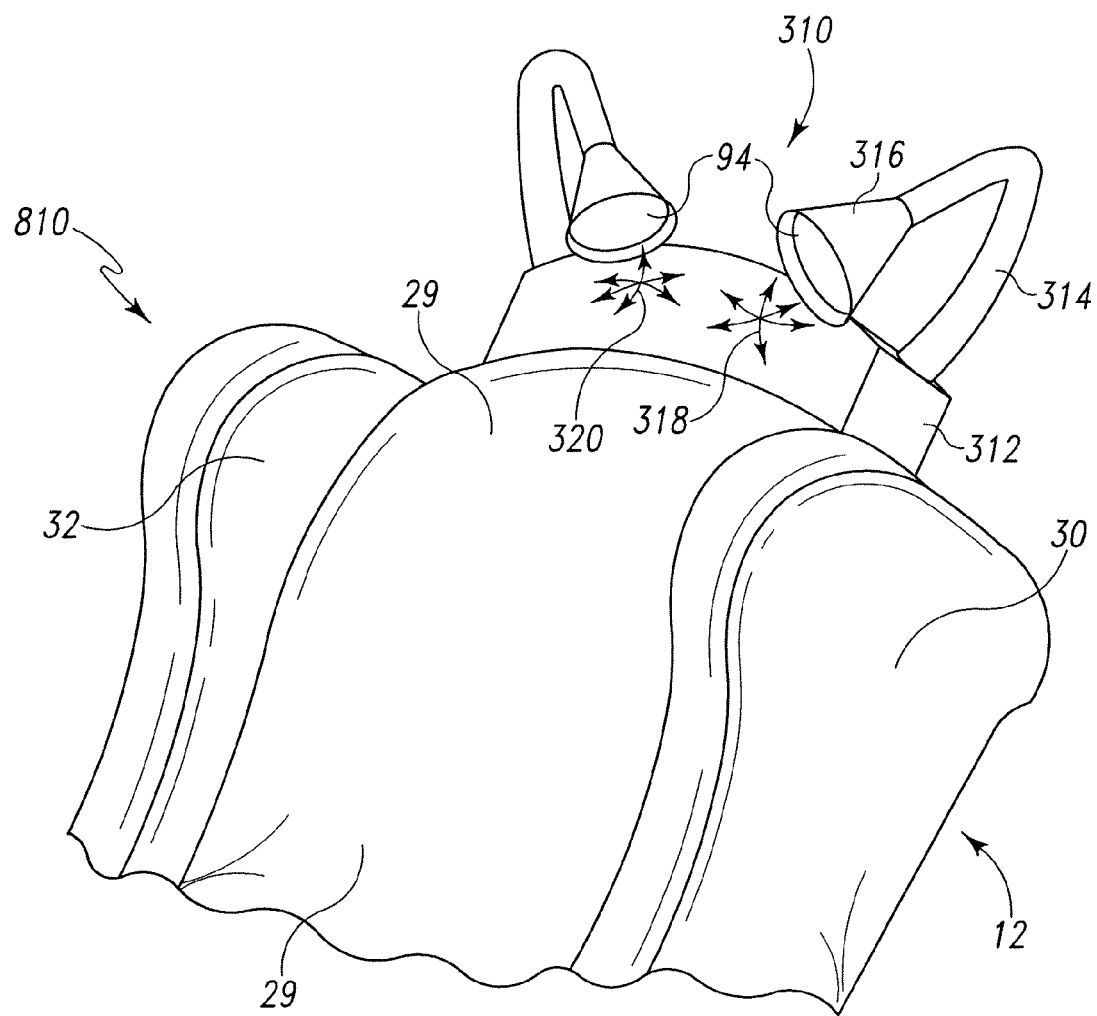
FIG. 19 is a perspective view of the chair of FIG. 1 with portions removed, the chair further including still yet another embodiment of a comfort section coupled to a back of the chair.

Adjustment of light is also facilitated by still yet another embodiment of a comfort device 310 shown in FIG. 19. Comfort device 310 includes a support 312 coupled to main portion 29 of back 12 of chair 810. Two flexible members 314 are coupled to support 312. A housing 316 is coupled to each flexible member 314 at an end opposite the end of flexible member coupled to support 312. A light 94 is coupled to each of the housings 316. The direction of illumination of lights 94 is adjustable in a plurality of directions as depicted by arrows 318 and 320. Flexible member 314 is repositionable to any of a number of orientations so that the illumination of lights 94 may be directed as appropriate. While the illustrative embodiment of FIG. 19 shows lights 94 coupled to housings 316, in other embodiments one or both of the lights may be omitted and replaced by other comfort devices disclosed herein such as speakers or vents, for example. Additionally, other embodiments may include more or less flexible members 314 as appropriate. In still other embodiments, flexible members 314 may be added to other comfort device embodiments to create a comfort section which combines the aspects of the illustrative comfort section 310 with the other comfort section.

In addition to basic comforts provided by the various comfort sections, it is important that the controls of a chair be easily accessed and used by a person who occupies the chair. Operation of a chair and the various accessories of the chair and environmental equipment within the area surrounding a chair may be controlled by a number of user controls. Various exemplary embodiments of controls and control support devices will be discussed as interchangeable components of an exemplary chair 810. It should be understood that the various embodiments may be used independently or in combination to form a specific user input system for a particular chair.

Figure 20:
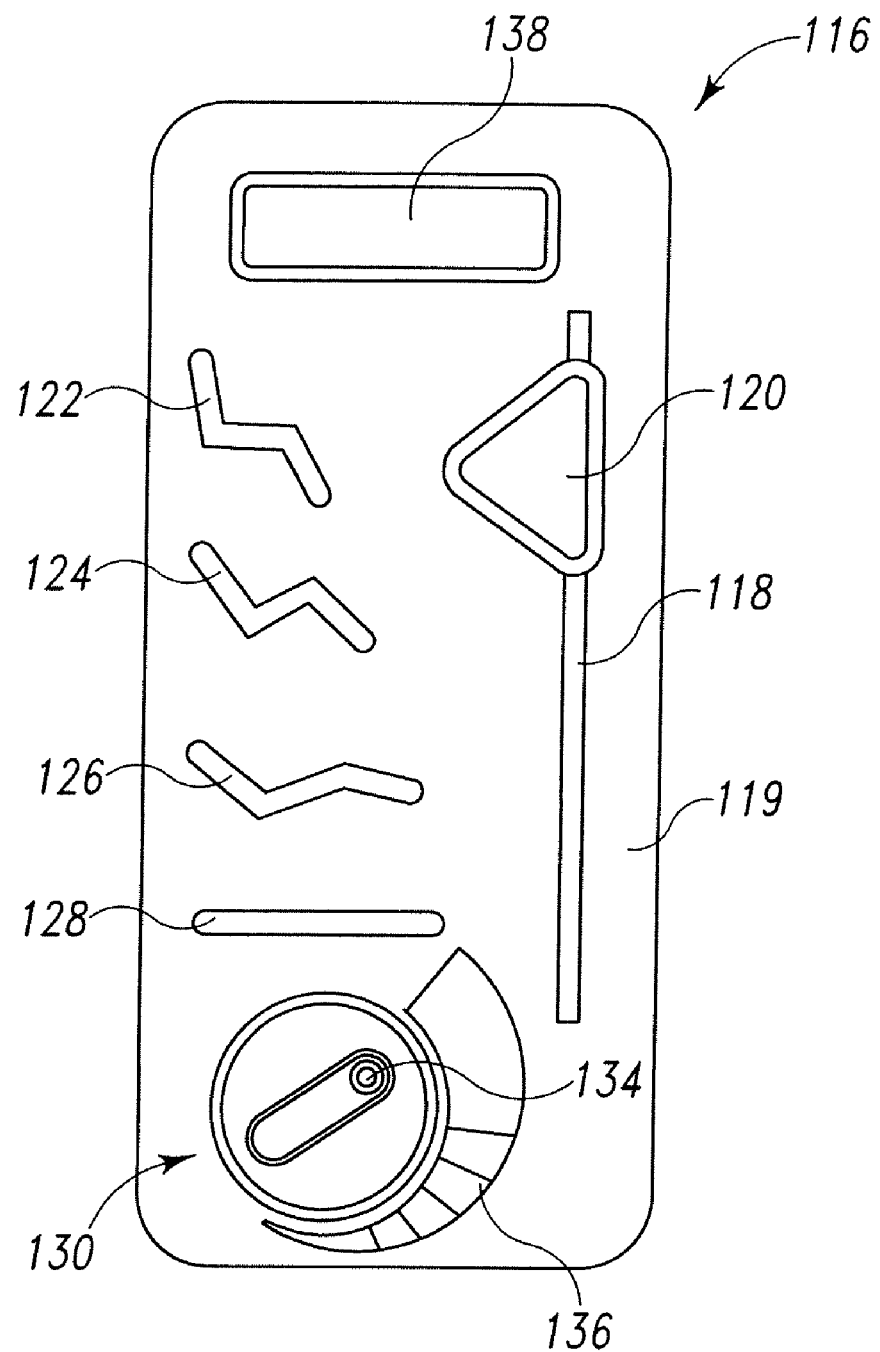
FIG. 20 is a front view of a pendant for the chair of FIG. 1.

For example, a pendant 116 shown in FIG. 20 may be connected to a control system (not shown) of a chair through an electrical cord or may be wirelessly connected to chair using radio frequency technology or the like. Pendant 116 comprises an input button 138 which provides input to activate a function of a chair such as a massage function, for example. Pendant 116 further comprises an input slider 120 which slides in a slot 118 in a housing 119 of pendant 116. Input slider 120 is triangularly shaped and oriented so as to point at one of several indicators which correspond to a position of a chair. For example, a sitting-up position indicator 122 corresponds to the sitting-up position of the chair. Input slider 120 is in a position which corresponds with the sitting-up position indicator 122 in FIG. 20. There are three additional indicators which correspond with other positions of chair such as a slightly reclined indicator 124. In addition, pendant 116 includes a reclined indicator 126 and a supine indicator 128. As input slider 120 is slid in slot 118 to a position that corresponds to any of the indicators 122, 124, 126 or 128, the chair articulates to the indicated position. This permits an occupant of the chair to provide an input to the chair and achieve a desired position. Input slider 120 in the illustrative embodiment of FIG. 20 is retained in a position correlating to a particular indicator 122, 124, 126 or 128 by detents (not shown) within housing 119. In other embodiments, the detents may be omitted and repositioning of input slider 120 may provide continuous variation of the position of the chair between the sitting-up position and the supine position.

Pendant 116 further comprises an input dial 130 which includes a pointer 134. Input dial 130 may be used to provide a continuously variable input such as temperature as indicated by a graduated indicator 136 on housing 119. The input dial 130 and graduated indicator 136 may allow an occupant to input varying temperatures to be expelled from vent 106 of the illustrative chair 810 of FIG. 15, for example. In some embodiments, input dial 130 may control the speed of massage or the firmness of the air cells 91.

Figure 28:
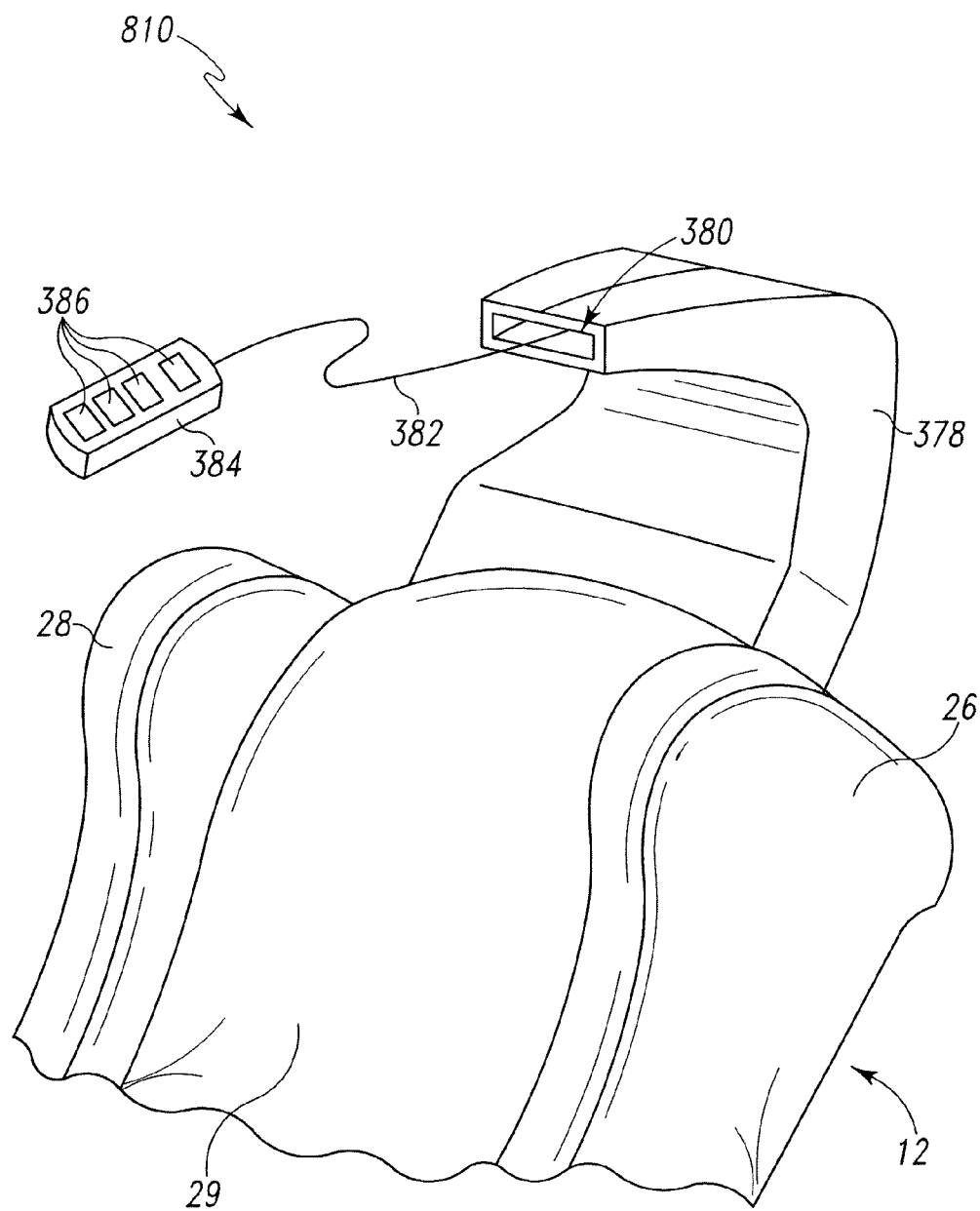
FIG. 28 is a perspective fragmented view of a chair with a comfort section coupled to the back of the chair, the comfort section including a cavity for storing a pendant connected to the chair through a cord attached to the comfort section.

Referring now to FIG. 28, another embodiment of a pendant 384 is coupled to a comfort section 378 of chair 810 through a cord 382. The pendant 384 includes several user inputs 386 which control operation of articulating members of chair 810, accessories to chair 810 such as massage, heat, and surface firmness. In addition, pendant 384 controls various other devices in the environment such as a television, audio system, and lighting. Cord 382 is coupled to a retraction mechanism (not shown) which retracts cord 382 when the pendant 384 is not in use. The pendant 384 stows in a cavity 380 located in comfort section 378 when not in use. In some embodiments, pendant 384 and cord 382 are coupled to another member of chair 810 and pendant 384 stows in a cavity in the particular member. Also, it should be understood that cord 382 is an electrical cord transmitting control signals from the pendant 384 to the controls, but in other embodiments, pendant 384 may wirelessly communicate with the controls and cord 382 may be only a support tether for pendant 384.

Figure 31:
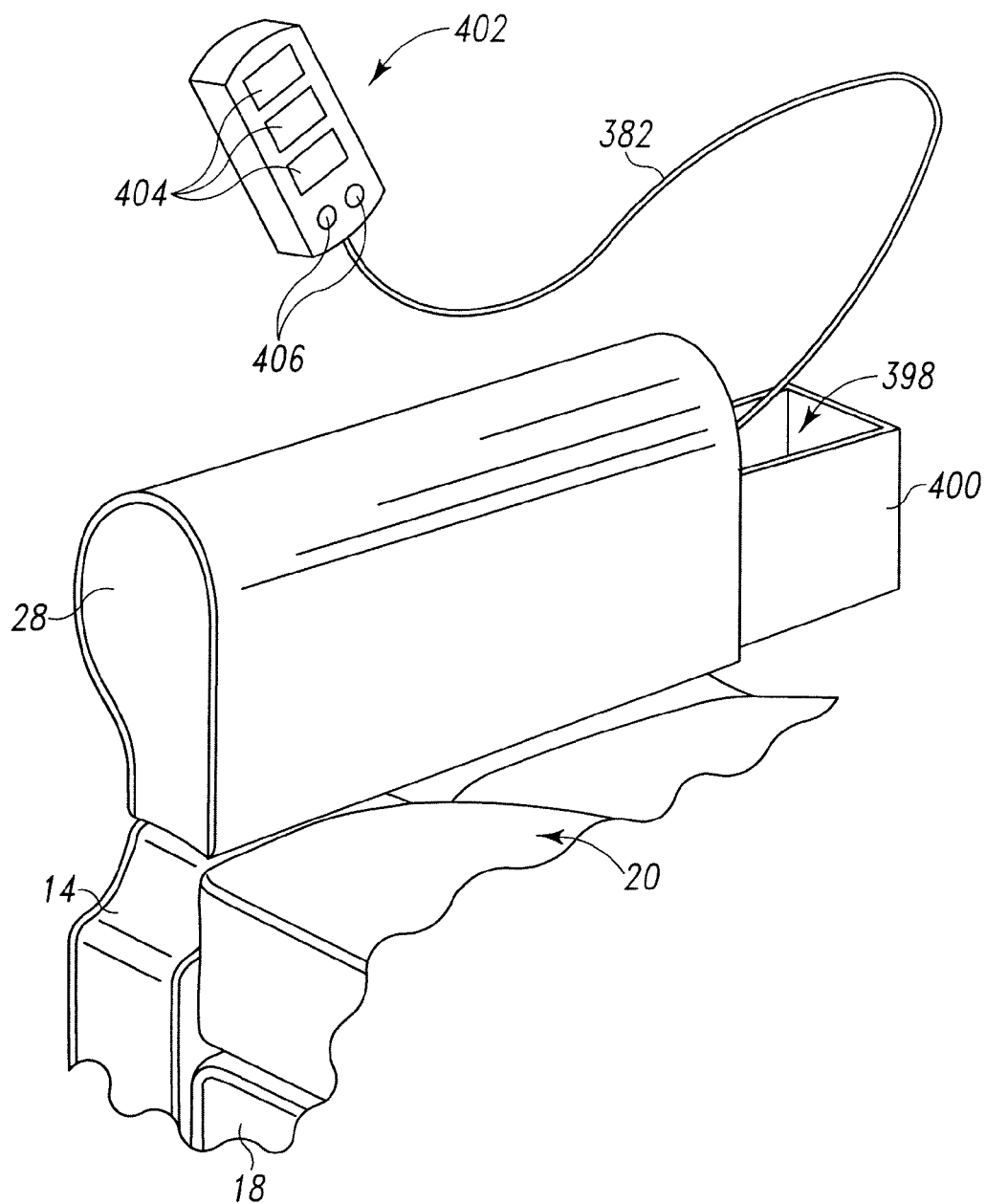
FIG. 31 is a fragmented perspective view of a portion of a chair including a storage compartment coupled to an armrest of the chair, the storage compartment including a cavity for storing a pendant connect to the chair through a cord attached to the armrest at the storage compartment.

FIG. 31 shows another embodiment of chair 810 with another pendant 402 tethered to armrest 28 through cord 382. A structure 400 coupled to armrest 28, the structure 400 forming a cavity 398 which receives pendant 402 for storage. Pendant 402 is dedicated to articulation of chair 810 with user inputs 404 controlling the reclining features of chair 810 and user inputs 406 controlling the lifting features of chair 810.

Figure 29:
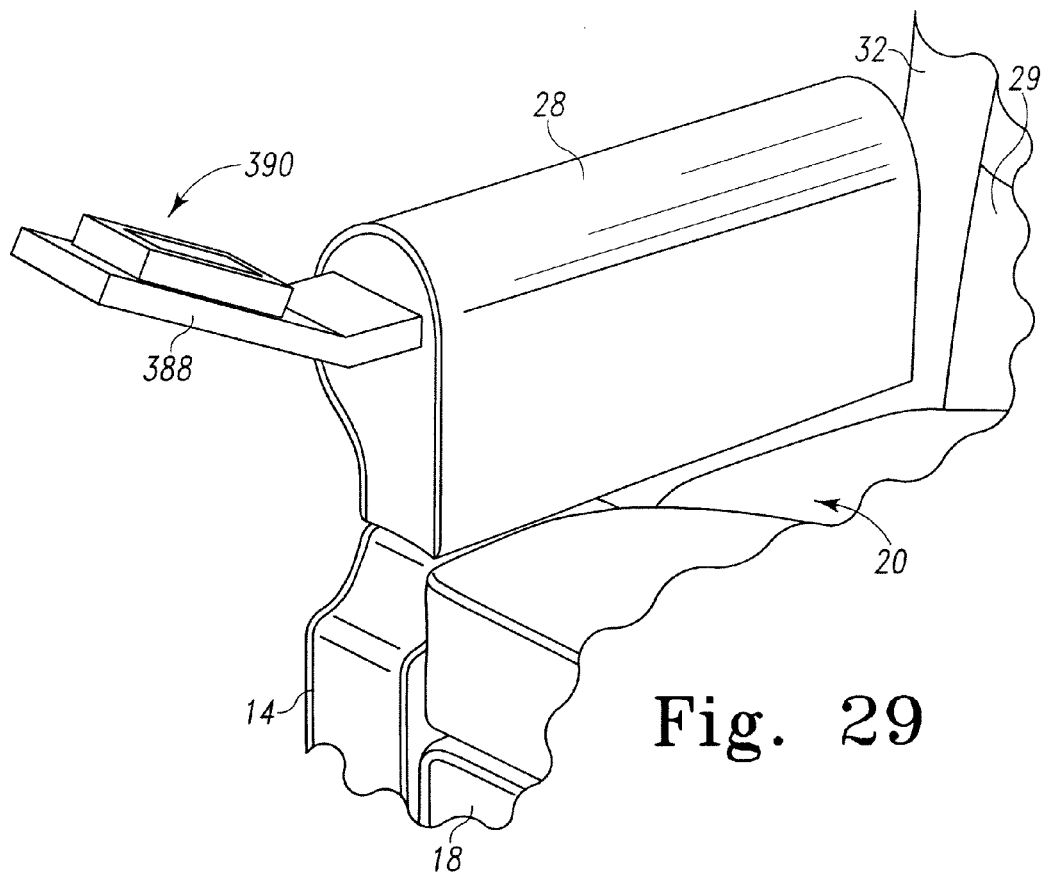
FIG. 29 is a fragmented perspective view of a portion of a chair having a control support coupled to an armrest, a control panel supported thereon.

In some other embodiments, the controls of chair 810 may be fixed to chair 810. For example, a control panel 390 shown in FIG. 29 is supported on a rigid support 388 which is coupled to arm 28 of chair 810. Support 810 is configured to position control panel 390 in a readily accessible location near the fingertips of a person supported on chair 810. The combined structure of control panel 390 and support 388 moves with armrest 28 between use positions and out-of-way positions.

A simple user input 392, shown in FIG. 30, is a toggle switch with a first side 396 and a second side 394 and is coupled to armrest 26 in the illustrative embodiment of FIG. 30. The toggle switch 392 is operable to control the lift articulation members of a chair. Activation of first side 396 raises the lift mechanism of the chair, while activation of second side 394 lowers the lift mechanism of the chair.

Figure 33:
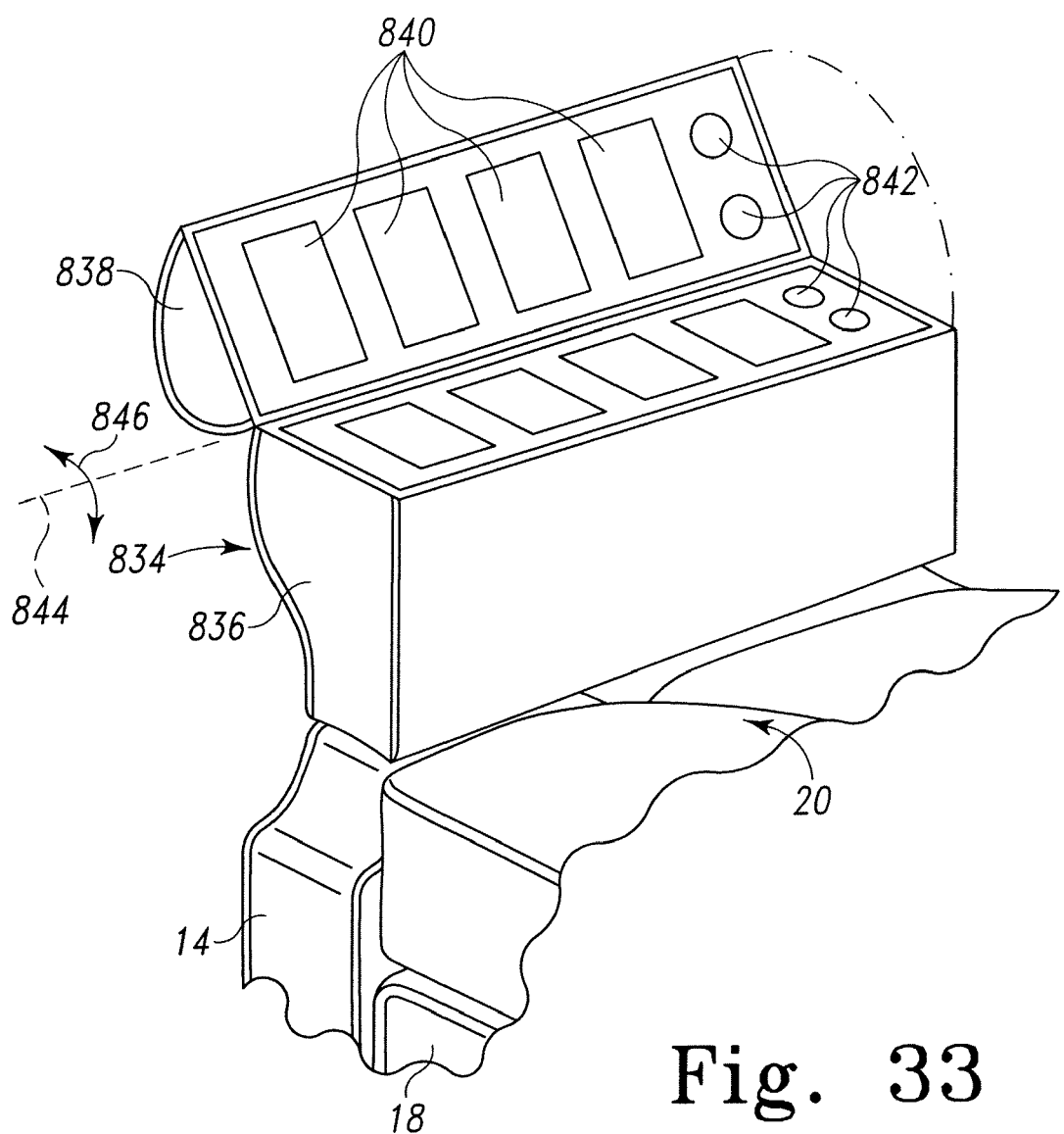
FIG. 33 is a fragmented perspective view of a portion of a chair including a two-piece armrest with a top portion of the armrest pivotable to expose controls for the chair.

FIG. 33 shows another embodiment of controls located within an armrest 834. Armrest 834 comprises an upper portion 838 pivotably coupled to a lower portion 836 and pivotable about a generally horizontal axis 844 as depicted by arrow 846. In a closed position (not shown), upper portion 838 is supported on lower portion 836 and armrest 834 functions as a normal armrest similar to the illustrative armrest 28. When the upper portion 838 is pivoted to the open position shown in FIG. 33, user inputs to control operation of the chair, accessories, and environmental controls are exposed. For example, user inputs 842 control various aspects of the lifting mechanism of a chair and user inputs 840 control operation of the chair articulating members, accessories such as massage, heat, and surface firmness, and various other devices in the environment such as a television, audio system, and lighting. Similarly to the illustrative embodiments of FIGS. 29 and 30, the user inputs 840 and 842 of FIG. 33 move with the articulation of armrest 834 which articulates similarly to the illustrative armrest 704 of FIGS. 10 and 11.

Figure 26:
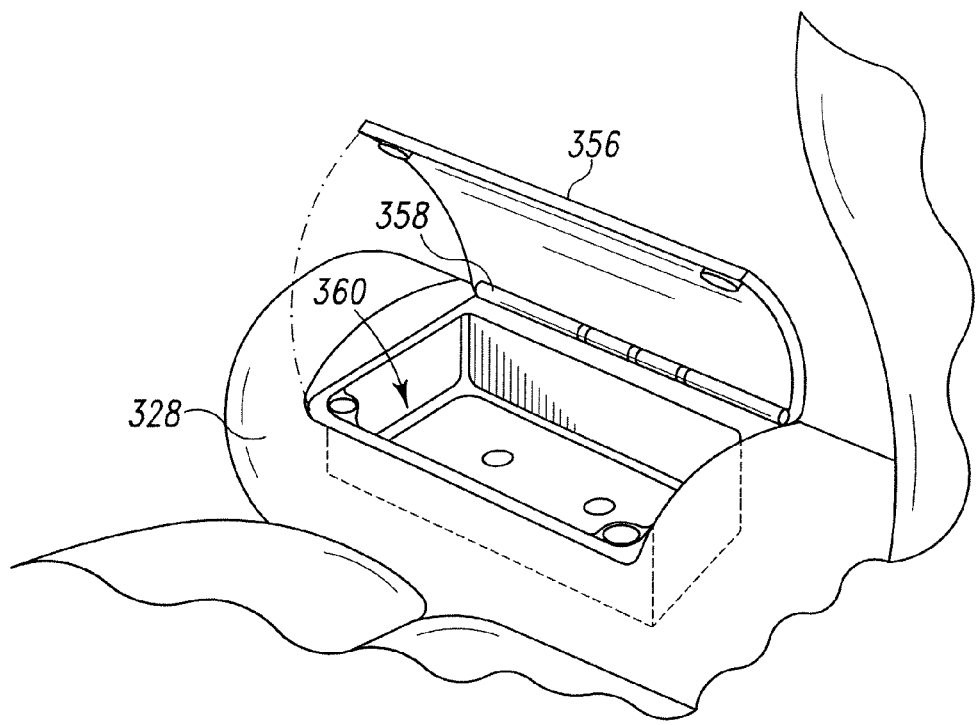
FIG. 26 is a perspective fragmented view of an armrest of a chair with portions cut away, the armrest including a storage compartment.

In another embodiment of an armrest 828 shown in FIG. 26, a storage compartment 360 is provided for the storage of a wireless pendant or remote control. Armrest 828 includes a cover 356 which is pivotable about a hinge 358 to cover the storage compartment 360.

The provision of storage adjacent a chair allows a person supported on the chair easy access to various items needed during their time on the chair. Several aspects of a storage system adjacent a chair are disclosed in an application titled "HOME CARE EQUIPMENT SYSTEM", U.S. application Ser. No. 11/204,633, filed Aug. 16, 2005 and hereby incorporated by reference herein in its entirety. In another embodiment shown in FIG. 21, a storage module 114 is attachable to the frame 14 of chair 810 so as to be accessible to a person supported on chair 810. Attachment may be made by any of a number of fastening means. As seen in FIG. 22, storage module 114 includes a cover 330 which is pivotable about a generally horizontal axis 332 as depicted by arrow 334. As can best be seen in FIG. 25, cover opens to expose a cavity 355 within storage module 114. In the exemplary embodiments of FIGS. 21-24, storage module 24 provides storage space for a person supported on chair 810.

Figure 23:
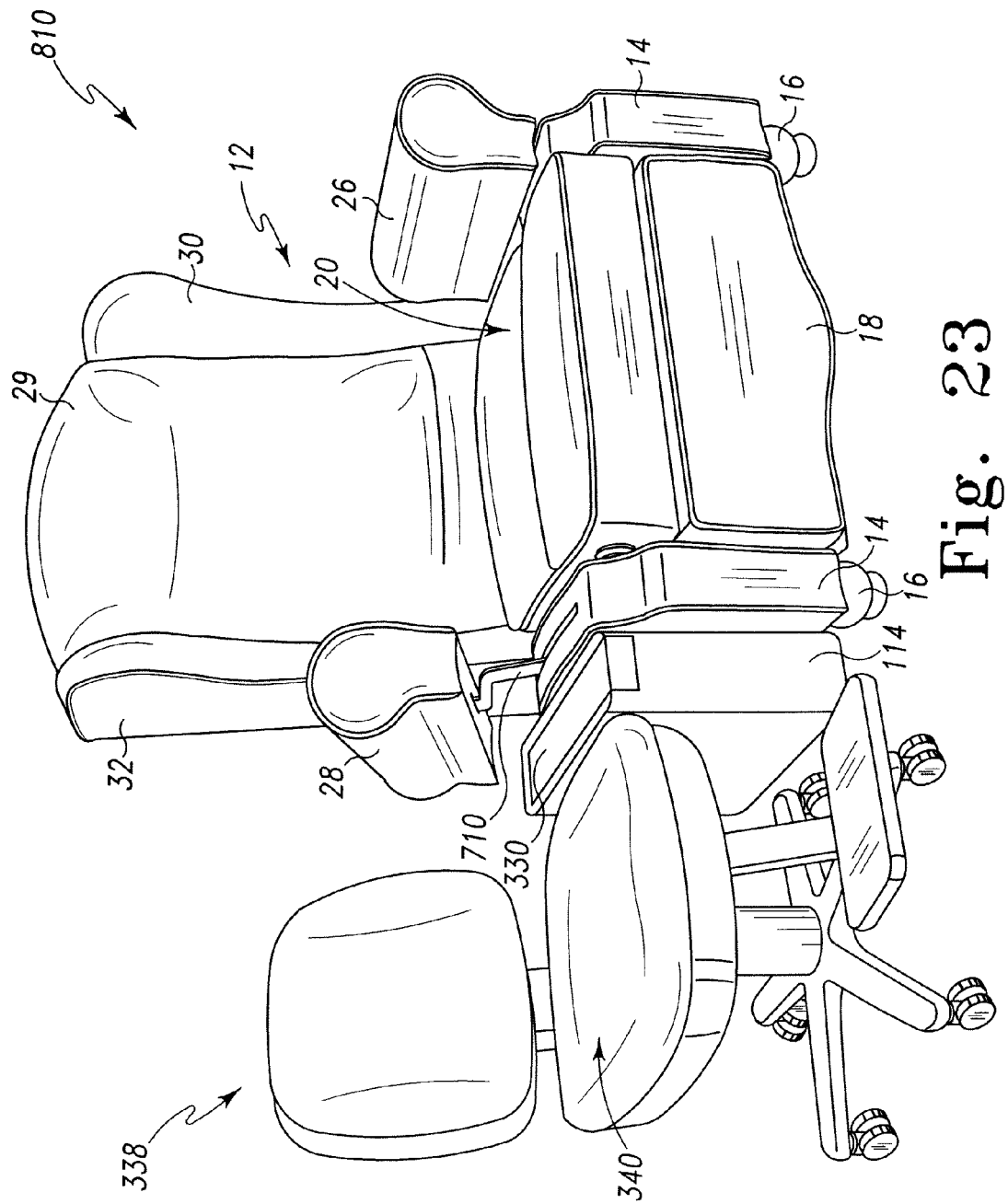
FIG. 23 is a perspective view of a personal mobility device adjacent the chair of FIG. 22 and positioned to permit a lateral transfer by an individual between the chair and personal mobility device.
Figure 24:
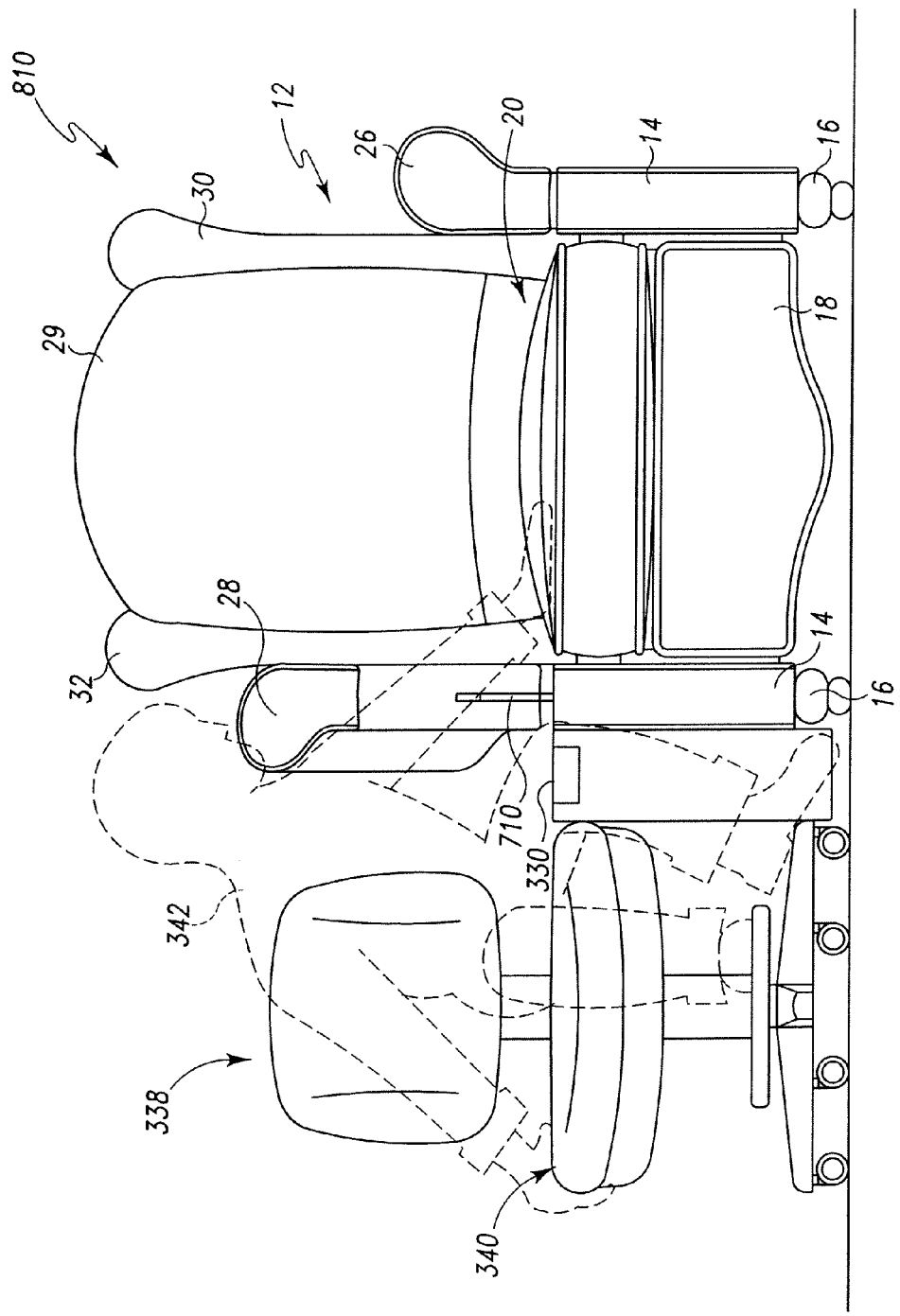
FIG. 24 is a front view of the chair and personal mobility device of FIG. 23 depicting a person making a lateral transfer.

Referring now to FIGS. 23 and 24, a person 342 may transfer from a seat 340 of a personal mobility device 338 positioned adjacent chair 810. Armrest 28 pivots to an out-of-the-way position to provide a clear transfer path. During the transfer, the person 342 is supported on the cover 330 of storage module 114 and on the frame 114 of chair 810.

Figure 25:
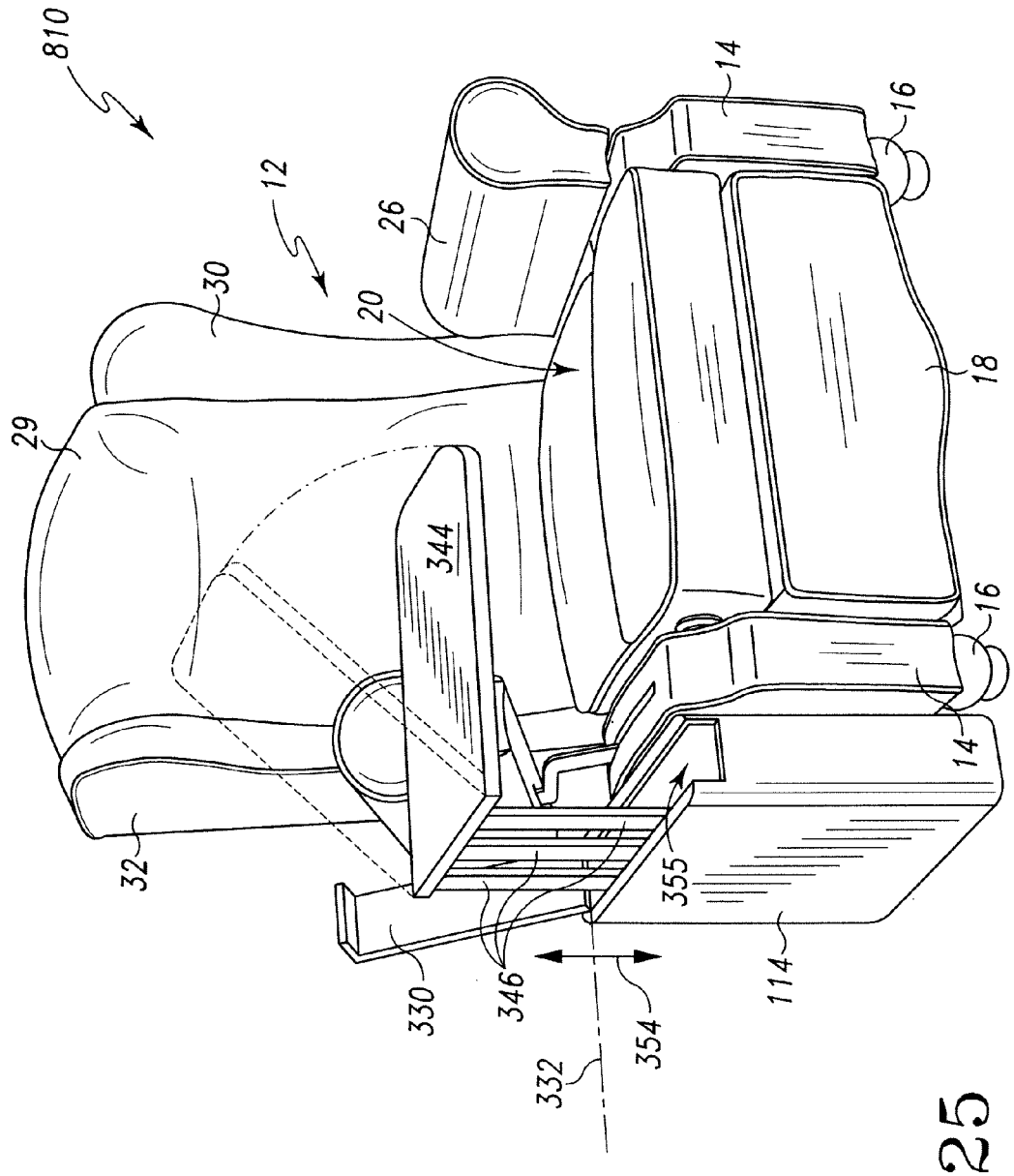
FIG. 25 is a perspective view of another embodiment of the chair of FIG. 22 with a retractable table extending from a cavity of the storage module.

Still yet another embodiment of a storage module 114 is shown in FIG. 25. Storage module 114 comprises a table 344 which is stored in a cavity 355 of storage module 114. Three telescopic legs 346 support table 344. Table 344 is pivotable between a first position shown in solid in FIG. 25 and a second position shown in phantom in FIG. 25. In the first position the table 344 is generally horizontal and positioned over the lap of an occupant seated on chair 810. In the first position, table 344 is usable by an occupant on chair 810 as an eating surface or support surface to perform any of a number of tasks. In the second position, table 344 is positioned to be stowed inside of storage module 114. The telescoping action of legs 346 permits the table 344 to be retracted inside of cavity 355 storage module 114 such that cover 330 may be closed.

Figure 32:
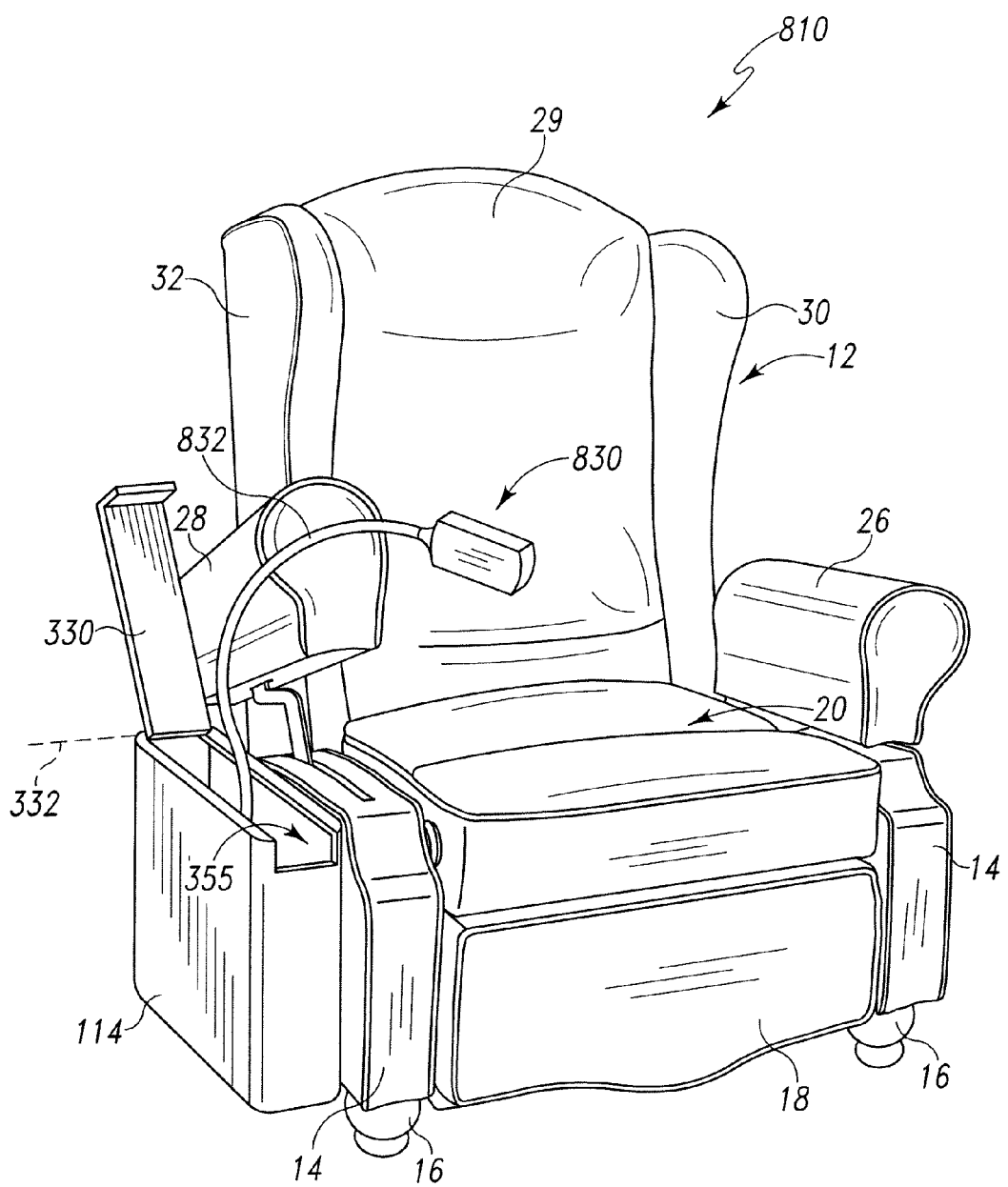
FIG. 32 is a perspective view of another embodiment of the chair of FIG. 22 with a flexible member supporting a pendant extending from a cavity of the storage module.

In still yet another embodiment of storage module 114 shown in FIG. 32, a pendant 830 is coupled to one end of a flexible member 832 which is coupled at a second end within a cavity 355 of storage module 114 of chair 810. Flexible member 832 is adjustable to a number of positions. When not in use, pendant 830 is stowed in cavity 355 permitting storage module 114 to be closed and armrest 28 to be pivoted into its use position. Flexible member 832 is configured such that it may be positioned by a person supported on chair 810 with minimal force and retains its position until repositioned by the person. Pendant 830 is electrically coupled to chair 810 by a cord (not shown) that passes through the center of flexible member 832 and is routed through storage module 114 into frame 14 of chair 810. In some embodiments, the cord may be omitted and a wireless connection between pendant 830 and chair 810 may be employed.

Figure 21:
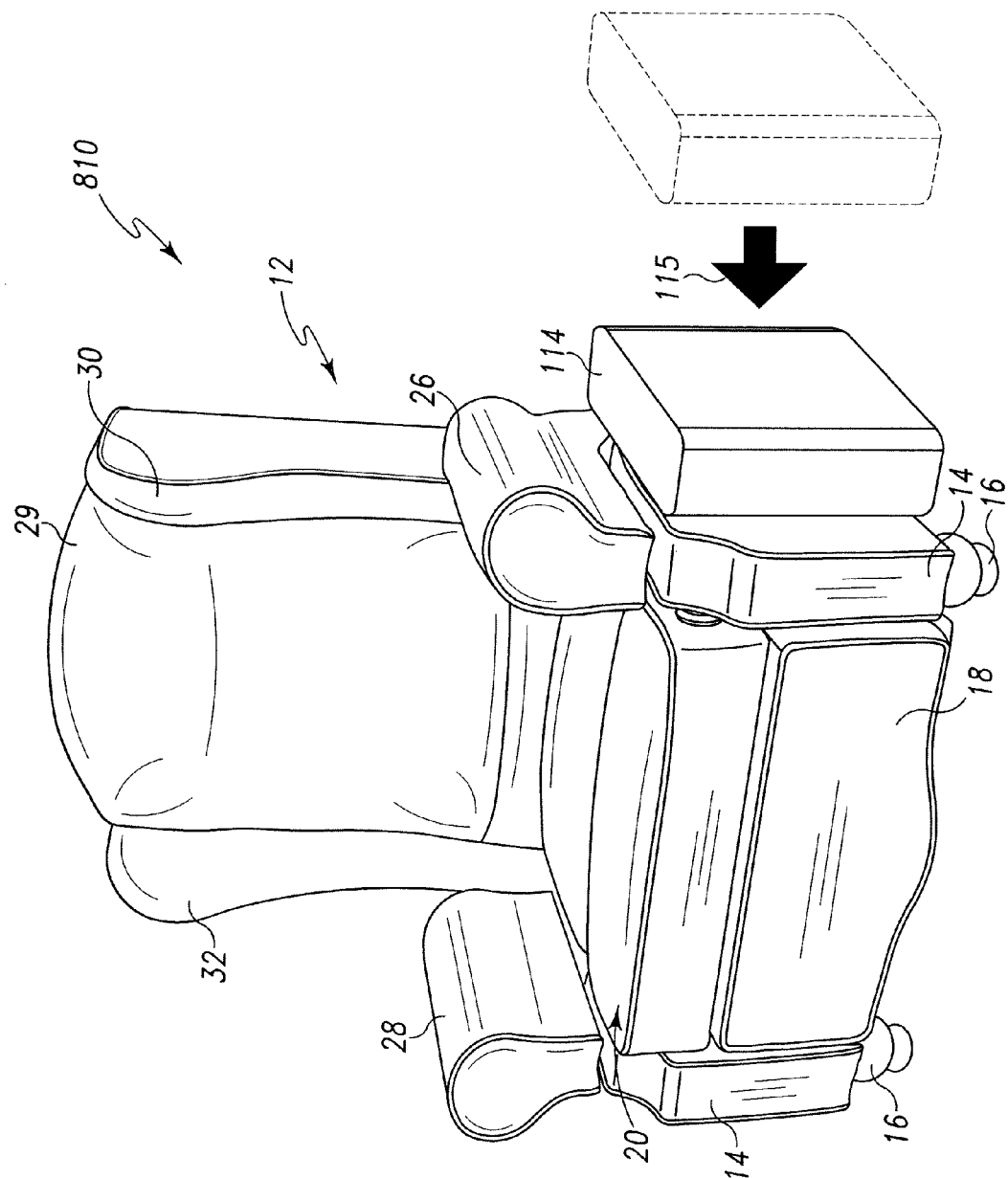
FIG. 21 is a perspective view of a chair with a storage module attached to the chair.
Figure 22:
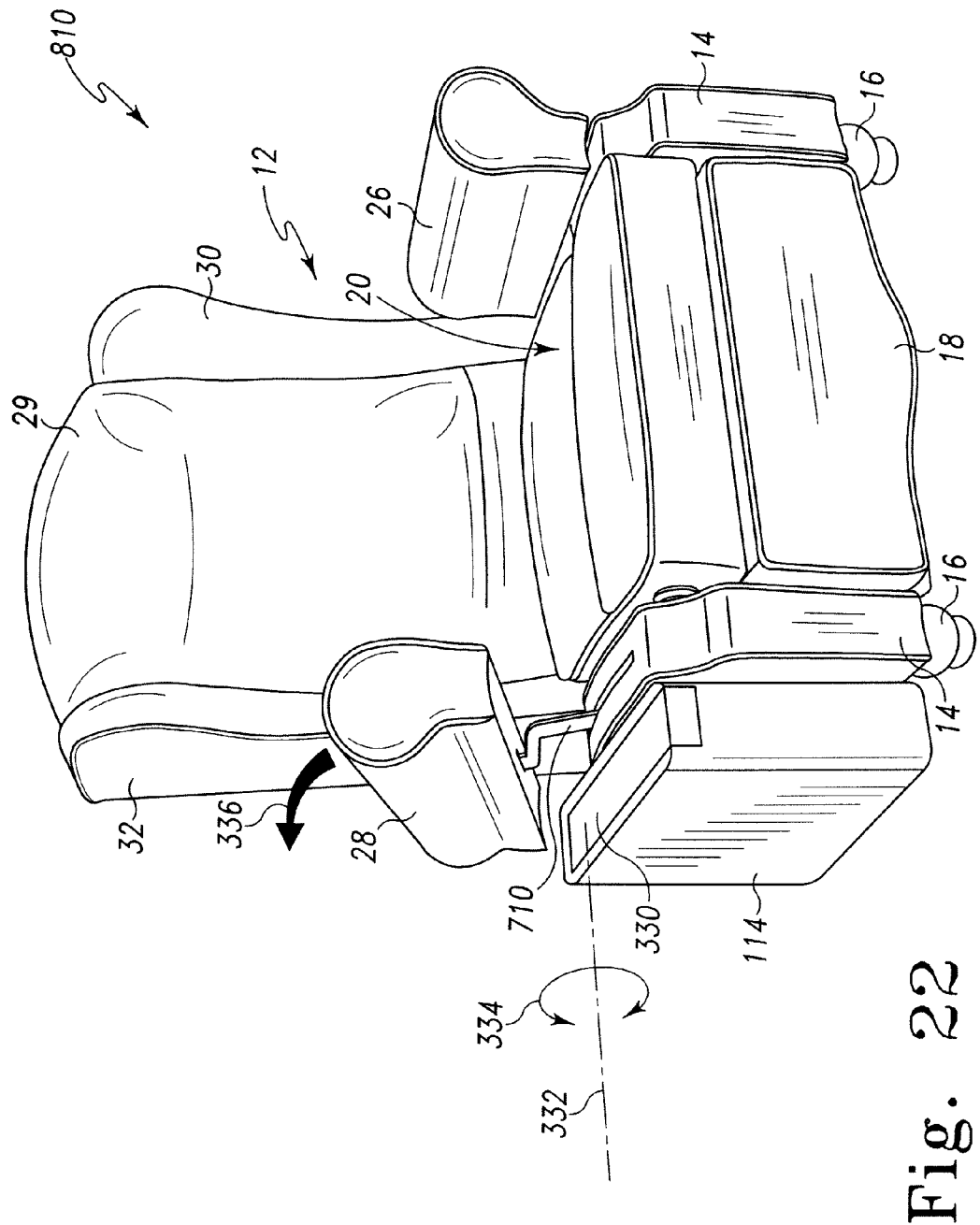
FIG. 22 is a perspective view of another embodiment of a chair having a storage module attached thereto, the storage module having a lid and an armrest of the chair articulated to an out-of-the-way position.
Figure 27:
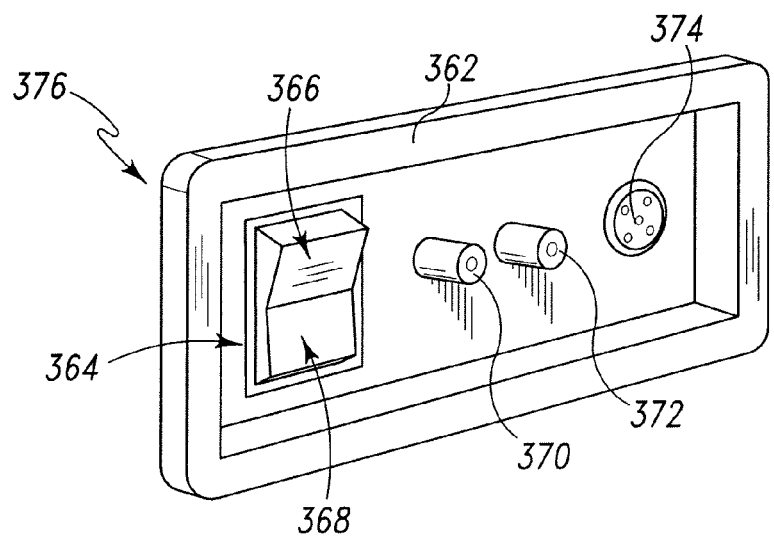
FIG. 27 is a perspective view of an exemplary input panel of the chair of FIG. 1.

Storage areas such as the compartment 360 of the illustrative embodiment of FIG. 26 or the storage module 114 of FIGS. 21 and 22 may also provide for the placement of interfaces between chair 810 and environmental equipment. For example, an interface panel 376 shown in FIG. 27 may be positioned inside of storage compartment 360, storage module 114, or located on the rear of main portion 29 of chair 810. Input panel 376 includes two audio input jacks 370 and 372, a pendant coupler 374 and a toggle switch 364. The illustrative panel 376 audio jacks 370, 372 provide a coupling point for audio inputs to be output by a speaker coupled to the chair 810, such as the speaker 112 of the illustrative embodiment of FIG. 16. Pendant coupler 374 provides a coupling point for a control pendant. The toggle switch 364 has two switches 366 and 368 which are used to activate the lift mechanism of a chair.

Several embodiments disclosed herein refer to the use of an actuator. The term actuator refers to any of a number of actuation devices which may be utilized in articulating various members and linkages in the disclosed chairs/chairs. For example, electromechanical linear actuators, pneumatic cylinders, hydraulic cylinders, and air bladders are all contemplated as being applicable to one or more of the embodiments. Additionally, actuators may include other combinations of prime movers and links or members which may be utilized to actuate, move, transfer motion, articulate, lift, lower, rotate, extend, retract, or otherwise move links, linkages, frames, or members of the chairs discussed above.

Although certain illustrative embodiments have been described in detail above, variations and modifications exist within the scope and spirit of this disclosure as described and as defined in the following claims.

The invention claimed is:

1. A chair comprising,
   a seat frame having a head end and a foot end, a front seat section supported by the seat frame on the foot end side of the seat frame, the front seat section including at least one front seat section bladder selectively inflatable between a deflated position and a support position,
   a back seat section supported by the seat frame on the head end side of the seat frame, the back seat section including at least one back seat section bladder selectively inflatable between a support position and an egress position, the front seat section and back seat section cooperating to form a seating surface for supporting a person in a seated position, the amount of inflation of the at least one front seat section bladder and the at least one back seat section bladder being altered during egress of an occupant out of the chair from the foot end of the seat frame and during ingress of an occupant into the chair from the foot end of the seat frame, and a back section coupled to the seat frame, a foot section coupled to the seat frame to locate the front seat section between the back seat section and the foot section, the foot section pivotable relative to the seat frame between a generally horizontal orientation associated with the support position of the at least one back seat section bladder and a generally vertical orientation associated with the egress position of the at least one back seat section bladder, the foot section extending downwardly away from the front seat section when in the generally vertical orientation so that egress from the foot end of the seat frame is permitted, wherein the back seat section is movable relative to the back section and the back seat section is located between the front seat section and the back section and wherein the back section is movable relative to the seat frame independent of the back seat section and the front seat section.

2. The chair of claim 1, wherein, when an occupant is to be assisted out of the chair, the at least one back seat section bladder is further inflated from its support position to its egress position and the at least one front seat section bladder is deflated from its support position to its deflated position.

3. The chair of claim 1, wherein, when an occupant is to be assisted into the chair, the at least one back seat section bladder is deflated from its egress position to its support position and the at least one front seat section bladder is inflated from its deflated position to its support position.

4. The chair of claim 1, further comprising a comfort section coupled to the seat frame and configured to direct at least one comfort related output into the vicinity of at least one of the at least one front seat section and the at least one back seat section.

5. The chair of claim 4, wherein the at least one comfort related output is light.

6. The chair of claim 4, wherein the at least one comfort related output is variable speed air.

7. The chair of claim 4, wherein the at least one comfort related output is temperature controlled air.

8. The chair of claim 4, wherein the at least one comfort related output is audio output.

9. The chair of claim 1, further comprising at least one armrest coupled to the seat frame and movable between a use position alongside the back seat section and an out-of-the-way position away from the back seat section to permit a person to transfer onto the seat section in a lateral direction relative to the chair.

10. The chair of claim 1, further comprising a left armrest coupled to the seat frame and a right arm rest coupled to the seat frame, the left armrest being movable between a first use position alongside the back seat section and a first out-of-the-way position away from the back seat section to permit a person to transfer onto the back seat section in a first lateral direction relative to the chair, and the right armrest being movable between a second use position alongside the back seat section and a second out-of-the-way position away from the back seat section to permit a person to transfer onto the back seat section in a second lateral direction relative to the chair.

11. The chair of claim 1, wherein the back seat section is movable to provide a lift assist function to assist a person between a seated position and a standing position.

12. The chair of claim 1, wherein the at least one front seat section bladder comprises a plurality of seat section bladders that are inflated and deflated to provide the seat section with a massaging effect.

13. The chair of claim 12, wherein the plurality of front seat section bladders comprise cylindrical air cells.

14. The chair of claim 1, wherein the at least one back seat section bladder comprises a plurality of back seat section bladders that are inflated and deflated to provide the back seat section with a massaging effect.

15. The chair of claim 14, wherein the plurality of back section bladders comprise cylindrical air cells.

16. The chair of claim 1, wherein the back seat section is movable relative to the front seat section.

17. The chair of claim 16, wherein a back seat section portion raises upwardly to a position overlying a front seat section portion to assist an occupant out of the chair.

18. A chair comprising, a seat frame having a head end and a foot end, a front seat section supported by the seat frame on the foot end side of the seat frame, the front seat section including at least one front seat section bladder selectively inflatable between a deflated position and a support position, a back seat section supported by the seat frame on the head end side of the seat frame, the back seat section including at least one back seat section bladder selectively inflatable between a support position and an egress position, the front seat section and back seat section cooperating to form a seating surface for supporting a person in a seated position, the amount of inflation of the at least one front seat section bladder and the at least one back seat section bladder being altered during egress of an occupant out of the chair and during ingress of an occupant into the chair, a back section coupled to the seat frame, and a foot rest coupled to the seat frame and a massaging surface supported on the foot rest, wherein the back seat section is movable relative to the back section and the back seat section is located between the front seat section and the back section and wherein the back section is movable relative to the seat frame independent of the back seat section and the front seat section.

19. The chair of claim 18, wherein the massaging surface comprises air bladders that are alternately and repetitively inflated and deflated.

20. The chair of claim 18, wherein the foot rest comprises at least one temperature control element.

* * * * *